United States Patent
Banks

(10) Patent No.: US 11,575,676 B1
(45) Date of Patent: Feb. 7, 2023

(54) COMPUTER IMPLEMENTED NETWORKING SYSTEM AND METHOD FOR CREATING, SHARING AND ARCHIVING CONTENT INCLUDING THE USE OF A USER INTERFACE (UI) VIRTUAL ENVIRONMENT AND ASSOCIATED ROOMS, CONTENT PROMPTING TOOL, CONTENT VAULT, AND INTELLIGENT TEMPLATE-DRIVEN CONTENT POSTING (AKA ARCHIVE AND NETWORKING PLATFORM)

(71) Applicant: Todd M Banks, Pauma Valley, CA (US)

(72) Inventor: Todd M Banks, Pauma Valley, CA (US)

(*) Notice: Subject to any disclaimer, the term of this patent is extended or adjusted under 35 U.S.C. 154(b) by 0 days.

(21) Appl. No.: 17/446,292

(22) Filed: Aug. 28, 2021

(51) Int. Cl.
| | |
|---|---|
| *G06F 3/0482* | (2013.01) |
| *H04L 9/40* | (2022.01) |
| *G06T 11/00* | (2006.01) |
| *G06Q 50/00* | (2012.01) |

(52) U.S. Cl.
CPC ............ *H04L 63/10* (2013.01); *G06F 3/0482* (2013.01); *G06T 11/00* (2013.01); *G06Q 50/01* (2013.01); *G06T 2200/24* (2013.01); *G06T 2210/04* (2013.01)

(58) Field of Classification Search
CPC ................................................ G06F 3/048–05
See application file for complete search history.

(56) References Cited

U.S. PATENT DOCUMENTS

| | | | | |
|---|---|---|---|---|
| 5,689,669 A | * | 11/1997 | Lynch | G06F 3/0481 715/848 |
| 7,398,267 B2 | * | 7/2008 | Fenton-Jones | G06Q 50/165 707/999.102 |
| 8,353,767 B1 | * | 1/2013 | Borst | A63F 13/71 463/31 |
| 11,327,638 B2 | * | 5/2022 | Seshadri | G06F 3/0485 |
| 2005/0210395 A1 | * | 9/2005 | Wakita | G06F 21/6245 715/753 |
| 2006/0123127 A1 | * | 6/2006 | Littlefield | G06Q 10/107 709/205 |

(Continued)

*Primary Examiner* — Daniel Rodriguez
(74) *Attorney, Agent, or Firm* — Collaborative IP; Paul Ditmyer

(57) ABSTRACT

A computer implemented networking system and method for content-creating, sharing, and archiving, includes maintaining profiles for a plurality of users each having an account that stores and displays user-authored content posts that are quality controlled, and generating, for each user profile, a virtual structure (e.g. building or house) displayed via a UI, and including a main room and a plurality of sub-rooms each being associated with a respective category, and wherein the main room provides navigation to the sub-rooms. The approach includes generating the user-authored content posts for each of the users via posting templates that prompt a user to input and organize various content based upon the template guidance for the respective category to control the quality of the user-authored content posts. A prompting tool operates within the virtual building for each profile by displaying prompts within each of the sub-rooms and related to the respective category and includes a prioritized list of user tasks.

20 Claims, 17 Drawing Sheets

(56) References Cited

U.S. PATENT DOCUMENTS

| | | | | |
|---|---|---|---|---|
| 2008/0215994 | A1* | 9/2008 | Harrison | A63F 13/24 |
| | | | | 715/757 |
| 2009/0100355 | A1* | 4/2009 | Takemura | H04L 12/282 |
| | | | | 715/757 |
| 2009/0222424 | A1* | 9/2009 | Van | G06Q 30/0601 |
| | | | | 715/848 |
| 2010/0070884 | A1* | 3/2010 | Bromenshenkel | G06F 3/0481 |
| | | | | 715/757 |
| 2010/0251337 | A1* | 9/2010 | Amsterdam | A63F 13/79 |
| | | | | 715/757 |
| 2011/0029897 | A1* | 2/2011 | Russell | G05B 15/02 |
| | | | | 715/757 |
| 2012/0030733 | A1* | 2/2012 | Andrews | G06F 21/41 |
| | | | | 726/4 |
| 2013/0263016 | A1* | 10/2013 | Lehtiniemi | G06Q 30/02 |
| | | | | 715/753 |
| 2014/0298217 | A1* | 10/2014 | Lehtiniemi | G06Q 10/06 |
| | | | | 715/765 |
| 2014/0337773 | A1* | 11/2014 | Phang | G06F 3/0482 |
| | | | | 715/767 |
| 2017/0315682 | A1* | 11/2017 | Ulyanov | G06Q 50/01 |
| 2019/0346995 | A1* | 11/2019 | Seshadri | G06F 3/0485 |
| 2021/0073358 | A1* | 3/2021 | Goldston | G06F 16/61 |
| 2021/0224362 | A1* | 7/2021 | Goldston | G06F 21/10 |
| 2022/0236841 | A1* | 7/2022 | Kim | G06F 3/0484 |

* cited by examiner

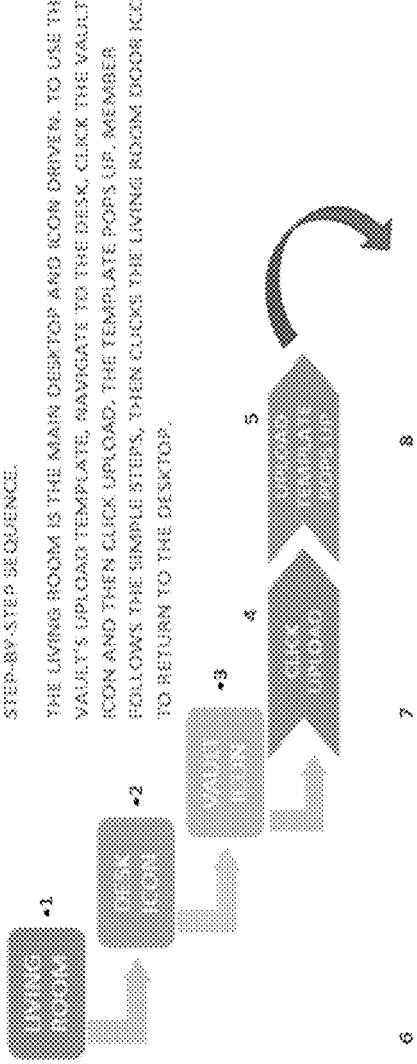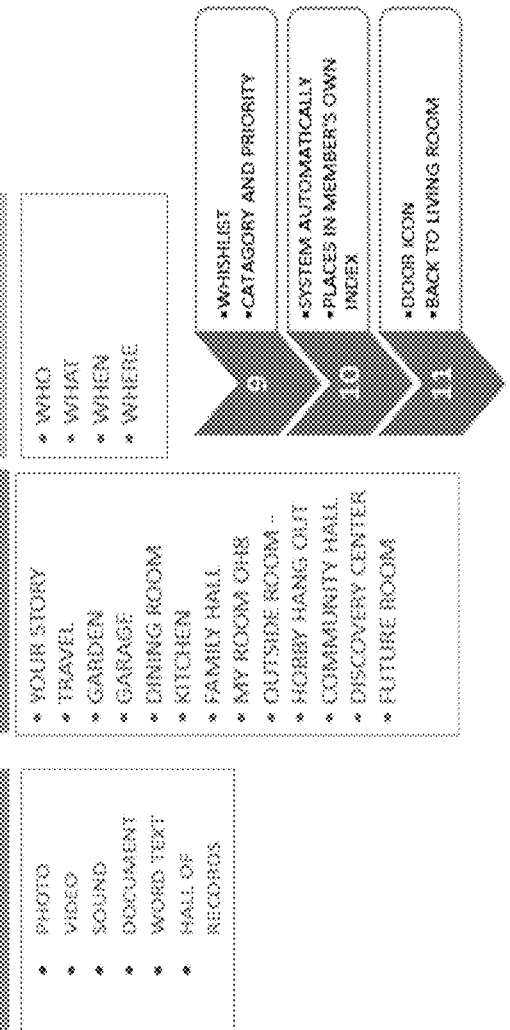
FIG. 14

COMPUTER IMPLEMENTED NETWORKING SYSTEM AND METHOD FOR CREATING, SHARING AND ARCHIVING CONTENT INCLUDING THE USE OF A USER INTERFACE (UI) VIRTUAL ENVIRONMENT AND ASSOCIATED ROOMS, CONTENT PROMPTING TOOL, CONTENT VAULT, AND INTELLIGENT TEMPLATE-DRIVEN CONTENT POSTING (AKA ARCHIVE AND NETWORKING PLATFORM)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to the field of computer networking, and more particularly, to systems, software and methods for digitally creating, organizing, sharing and archiving content.

BACKGROUND OF THE INVENTION

A social networking service (also social networking site, or SNS or social media) is an online platform which people use to build social networks or social relationship with other people who share similar personal or career interests, activities, backgrounds or real-life connections.

A social network is distributed across various computer networks. Social networks are computer networks, linking people, organization, and knowledge. Social networking services vary in format and the number of features. They can incorporate a range of new information and communication tools, operating on desktops and on laptops, on mobile devices such as tablet computers and smartphones. They may feature digital photo/video/sharing and "web logging" diary entries online (blogging). Online community services are sometimes considered social-network services by programmers and users, though in a broader sense, a social-network service usually provides an individual-centered service whereas online community services are group-centered. Defined as "websites that facilitate the building of a network of contacts in order to exchange various types of content online," social networking sites provide a space for interaction to continue beyond in person interactions. These computer mediated interactions link members of various networks and may help to both maintain and develop new social ties.

Social networking sites allow users to share ideas, digital photos and videos, posts, and to inform others about online or real-world activities and events with people in their network. While in-person social networking—such as gathering in a village market to talk about events—has existed since the earliest development of towns, the Web enables people to connect with others who live in different locations, ranging from across a city to across the world. Depending on the social media platform, members may be able to contact any other member. In other cases, members can contact anyone they have a connection to, and subsequently anyone that contact has a connection to, and so on. The success of social networking services can be seen in their dominance in society today, with Facebook having 2.13 billion active monthly users and an average of 1.4 billion daily active users in 2017. Linked In, a career-oriented archive networking service, generally requires that a member personally know another member in real life before they contact them online. Some services require members to have a preexisting connection to contact other members.

Posting for the sake of posting is a habit hard to break. Most people routinely upload volumes of images, photos and videos without background stories to add meaning to them. This sort of posting requires nothing of its viewers other than to press a quick like and move to the next feed. We are all bombarded with online feeds of news, advertising and special offers that are superficial at best.

The popularity of de facto websites may be because there are no other choices. Users quickly assemble posts without much thought and what follows is a bombardment of advertising embedded in the scrolling feeds demanding the user's time to sort through them. The user receives a daily barrage of uninitiated posts. This excess of information is desensitizing. Users are sidetracked and satisfaction is left behind.

Other types of private networks or intranets for businesses, educational institutions, or research organizations, for example, are also limited in the methods for posting, sharing and archiving content.

Accordingly, there may be a need for an alternative to the typical social media network and/or other networking platform that supports and improves the sharing and archiving of meaningful content.

This background section is intended to introduce the reader to various aspects of typical technology that may be related to various aspects or embodiments of the present invention, which are described and/or claimed below. This discussion is believed to be useful in providing the reader with background information to facilitate a better understanding of the various aspects and embodiments of the present invention. Accordingly, it should be understood that these statements are to be read in light of, and not as admissions of, the prior art.

SUMMARY OF THE INVENTION

It may be an objective of the present embodiments to provide a computer implemented network system and method for creating, organizing, sharing and archiving content.

This and other objects, advantages and features in accordance with the present embodiments may be provided by a method comprising: maintaining, in a networking system configured for content-creating, sharing, and archiving, profiles for a plurality of users each having an account on the archive and networking system that stores and displays user-authored content posts that are quality controlled for each of the users; generating, for each user profile, a virtual building configured to be displayed via a user interface (UI), and including a main room and a plurality of sub-rooms each being associated with a respective category, and wherein the main room provides navigation to the sub-rooms; generating the user-authored content posts for each of the users via posting templates that include template guidance associated with each category and are configured to prompt a user to input and organize various content, including written text and audio/visual media, based upon the template guidance for the respective category to control the quality of the user-authored content posts; and maintaining a prompting tool, operating within the virtual building for each profile by displaying prompts within each of the sub-rooms and related to the respective category, and comprising a prioritized list of user tasks including at least one of creation of user-authored content posts, completion of incomplete user-authored content posts, and reading of posts of other users.

Additionally, or alternatively, the method may include maintaining, in the networking system, a Vault configured to securely store users' uploaded content including documents and audio/visual media. Maintaining the Vault may include only receiving users' content via uploading templates to store the content for later retrieval by the user via the posting templates and via reading templates. The users' uploaded content may be securely stored in the Vault and is private to only the user and authorized other users. The Vault may include a time-lock component configured to lock a user's designated post for future posting to the user's profile based upon at least one of a date, event and condition. The Vault may include a title-transfer component configured to transfer control of a user's profile and associated virtual building and content to another user based upon at least one of a date, event and condition.

Additionally, or alternatively, maintaining the prompting tool may include displaying selectable options to edit the prioritized list of user tasks by the user.

Additionally, or alternatively, the method may include maintaining, for each user profile, a community of other users who are selected for profile access by the respective user, and maintaining, within the networking system, a posting access classification component configured to provide access to user-authored content posts based upon a network classification, a community classification and a private classification that are selectable by the user, per user-authored content post, within the posting template.

Objects, advantages and features in accordance with the present embodiments may also be provided by a system including at least one processor and at least one non-transitory computer-readable storage medium storing instructions thereon that, when executed by the at least one processor, cause the system to: maintain, in a networking system, profiles for a plurality of users each having an account on the networking system that stores and displays user-authored content posts that are quality controlled for each of the users; generate, for each user profile, a virtual building configured to be displayed via a user interface (UI), and including a main room and a plurality of sub-rooms each being associated with a respective category, and wherein the main room provides navigation to the sub-rooms; generate the user-authored content posts for each of the users via posting templates that include template guidance associated with each category and are configured to prompt a user to input and organize various content, including written text and audio/visual media, based upon the template guidance for the respective category to control the quality of the user-authored content posts; and maintain a prompting tool, operating within the virtual building for each profile by displaying prompts within each of the sub-rooms and related to the respective category, and comprising a prioritized list of user tasks including creation of user-authored content posts, completion of incomplete user-authored content posts, and reading of posts of other users.

Additionally, or alternatively, the system may store instructions that, when executed by the at least one processor, maintain, in the networking system, a Vault configured to securely store users' uploaded content including documents and audio/visual media. Instructions may be stored that, when executed by the at least one processor, maintain the Vault by only receiving users' content via uploading templates to store the content for later retrieval by the user via the posting templates and via reading templates. The users' uploaded content may be securely stored in the Vault and is private to only the user and authorized other users. The Vault may include a time-lock component configured to lock a user's designated post for future posting to the user's profile based upon at least one of a date, event and condition. The Vault may include a title-transfer component configured to transfer control of a user's profile and associated virtual building and content to another user based upon at least one of a date, event and condition.

Additionally, or alternatively, the system may include further storing instructions that, when executed by the at least one processor, maintain the prompting tool by displaying selectable options to edit the prioritized list of user tasks by the user.

Additionally, or alternatively, the system may include further storing instructions that, when executed by the at least one processor: maintain, for each user profile, a community of other users who are selected for profile access by the respective user; and maintain, within the networking system, a posting access classification component configured to provide access to user-authored content posts based upon a network classification, a community classification and a private classification that are selectable by the user within the posting template.

Objects, advantages and features in accordance with the present embodiments may also be provided by a non-transitory computer readable medium having embedded thereon a program, the program being executable by a processor for performing a method, the method comprising: maintaining, in a networking system, profiles for a plurality of users each having an account on the networking system that stores and displays user-authored content posts that are quality controlled for each of the users; generating, for each user profile, a virtual building configured to be displayed via a user interface (UI), and including a main room and a plurality of sub-rooms each being associated with a respective category, and wherein the main room provides navigation to the sub-rooms; generating the user-authored content posts for each of the users via posting templates that include template guidance associated with each category and are configured to prompt a user to input and organize various content, including written text and audio/visual media, based upon the template guidance for the respective category to control the quality of the user-authored content posts; and maintaining a prompting tool, operating within the virtual building for each profile by displaying prompts within each of the sub-rooms and related to the respective category, and comprising a prioritized list of user tasks including creation of user-authored content posts, completion of incomplete user-authored content posts, and reading of posts of other users.

Additionally, or alternatively, the non-transitory computer readable medium may include further storing instructions thereon that, when executed by the at least one processor, maintain, in the networking system, a Vault configured to securely store users' uploaded content including documents and audio/visual media. Maintaining the Vault may include only receiving users' content via uploading templates to store the content for later retrieval by the user via the posting templates and via reading templates. The users' uploaded content may be securely stored in the Vault and is private to only the user and authorized other users. The Vault may include a time-lock component configured to lock a user's designated post for future posting to the user's profile based upon at least one of a date, event and condition. The Vault may include a title-transfer component configured to transfer control of a user's profile and associated virtual building and content to another user based upon at least one of a date, event and condition.

Add non-transitory statement here? Additionally, or alternatively, maintaining the prompting tool may include displaying selectable options to edit the prioritized list of user tasks by the user.

Add non-transitory statement here? Additionally, or alternatively, the method may further include maintaining, for each user profile, a community of other users who are selected for profile access by the respective user, and maintaining, within the networking system, a posting access classification component configured to provide access to user-authored content posts based upon a network classification, a community classification and a private classification that are selectable by the user within the posting template.

BRIEF DESCRIPTION OF THE DRAWINGS

FIG. 14 is a schematic diagram illustrating an example of accessing the Vault Uploading Template feature within the system and method of the present embodiments.

DETAILED DESCRIPTION OF THE PREFERRED EMBODIMENTS

Figure 1:
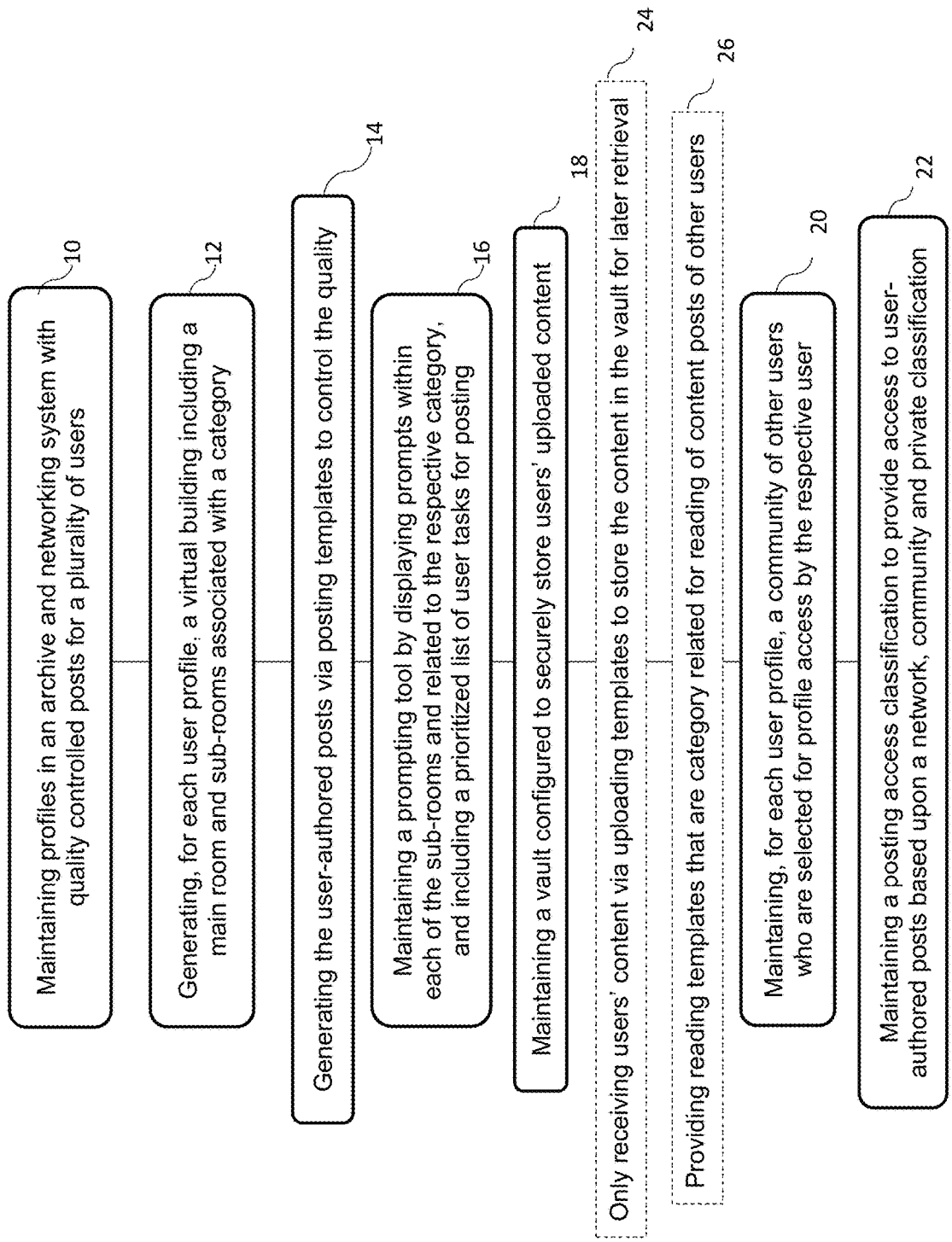
FIG. 1 is a flowchart illustrating various steps in accordance with features of the present embodiments.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Before describing the present disclosure in detail, it is to be understood that this disclosure is not limited to parameters of the particularly exemplified systems, methods, apparatus, products, processes, and/or kits, which may, of course, vary. It is also to be understood that the terminology used herein is only for the purpose of describing particular embodiments of the present disclosure and is not necessarily intended to limit the scope of the disclosure in any particular manner. Thus, while the present disclosure will be described in detail with reference to specific embodiments, features, aspects, configurations, etc., the descriptions are illustrative and are not to be construed as limiting the scope of the claimed invention. Various modifications can be made to the illustrated embodiments, features, aspects, configurations, etc. without departing from the spirit and scope of the invention as defined by the claims. Thus, while various aspects and embodiments have been disclosed herein, other aspects and embodiments are contemplated.

Unless defined otherwise, all technical and scientific terms used herein have the same meaning as commonly understood by one of ordinary skill in the art to which the present disclosure pertains. While a number of methods and materials similar or equivalent to those described herein can be used in the practice of the present disclosure, only certain exemplary materials and methods are described herein.

Various aspects of the present disclosure, including devices, systems, methods, etc., may be illustrated with reference to one or more exemplary embodiments or implementations. As used herein, the terms "embodiment," "alternative embodiment" and/or "exemplary implementation" means "serving as an example, instance, or illustration," and should not necessarily be construed as preferred or advantageous over other embodiments or implementations disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

It will be noted that, as used in this specification and the appended claims, the singular forms "a," "an" and "the"

include plural referents unless the content clearly dictates otherwise. Thus, for example, reference to a "sensor" includes one, two, or more sensors.

As used throughout this application the words "can" and "may" are used in a permissive sense (i.e., meaning having the potential to), rather than the mandatory sense (i.e., meaning must). Additionally, the terms "including," "having," "involving," "containing," "characterized by," variants thereof (e.g., "includes," "has," and "involves," "contains," etc.), and similar terms as used herein, including the claims, shall be inclusive and/or open-ended, shall have the same meaning as the word "comprising" and variants thereof (e.g., "comprise" and "comprises"), and do not exclude additional, un-recited elements or method steps, illustratively.

Various aspects of the present disclosure can be illustrated by describing components that are coupled, attached, connected, and/or joined together. As used herein, the terms "coupled", "attached", "connected," and/or "joined" are used to indicate either a direct connection between two components or, where appropriate, an indirect connection to one another through intervening or intermediate components. In contrast, when a component is referred to as being "directly coupled", "directly attached", "directly connected," and/or "directly joined" to another component, no intervening elements are present or contemplated. Thus, as used herein, the terms "connection," "connected," and the like do not necessarily imply direct contact between the two or more elements. In addition, components that are coupled, attached, connected, and/or joined together are not necessarily (reversibly or permanently) secured to one another. For instance, coupling, attaching, connecting, and/or joining can comprise placing, positioning, and/or disposing the components together or otherwise adjacent in some implementations.

As used herein, directional and/or arbitrary terms, such as "top," "bottom," "front," "back," "left," "right," "up," "down," "upper," "lower," "inner," "outer," "internal," "external," "interior," "exterior," "proximal," "distal" and the like can be used solely to indicate relative directions and/or orientations and may not otherwise be intended to limit the scope of the disclosure, including the specification, invention, and/or claims.

Where possible, like numbering of elements have been used in various figures. In addition, similar elements and/or elements having similar functions may be designated by similar numbering (e.g., element "10" and element "210.") Furthermore, alternative configurations of a particular element may each include separate letters appended to the element number. Accordingly, an appended letter can be used to designate an alternative design, structure, function, implementation, and/or embodiment of an element or feature without an appended letter. Similarly, multiple instances of an element and or sub-elements of a parent element may each include separate letters appended to the element number. In each case, the element label may be used without an appended letter to generally refer to instances of the element or any one of the alternative elements. Element labels including an appended letter can be used to refer to a specific instance of the element or to distinguish or draw attention to multiple uses of the element. However, element labels including an appended letter are not meant to be limited to the specific and/or particular embodiment(s) in which they are illustrated. In other words, reference to a specific feature in relation to one embodiment should not be construed as being limited to applications only within said embodiment.

It will also be appreciated that where a range of values (e.g., less than, greater than, at least, and/or up to a certain value, and/or between two recited values) is disclosed or recited, any specific value or range of values falling within the disclosed range of values is likewise disclosed and contemplated herein.

It is also noted that systems, methods, apparatus, devices, products, processes, compositions, and/or kits, etc., according to certain embodiments of the present invention may include, incorporate, or otherwise comprise properties, features, aspects, steps, components, members, and/or elements described in other embodiments disclosed and/or described herein. Thus, reference to a specific feature, aspect, steps, component, member, element, etc. in relation to one embodiment should not be construed as being limited to applications only within said embodiment. In addition, reference to a specific benefit, advantage, problem, solution, method of use, etc. in relation to one embodiment should not be construed as being limited to applications only within said embodiment.

The headings used herein are for organizational purposes only and are not meant to be used to limit the scope of the description or the claims. To facilitate understanding, like reference numerals have been used, where possible, to designate like elements common to the figures.

User Interfaces

The description herein may refer to "desktops" for ease of discussion. Desktops are a graphical user interface (GUI) that provide the virtual environment and the virtual reality. A desktop environment typically consists of icons, windows, toolbars, folders, wallpapers and desktop widgets, all presented within a very familiar room or place. A GUI might also provide drag and drop functionality and other features that make the desktop metaphor more complete. A desktop environment aims to be an intuitive way for the user to interact with the computer and network using concepts which are similar to those used when interacting with the physical world, such as moving between rooms, walking out to the garage, leaving the house to go 'outside', and sitting at a desk to create, to name a few.

A user interface (UI) is the space where interactions between humans and machines occur. The goal of this interaction is to allow effective operation and control of the machine from the human end, whilst the machine simultaneously feeds back information that aids the operators' decision-making process. Examples of this broad concept of user interfaces include the interactive aspects of computer operating systems.

User interfaces are composed of one or more layers, including a human-machine interface (HMI) that interfaces machines with physical input hardware such as keyboards, mice, or game pads, and output hardware such as computer monitors, speakers, and printers. A device that implements an HMI is called a human interface device (HID). Other terms for human-machine interfaces are man-machine interface (MMI) and, when the machine in question is a computer, human—computer interface. Additional UI layers may interact with one or more human senses, including: tactile UI (touch), visual UI (sight), auditory UI (sound), olfactory UI (smell), equilibrial UI (balance), and gustatory UI (taste).

Composite user interfaces (CU Is) are UIs that interact with two or more senses. The most common CUI is a graphical user interface (GUI), which is composed of a tactile UI and a visual UI capable of displaying graphics. When sound is added to a GUI, it becomes a multimedia user interface (MUI). There are three broad categories of CUI:

standard, virtual and augmented. Standard CUI use standard human interface devices like keyboards, mice, and computer monitors. When the CUI blocks out the real world to create a virtual reality (VR), the CUI is virtual and uses a virtual reality interface. When the CUI does not block out the real world and creates augmented reality (AR), the CUI is augmented and uses an augmented reality interface.

The embodiments described herein may include the use of one or more types of UIs including graphical, holographical, VR and/or AR, for example.

Introduction

Referring now to FIGS. 1-4, embodiments of a computer implemented network system and method for creating, organizing, sharing and archiving content in accordance with features of the present invention will now be described. The embodiments are directed to a computer implemented networking system and method for creating, organizing, sharing and archiving content including the use of a graphical user interface (GUI) virtual building and associated rooms, content prompting tool, content Vault, and intelligent template-driven content creating, posting, and reading.

Although various example embodiments described below may refer to social media networks (e.g., a "Family Archive" Platform or Share-Net, see FIG. 3) and associated details, other types of private or permissioned networks (e.g., see FIG. 2) for businesses, companies, educational institutions, or research organizations, for example, are also contemplated in the present systems and methods for posting, sharing and archiving content. The names of various features are for ease of description, and other names may be used, as would be appreciated those skilled in the art.

Most people's busy lives have little time to share their thoughts and experiences with all of their friends and loved ones. Not to mention the additional time required to generate a multimedia post that presents and says exactly what is intended, in an aesthetically pleasing way. Because this is a difficult hurdle to overcome, many find it easier to fall back on the standard practice social media platforms currently offer. The Family Archive embodiment offers a new way to efficiently create, share and preserve content, including tools and templates to guide and document meaningful content in a visually pleasing format—resulting in posts comparable to colorful magazine spreads. For users this will stimulate much more desire to share, much more creation and freedom to express, stronger connections and relationships and posts that want-to-be-shared presently and the option to keep for later generations.

The Family Archive may be a permissioned access network or possibly a self-contained intranet, operating on a robust template-based platform. The platform has intelligence (e.g., soft computing, machine learning, learning theory, evolutionary computation, image processing, data mining, natural language processing, fuzzy logic, neural networks, swarm intelligence, Artificial Intelligence, probabilistic methods, etc. and may be referred to as Wizards) working in the backend that enable a near effortless learning-to-use for newcomers. Using graphical or VR/AR features, the Family Archive is based on a House theme because it is a common and familiar place to live, while Rooms named in the House are separate categories for reading and posting content. A main room, e.g., the Main Living Room, is the main working space (e.g., desktop) from which to read internal emails, alerts and enter other rooms.

One purpose is to create a platform that prompts users (also referred to as members) to upload and post content about their important current events and current goals as well as memorable content from the past. The results of their posts will look like well-designed colorful magazine spreads or coffee table book pages.

Family Archive's template rich system is meant for free expression. The templates keep individuals organized with less wondering what to write about and say, coaxing more story details thereby guiding members for more on-point description and explanations. Templates are guides that make for success in posting content-rich published-looking posts.

Writing topics and suggestions can be made by the system. The system intelligence draws from member profiles and posts, looking for clues and offering suggestions for members to consider writing about. Examples of cross connections include job experience, projects, travel, cities, towns, places, gatherings, church, and accomplishments to name a few.

A reminding and prompting feature or tool may be referred to as "the Wishlist" and is a significant part of the Member's experience while logged into the Family Archive. The Wishlist is an intuitive prompting feature reminding members to post content to their desired topics or categories.

Users of the Family Archive may be in a self-defined community e.g., of family and friends. The Member's user experience is graphically enhanced and may be a fun environment. Users start by choosing an online-identity known as the House (i.e., a virtual building). System intelligence assists in creating colorful rich postings of stories, pictures and life events. Posts in the Family Archive may take a little longer than empty superficial fast-paced Social Media sites are currently designed to do. However, the rewarding outcome of a Family Archive post should encourage Members to keep creating and sharing more content.

The House is located in a local community defined by the member and a broader community made up of all Family Archive members and registered users. The House is a member's identity throughout the system. The Main Living Room UI in the House becomes the main working area from which to receive Family Hall chat and bulletin alerts, read internal email, search Member's own and master indexes, edit My Community preferences, select Member's Desk for settings and Vault options, post in Showcase Living Rooms, and navigate to other rooms in the House. Rooms are considered categories and each room is a separate defined category with unique rule-sets to post and read posts in.

A Member's Main Living Room may contain a graphical Desk, or other virtual representation, that is the navigation or control point. The Desk is where a member updates their profile, searches the Index, accesses the Vault and changes Settings. The user experience may provide a personalized touch. Members can choose the style of their virtual building or House from an available list of predesigned templates. Modern, Traditional, Asian, Rustic, Brown Stone, East Coast, West Coast are a few examples. They may also choose from a bases of Color Pallets and system Fonts. Post designs may be based on the House theme. Reading another member's posts may be based on the House theme of that Member.

The virtual building or House, and the Member's Main Room or Main Living Room, (e.g. the identity and UI) in the Family Archive is where the members create posts, open internal email and read other members' posts. The Outside Rooms may be open to members via the world wide web (i.e., anyone anywhere, after signing up, can read and post in such "outside rooms"). So, the Family Archive may be divided into two communities: A personal secure member defined [family, friends] closed-community with controlled access; and a system community organized as 'outside the house' rooms, where other members can access designated content under controlled rulesets.

Each post is initiated via a posting template, that draws from Setup information e.g., filled in at the beginning of the Signup process. It then will automatically use Prompting Tool information (aka "Wishlist") to further fill in information, all coordinating in unison with what is submitted or entered in the Uploading Template. There may be plenty of user information already entered for every post being initiated. The way of creating a post in the Family Archive system, is a progression of pre-entered information at different times and stages. Much of what the intelligence (e.g. Wizards) is about is to make the process of creating beautifully designed posts easy, relevant, and efficient. The intelligence draws from member profiles and previous posts, and offers suggestions via the Wishlist for future posts.

Posting templates are tools to help members create excellent posts, created with the aid of system intelligence (e.g., software algorithms, machine learning, AI, etc.). Tick boxes and content fill-ins coax members to add times and dates to the content (e.g., photo) where appropriate. Essential writing rules may be applied: "Who, what, when, where why and how?" The basic journalistic rules may be built into the posting template in a step-by-step sequence enabling the member to properly recollect the event to be posted and archived. Posting templates are meant to guide members along the creative process with the satisfying result of producing visually pleasing and interesting posts.

Several of the system's elements coordinate together in the background making it easier for members to create posts more efficiently and quickly. Beginning with a member profile, the system (e.g., via the Wishlist) interprets some user input to aid suggestions to place in the Wishlist. The posting template may work with the Wishlist intelligence and draw from the user profile, previous posts, member answers to set up questions, and Upload Template inputs to assist users during the creation of posts, assuring pertinent information about the post is included.

Linking and sharing with others may be a focus of a Family Archive membership. The saying goes "Every picture tells a story." This platform takes that a step further facilitating members to tell stories about their images in their own words. The stories guided by the posting template may be in the form of a well composed description or a long essay. Members wishing to post shorter descriptions may be reminded about the significance pictures hold for future generations.

Images taken today often end up in a proverbial box for future generations to wonder "Who is that and where are they?" Photos taken today are mostly with mobile phones. Where will those photos end up ten, twenty, or thirty years in the future, will anyone see them or care? Yes there will be a date and location on many of them, but no further information so sorting through thousands of photos will not interest many people in the future.

Looking at old photos is fun and interesting. The fashions of the time, cars they drove, and the architecture of the buildings all lend to the fascination of admiring times past. Traditionally many families throughout the world have a storage box of old photographs. The images are a treasure of ancestral delights, showing relatives in various poses at places unfamiliar. But the photos may be a mystery leaving us with many questions about who is in them: when were the photos taken, and where are the places the images were taken or what was the occasion.

The Family Archive is for people to have easy-to-use and fast tools to share content including current and past events, experiences, perspective, and memories. The Posting Template includes intelligence to lend a guiding hand to post stories, photos, and videos. Living in the digital age creates the opportunity to make photographs come alive. With Family Archive, rich and meaningful descriptions will accompany images, eliminating any wonder from those looking at them later about "Who is that and what was the occasion?"

As discussed, the Family Archive may be a permissioned and/or private network in that it is an independent and secure website content-sharing community. All features, search engines, email client, member content may be contained inside the realm of the Family Archive citadel. The nature of the Family Archive is to be a safe and secure realm for all member content.

New users or members in this platform may be required to fully register through a multi-step setup process to receive a member ID that will enable access and use of the secure network. Fully registered members may be charged a subscription fee, and various memberships levels may require different fees or no fees at all.

With reference to the flowchart in FIG. 1, the system and method may include various steps or features in any combination. For example, the creating, sharing and archiving networking system and method may include: maintaining 10 profiles for a plurality of users each having an account on the archive and networking system that stores and displays user-authored content posts that are quality controlled for each of the users; generating 12, for each user profile, a virtual building (e.g. House) configured to be displayed via a graphical user interface, and including a main room (e.g. Living room) and a plurality of sub-rooms H1-H8 each being associated with a respective category, and wherein the main room provides navigation to the sub-rooms; generating 14 the user-authored content posts for each of the users via posting templates that include template guidance associated with each category for quality control and are configured to prompt a user to input and organize various content, including written text and audio/visual media; and maintaining 16 a prompting tool (e.g. Wishlist), operating within the virtual building for each profile by displaying prompts within each of the sub-rooms and related to the respective category, and comprising a prioritized list of user tasks including creation of user-authored content posts, completion of incomplete user-authored content posts, and/or reading of posts of other users. In various embodiments, maintaining 16 the prompting tool may include displaying selectable options to edit the prioritized list of user tasks by the user.

In various embodiments, the system and method may include maintaining 18, in the networking system, a Vault configured to securely store users' uploaded content including documents and audio/visual media. The users' uploaded content may be securely stored in the Vault and is private to only the user and authorized other users. The Vault may include a time-lock component configured to lock a user's designated post for future posting to the user's profile based upon at least one of a date, event and condition. The Vault may include a title-transfer component configured to transfer control of a user's profile and associated virtual building and content to another user based upon at least one of a date, event and condition. All of these are for use in a member's posts currently being created or not yet created. The Vault may have other features besides storage. For example, the Vault includes a UI that may navigate to various features of the Vault such as the Uploading Template, Time Lock, Vault Index, Title Transfer, Password Storage, Hall of Records, Return to Living Room icon. The Vault index is searchable, it is a list of all of the member's uploaded content that is located in a content storage section of their vault.

In various embodiments, the method may include maintaining 20, for each user profile, a community of other users who are selected for profile access by the respective user, and maintaining 22, within the networking system, a posting access classification component configured to provide access to user-authored content posts based upon a network classification, a community classification and a private classification that are selectable by the user, per user-authored content post, within the posting template.

Maintaining the Vault may include only receiving 24 users' content via uploading templates to store the content for later retrieval by the user via the posting templates. The system and method may include providing 26 reading templates that are category related for reading of content posts of other users.

Further details of various features of the computer implemented network system and method for creating, organizing, sharing and archiving content will be described below.

Intelligence/Wizards

The system Intelligence (e.g., soft computing, machine learning, learning theory, evolutionary computation, image processing, data mining, natural language processing, fuzzy logic, neural networks, swarm intelligence, AI, and/or probabilistic methods, etc.) may be referred to as Wizards in the description herein. Wizards are rulesets built into each Room/Category and are the backbone of each of the system's Templates. Wizards tend to the details, the chores of remembering particulars when writing and file naming of posts. Wizards are central operating components that enable members to flow easily along when creating new posts, reading friend's posts and uploading new content to the vault for future posts.

Another useful and important job Wizards perform is making connections based on other member's posts. Whether cultural, subject based, periods of time and or places lived, for example, the Wizards help connect family, friends and [outside community] new friends together. Wizards could be said to have "intuitiveness." Guided by the Wizards, Member's no longer have to navigate pull down menus and no longer struggle to search and create.

An intuitive system that is friendly to users may be based on the backend power of software/hardware, the intelligence and the information retrieval and search engines. The optimization of templates for creating and uploading unique, meaningful, and beautiful posts, and for reading and organizing unread posts, is a big part of the unseen backend or background work being performed by the system. Suggestions could be taken from the User Profile, questions answered during the signup/setup process and various posts posted by members.

From the beginning the system collects member input about personal design and user preferences. The system extrapolates information from the user profile. The Wishlist utility will prompt new members to create and prioritize a list by category of desired posts or stories to tell. Suggestions could be taken from the User Profile. The uploading template may also work in concert with the Wishlist and prompts the member whether to tag the new content accordingly.

House

The Family Archive is theme based on a house and organized with rooms, making the navigation system simple and easy to understand. Learning how to use the system and create viable content is as simple as walking from one room in your building or House to another. As discussed, the system is built on a virtual building or House theme. A House offers familiarity and conformity that new members understand and provides a level of comfort and security. Other structures and environments are also contemplated.

The House theme is for familiarity, organization and ease of navigation. A Member's Living Room may include various primary features including their User Interface, an explore point (link) for their member defined community, and an explore point (link) for the entire Family Archive community. Just as in real life, the House and House theme reflect the member's identity, contain their most precious content, and provide access only as allowed by the member. There is safety and comfort. There is familiarity. Each room (category) may be further customizable and provides the structure, organization, and access for content. The system automatically assists and creates magazine style layouts for posts, and the layouts are based on the chosen House theme by the member.

Family Archive emphasizes persona, developed on a real-life theme of a House in a community that is surrounded by the outside world. The fortification citadel of a member choice community is a safe haven for precious works of every member. The start of a member's experience is choosing the design and color of their House. The House and all of its individual rooms (and associated U Is) will blend tastefully according to the design theme chosen during the setup process. All Posting and Reading Templates may automatically adhere to the chosen House design theme. A theme is the member defined look of his House and all room desktops. A theme can be changed in the Desk Settings. The chosen theme of the House may define the template overlays of a member's total experience in the system.

So, each room of the building or House is intended to be a separate category. Creating posts in each room (aka "a category") organizes and structures the experience so that Members do not have to spend time being frustrated about knowing where to find control features like posting template, reading template and back to main living room icon, which are preferably in the same easy to find location for each room. Category/Rooms also help with efficiency in finding their posts or other Member's posted content. The Theme further enhances the user experience tailoring a unique user-choice-look to their online world. This platform allows a member to contribute and shape, thereby building, on their experience and unique look, making their personal platform enriched and full of value over time.

The totality of a member's content is contained in their building or "House." The House address is assigned by the system and may not be changed by the member. This House address is also used as the Member ID. The Member Username, created by the member during setup, is then linked to the House Address (and Member ID).

The House address (member ID) and the username are associated with the Members House and all content contained therein. To log into the system after entering username and password, the member will be shown their house (a design of which they chose) illustration. The member may select a front door of the House that will take them to their main UI or Main Living Room Desktop.

A Family Archive Mobile App may be a useful tool for the Family Archive. The Mobile App can be considered an extension of the platform. Creating Posts using the App instead of a Desktop/Laptop computer may be an option. All the system functions and features will work in App form.

Family Archive is very graphical in nature, and the Touch Screen features of a mobile device will work well.

Navigation

Figure 2:
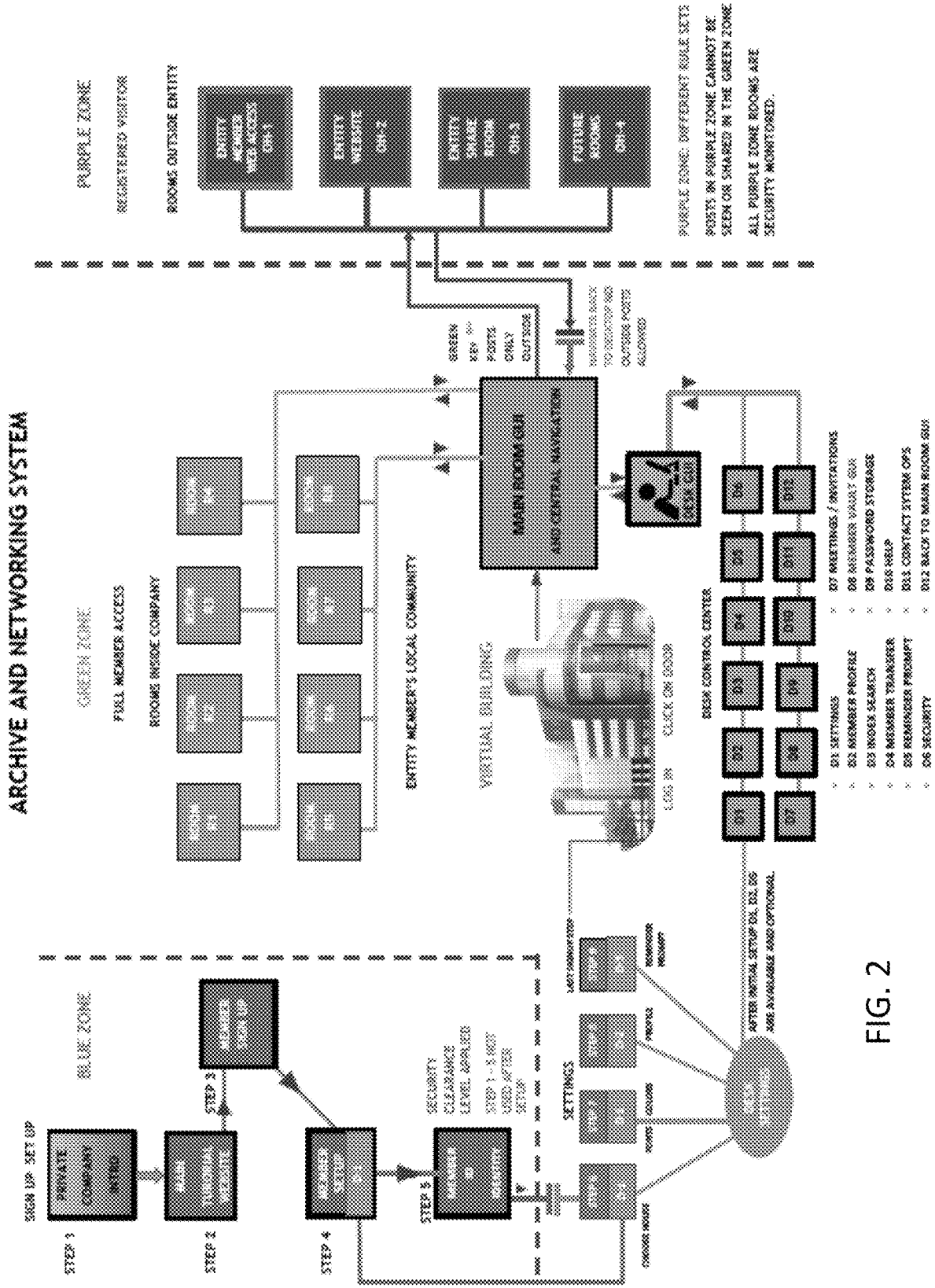
FIG. 2 is a schematic diagram illustrating features of the networking system configured for content-creating, sharing, and archiving, in accordance with features of the present embodiments.
Figure 3:
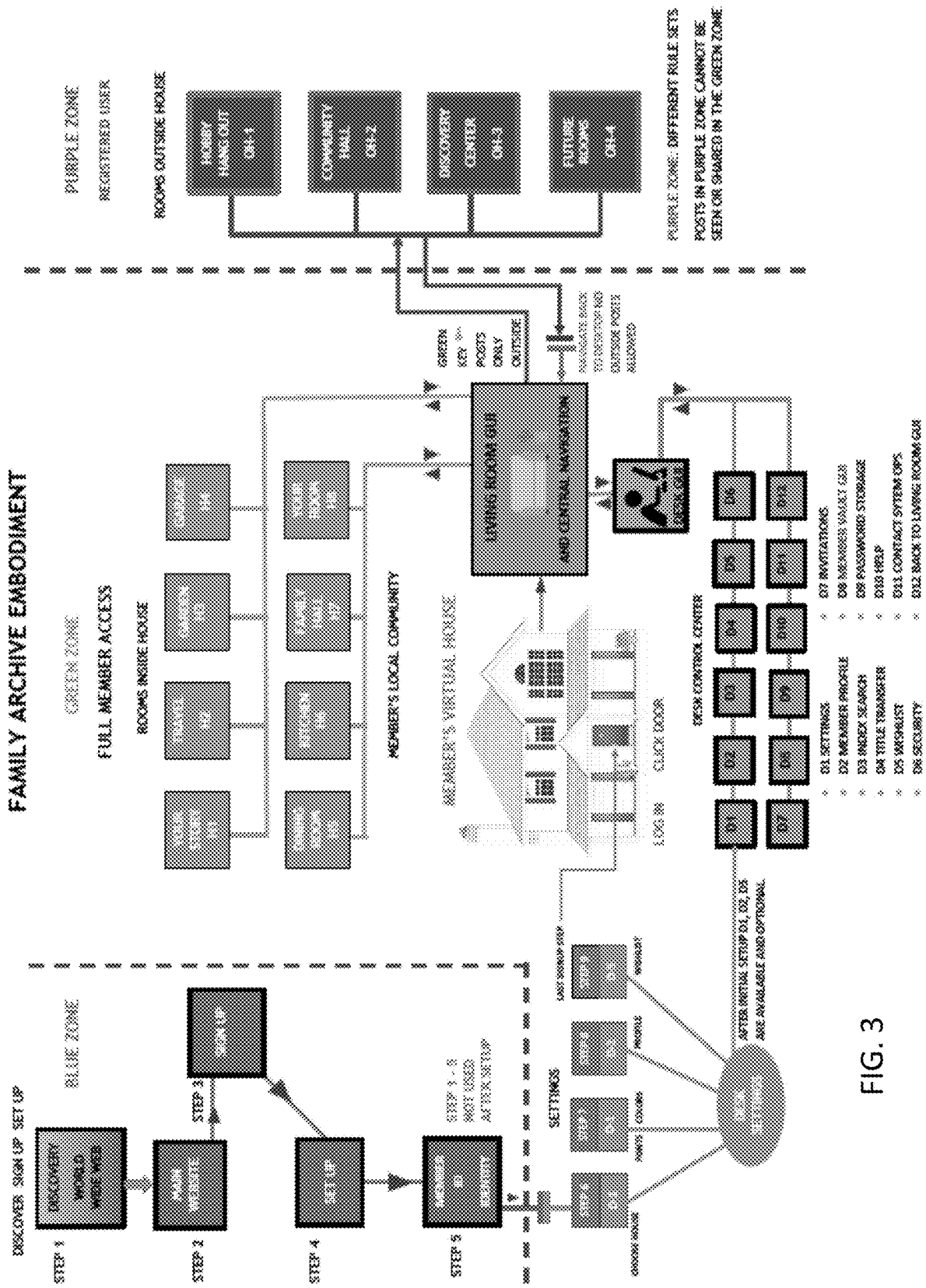
FIG. 3 is a schematic diagram illustrating features of the Family Archive embodiment of the networking system.
Figure 4A:
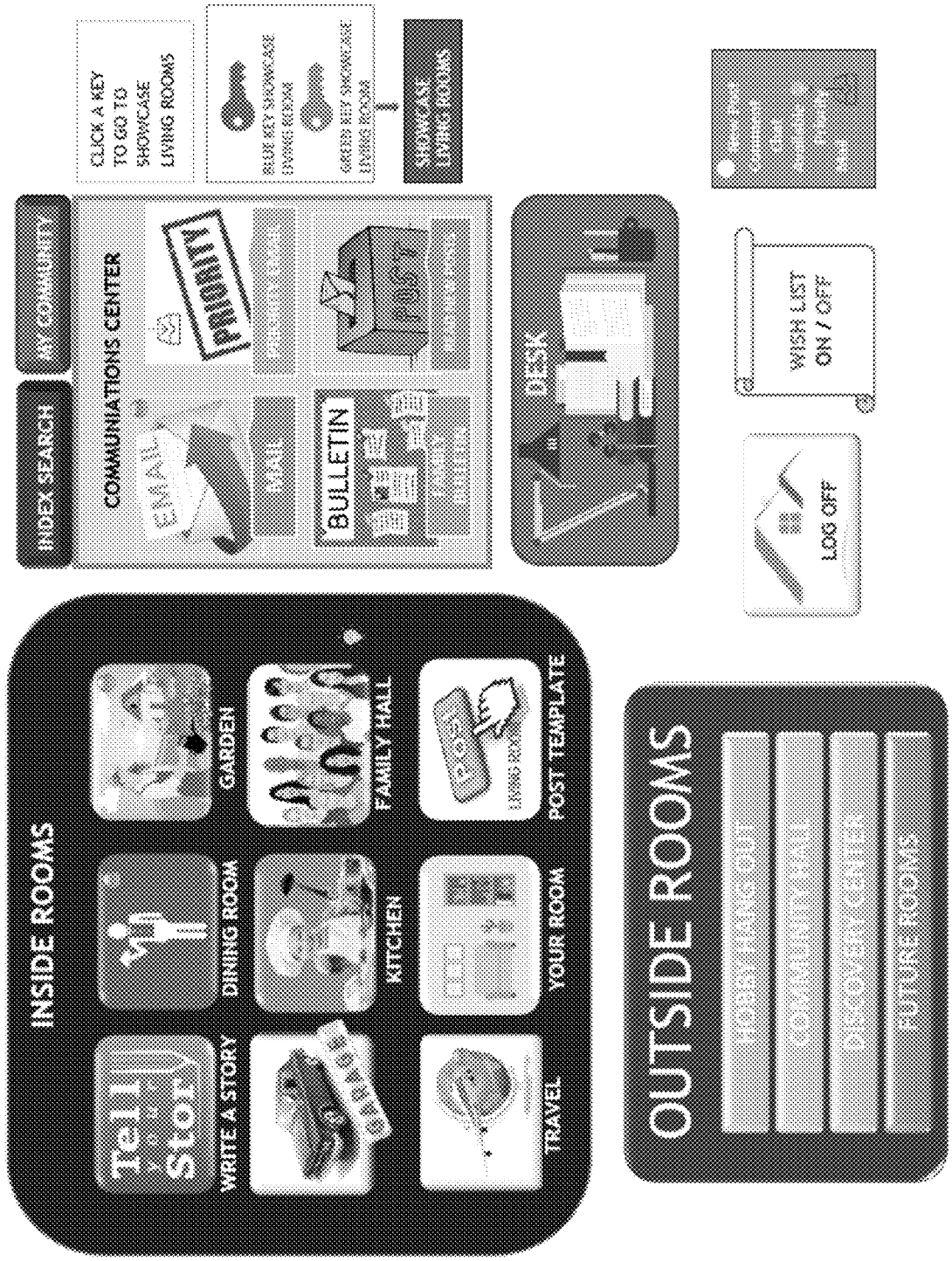
FIG. 4A is a schematic diagram illustrating an example of a UI for the Main Living Room within the system of FIG. 3.

Referring to FIGS. 2-4, some components of a Company or House may include UIs such as graphical or virtual representations of an Office, Lab, Studio or Living Room, for example. The House is a member's Identity as recognized by the system and by others in their community. There may be three versions of the Living Room UIs with one of them being seen by the Member to use as their Main Living Room or UI, for example, as shown in FIG. 4A. When other users from within a member's community, and those outside their community, visit a member's Living Room, referred to as Showcase Living Rooms, they may be shown a modified or alternative Living Room version, depending on their connection to that member. For example, a user may see a Blue Key (member selected community share) Showcase Living Room, or a Green Key (for Active Members) Showcase Living Room as will be described below.

Inside Rooms (e.g., R1-R8 in FIG. 2 or H1-H8 in FIG. 3) may have GUIs. Rooms are individual categories. Each Room has its own rules governing it and may be considered to be an individual space, in which to post and read content. Navigation to each Room is easily found and is preferably located in the Member's Main Room (e.g., Office or Living Room).

A control center (FIGS. 4A and 5) may include a graphical or virtual desk with selectable features (D1-D12). Each Member's Main Living Room (i.e., Main Living Room UI) has a Control Center, which may be referred to as "The Desk." The Desk includes various selectable features, and Members may be in complete control of their Settings, Member Profile, Search Index, Title Transfer, Wishlist, Security, Invitations, Vault storage including uploading template, Password storage, Help and System Operations Contact, as illustrated, for example.

Other UIs may include a Vault (D8). The Vault is a feature rich component in the Family Archive system. Navigating to the Vault is from the Living Room Desk. Once the Vault icon is selected or clicked, the Vault UI appears on the member screen. The Vault is where a member uploads all of their media and document content to be used for posts. All member content is stored in the Vault. Other Vault features may include Hall of Records, Time Lock, Vault Index, Title Transfer, Password Storage, and Reading templates (which may have a unique design for each Vault feature).

Outside the House UIs (OH 1-4) are outside the confines of the member's House and are located within outside rooms. These outside rooms are for meeting and interacting with members outside of the member's private community. These Rooms may include Hobby Hang Out, Community Hall, Discovery Center, and/or Future Rooms (not yet defined). Each of the Outside Rooms may have their own rules for exploring, posting and reading templates. They are meant for active exchanges and discovering the fascinating content other members are sharing Community wide. These rooms are meant to be free access and/or may be monetized.

Main Room/Main Living Room/Showcase Living Rooms

So, the Primary UI (FIG. 4A) is in the Main Living Room and is the member's area on a graphical or virtual display, for example, in which selectable icons are arranged. It contains navigation buttons taking the Member to other rooms and serves as the Member's control or navigation center point. After logging into the Family Archive system (e.g. via a web application, website, mobile application, etc.) and, for example, clicking on the front door to begin a session, the Member is immediately placed at the Main Living Room. From here the Member can control their entire online experience. Alerts, bulletins, index search and internal email, are available at the Main Living Room UI.

Similar to an occupied domicile, we often invite family and friends to come over to our House. In the Family Archive community, Members have and control two additional Living Rooms, called Showcase Living Rooms that are not control centers but rather they allow other members to explore and visit without invitation. Again, the three living room UI displays are preferably: Member Primary Desktop (e.g., GUI), aka Main Living Room, including Control Center, Mail, and Alerts; Blue Key Access Showcase Living Room—Intended for Member's own defined community; and Green Key Access Showcase Living Room—Intended for Active Members, Outside a member's defined community. The Member can create posts in his/her Showcase Living Rooms intended for family/friends and outside members who explore other member's houses.

The look of any Main Living Room or Showcase Living Room may be customizable using predesigned templates that the member chooses during set up. Whatever House design the Member chooses will define the look of the living room. Hence a Japanese style home would have a corresponding Japanese style living room. The only time this design parameter changes is if the member decides they want a different looking House. For example, if the Member switches to Santa Fe New Mexican style the living room will then reflect the change to Santa Fe.

Member's Main Living room UI typically includes navigation choices to other rooms and may be available by selecting any icon (e.g., FIG. 4A) designated for a given room. Family Archive may, or may not, include the use of pull down menus. The illustration in FIG. 4A is an example only. Rooms inside the House may include: your story; dining room; garden; garage; kitchen; family hall; travel; and your room. Rooms/areas outside the House may include: Hobby Hang Out; Community Hall; Discovery Center; and Future Rooms, for example, as illustrated in FIGS. 3 and 4A. All rooms inside and outside the house, including Showcase Living Rooms may include a "return to Main Living Room" icon provided for active members to get back to their own Main Living Room UI.

As discussed, Members can choose the look and style of their House, thereby changing the overall look of their desktops and all posting and reading templates. However, the underlying elements that make up the desktops and templates may not be changed. In FIG. 4A, the Communication Center of the main desktop Living Room of each Member may contain the following elements: Email, compose/read; Priority Email, Alert that important Email is in; Bulletin, select to read family related bulletins; Post's alert and read new posts created by Member's self-defined community.

Index Search may be available near the Communications Center for consistency. My Community is a list of others in the Member's defined community. Clicking on any member's listing may bring up options to email, chat, or see posts in their House. Every Member's Main Living Room UI display may include the Desk icon (e.g., see FIG. 4A). The Desk Icon leads them to their Desk UI, the System Control Center (FIG. 5) for their entire user experience on the System.

FIG. 4A includes a Log Off button for logging off of the system. In the system Control Center may be options included for automatic logging off of the system. This is for security concerns. Automatic logging off will provide a setting so that non-use of the system for a given time will automatically shut down the program or log off, as would be appreciated by those skilled in the art. FIG. 4A also illustrates a selection for the Wishlist prompting tool. Members may choose to activate or deactivate the Wishlist during their sessions.

Exploring another member's House is encouraged. Story posts and pictures of objects that have short descriptions may be placed around a Showcase Living Room UI. Family and friends (and persons outside a member's defined community) may explore the Showcase Living Rooms. The purpose is for visitors to discover another Member's House. Showcase Living Room posts are showcases and meant for other member's spontaneous visits. Posts created may not belong to any other room of the House.

There may be two kinds of Showcase Living Rooms available for selectively sharing member posts. For example, Blue Key Living Room [member's self-defined community] and Green Key Living Room [Active members] are available for posting. Members can choose each of the two Showcase Living Rooms to post items such as: story posts; pictures of objects to place around the Showcase Living Room (can be connected with a story post); and Video and or Sound files, for example.

Member's creating a blue or green key Showcase Living Room may choose from pre-designed templates based on the style of the House design they have chosen in Settings (D1). Each Showcase Living Room may have its' own posting template for editing and posting of any content. The template is brought up by clicking the Post Template icon located on the Main Living Room control UI. Easy-to-use mechanisms for placing an object anywhere in the room will be facilitated for the member. All Showcase Living Room post uploads may use the Vault's Uploading Template (D8).

The Blue Key Showcase Living Room sharing level is within a member's own community. Family and approved friends that are in the Members self-defined community can view items seen in the living room and read posts. This access is available without invitation. Another way for a member to see posts contained in this living room is from an alert sent to their mailbox. It is the choice of any member whether or not to send post alerts to all, or to a select a few or one person only. Full Access Members not in another member's defined community, can view a Blue Key Showcase Living Room by asking permission (via email), or by invitation sent by the House owner of the Showcase Living Room.

Figure 4B:
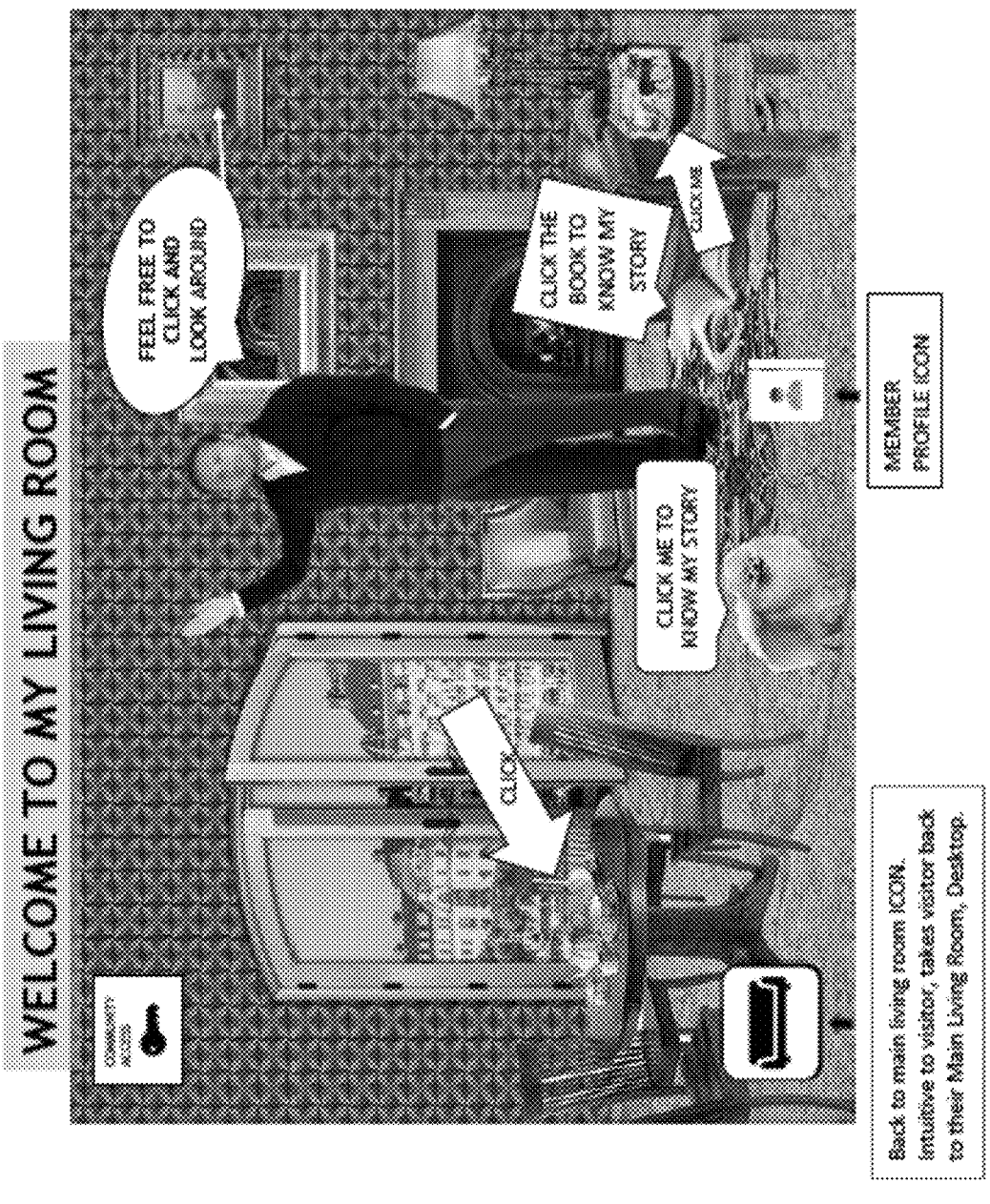
FIG. 4B is a schematic diagram illustrating an example of a UI for the Blue Key Showcase Living Room within the system of FIG. 3.

Since Showcase Living Rooms are not private as with the Main Living Room U I's, visiting members may not be allowed, nor do they see, the Desk icon and any of the Member's control panels and alert Icons. Although they share the same name, Showcase Living Rooms are for visitors and are not a member's control center. Where the Main Living Room UI is the control and navigation point, it is private to the member. The Blue Key Showcase Living Room display (e.g. as shown in FIG. 4B) is a graphical view of a Member's Blue Key Showcase Living Room, for showing selectable items, pictures and posts.

Figure 4C:
FIG. 4C is a schematic diagram illustrating an example of a UI for the Green Key Showcase Living Room within the system of FIG. 3.

The Green Key Showcase Living Room sharing level is for all Active Members of the entire Family Archive system. The Green Key Showcase Living Room (e.g. as shown in FIG. 4C) functions the same as the above mentioned Blue Key Showcase Living Room, except the viewing access to it which is open to all Family Archive Full Access Members.

Green Key Showcase Living Rooms are meant for exploration, including seeking out and sharing content with new members. As the system builds memberships, so will it make connections in common with each other's interests and proclivities. Posting members may choose to leave their CV's and personal writings and opinion pieces here.

Non-sensitive photos and videos can also be placed in the Showcase Living Rooms. There may be options in Showcase Living Rooms to leave the owner a message and to ask to become a member of his community. Showcase Living Rooms are often found by members via Outside Rooms such as Hobby Hang Out, Discovery Center, and Community Hall, and through system initiated connections when common interests/experiences have been identified.

The two Showcase Living Rooms may have their own posting templates and are: green key access level, and blue key access level. These Showcase Living Room posting templates may be an important utility for Members to post and show various aspects and personal essentials attributed to their life.

The Living Room Posting Template icon is accessed in the Member's Main Living Room UI control panel, for example, in the section titled Inside Rooms (See FIG. 4A). Selecting the Living Room Posting Template icon may offer a choice whether to post in the green key, or in the blue key Living Room. The Main Living Room posting template is similar to all posting templates as it may be adapted according to choice and situation. Therefore, the posting template for a Green Key may offer the member choices for less personal non-private life events. The Blue Key posting template may be similar to the Green Key template except it is more personal and private to a member's defined community.

Stories, profiles, photos of people and objects, videos, scans or any other items can be posted in a member's Showcase Living Rooms. Inputting any of the above listed items to the posting template, may necessitate adding some simple or detailed descriptions and a name or title of the content being posted. When the post is complete, a pointer may be presented to the member enabling them to place the item, anywhere on the Main Living Room UI. Living Room objects, stories and items all have file names automatically assigned by the system intelligence. The template automatically files them in the Member's 'own Index.' That means each post no matter the simplicity, for these Showcase Living Rooms, can be searched in the Member's own Index by category, subject, date and name, for example.

So, the Main Member Living Room UI display (FIG. 4A) is the first interface in the Family Archive network that a member sees after logging in and clicking the front door, for example. The Main Living Room UI includes a Communication Center, and is a navigation starting point. Mail Alerts and all incoming messages contained within a member's self-defined community and entire system at large, may be first seen as an Alert Icon. A number near the icon may indicate how many messages are available to read.

Mail may be sorted by category and prioritized by importance according to settings. Mail can be stored or deleted. Most mail is associated with posts or rooms in the form of questions, comments, suggestions, and personal communication. In addition, mail can be in the form of Alerts from members' invitations to see one of their posts, or other forms of invite to actually meet in person. The invitation template feature of Family Archive helps members compose invitations to meet others in-person for events. R.S.V.P. and detail-notes may be a part of this feature.

Family Archive Email is not traditional email, it is community based. All email in the system is composed, sent, received and viewed only within the system. Email cannot be shared, sent or composed outside the system. No connection to traditional mail servers like Google, Yahoo or Hotmail are available.

Navigation includes pointing and clicking on any icon in the Member's Main Living Room that will navigate to other places in the House or to the Desk display. Once away, a return to Main Living Room selection may be present on any other of the Member's rooms or areas, leading back to the Main Living Room.

Help may be an element and is fluid throughout the system. Floating the mouse [hovering over] any system designed element or component for more than a few seconds without clicking the mouse may bring up a description or explanation of the object, for example. Choosing HELP in the Desk's Control Center (FIG. 5) and typing a key search word may also be available for member's who need guidance.

Desk/Control Center

Figure 5:
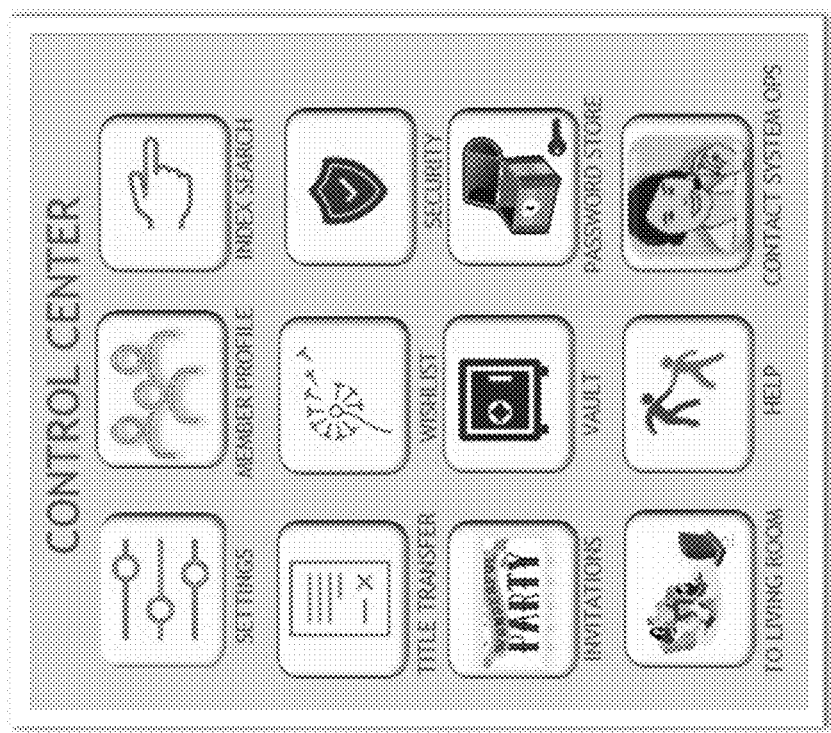
FIG. 5 is a schematic diagram illustrating an example of a UI for a Control Center of the main room of FIG. 4.

The Desk Control Center may be thought of as a dashboard. The illustration in FIG. 5 is an example of the Member's Control Center and these icons are accessed from the Desk found in the Member's Main Living Room. The Desk may be in a specific easy to see location. The following describes each of the Desk Control Center's icon choices, and the descriptions follow the System Platform diagrams (FIGS. 2 and 3) using designators D1-D12.

Settings

Settings D1 is a control center similar to the gear icon found on many websites. Clicking the Settings icon will enable the Member to edit D1 and make choices for House style, themes, fonts and colors.

Member Profile

Member Profile D2 will capture information from the Member's Profile set up process. Should the member wish to share some added Member Profile information to that of his personal community, the member can set access levels to various sections of his profile. For example, the Member may choose to write a less detailed summary for Green Key Level access, and then choose to write more extensive details for their Blue Key [user-defined] community. It is noted that the Member Profile page differs from Your Story which does not necessarily have to be about the author. Member Profile is focused primarily on the Member's life and work. The Member Profile is something encouraged by the Family Archive Community.

Index Search

The Index Search function D3 of the Family Archive Community website is similar to other websites. The Family Archive entire system's Index and the Member's 'My Index' may be queried via the search engine. Every post a Member creates may be categorized and hashtag-enabled thereby allowing search to find specific items and details of a particular member they may be seeking.

The Index may include a list of all Full Access Members and their posts. New members are automatically placed into the Index by the system during signup when the new Member obtains their Member ID (e.g., Step 5 in FIGS. 2 and 3). Members that have not renewed their membership may have an inactive [greyed out] listing in the Index.

Only a Member's House address and Member username, and the title of all their posts may be listed in the Index. Customizable searches are available to the member. Other customizable options are to search for members located in a city or country, or members that belong to a hobby or have posted in Kitchen, for example, or any other room. With the power of databases, the master Index will gather data and grow into a powerful search tool and be a valuable asset to advertisers as well as monetization applications.

A member may perform various functions in the index, for example: search only for members in his/her community with any of the criteria listed below; search the whole Family Archive Full Access Member Network; search for specific posts; search for subjects and categories; search for members matching defined criteria; search for all Members with Blue Key and Green Key level access to their posts; search photos and videos matching defined criteria; request access from a member to view their blue level post; search for histories, event posts occurring within a certain date range; search for alerts and bulletins by other members.

The Master Index lists everything that is ever uploaded or posted encompassing all of the whole Family Archive network. All listings in the master index are selectable. If the user is in the same community as the author, the user will be able to open up and see the post. If a user clicking any link in the Index is not a member of the authors defined community, the user may select the listing, that may automatically pop-up a request or email template. This email template is intended for at least one purpose, to ask permission of the author to see a post. The author can reject or block requests or grant permission to the (outside his community) user to see the post.

My Index, on the other hand, is a member's own private index that is specific to their own content. All the ways to search and explore using the Index are available to a member's own personal House for easy retrieval. My Index refers to all content ever created by a given member and is listed in the confines of their House. My Index may draw from all rooms the member has posted in, as well as their Vault. This is useful, less complex and faster for organizing and retrieval of uploaded content.

Title Transfer

Title Transfer D4 is an ownership handover and allows members to assign their accounts to other members or to those that are not Family Archive Members in case of death or other event. Called a "Trust" the assigned member would have full access rights to the giving Member's House. All passwords and digital content, plus all Vault content are a part of the handover. Members may spend considerable time and thought creating posts and do not want them expunged automatically from the system should the member be debilitated or become deceased. The Title Transfer is a way for the member's content to continue.

The icon choice "Title Transfer" D4 is located on the Desk Control Center and may concurrently be accessed in the Vault's UI. The parameters for the Title Transfer assignment may be held in the Member's Vault D8. It may be for convenience purposes that the "Title Transfer" button may be located in two places. This Title Transfer option may generate a template with easy to understand choices to send an agreement to any person in order to grant full access to the giving-Member's account, normally under certain conditions.

Wishlist

The Wishlist D5 or Prompting Tool is a listing of objectives to accomplish, providing reminders at appropriate times. Other descriptive names for the Wishlist that may be used are: Prompting Tool, Reminder Prompt, My Prompt, Remind & Prompt, and Auto-Reminder Tool, for example.

The Wishlist is a list of category based items the Member wants to accomplish. From the Main Living Room UI (FIG. 4), a member selects the Desk icon to bring up the Desk's Control Panel (FIG. 5) and then selects the icon for "Wishlist." The Wishlist Template appears on the screen.

The template may ask the member to fill in an item under a category of interest. Some people may not know what they want to list, so the Wishlist may extract some key-word information from the Member's Profile. For example, a member could have written about their hometown, or a place they grew up, they could mention their job or experiences that the system intelligence will pick up on and use to help fill in suggestions.

In addition to drawing from the member profile, the member could select suggestions. The suggestions window shows several samples of Wishlist's filled in already. Sample Wishlist's are generic examples that may spur the imagination. The member could choose one of them and initiate the example to open up the posting template in the room that was selected on the listing. These example lists may not be more than ten items total for each category, for example. The members may combine listings with the Wishlist's, keep or delete the examples, add their own listing thereby prioritizing all listings no matter how they were created. The category specific examples made by the system intelligence may be placed in the user's Wishlist (according to category) and is intended to coax the member to write about something they signified in their setup information and profile page.

The member fills in their list according to the priority they want to give it, under the category heading on the Wishlist. The priority aka "prompting order" may be set by the user. The system will prompt according to the priority, e.g., 1-100, reminding the member (e.g., by pop up window) at appropriate times to create or upload a post; e.g., this could happen at first login or when visiting a room.

Figure 6:
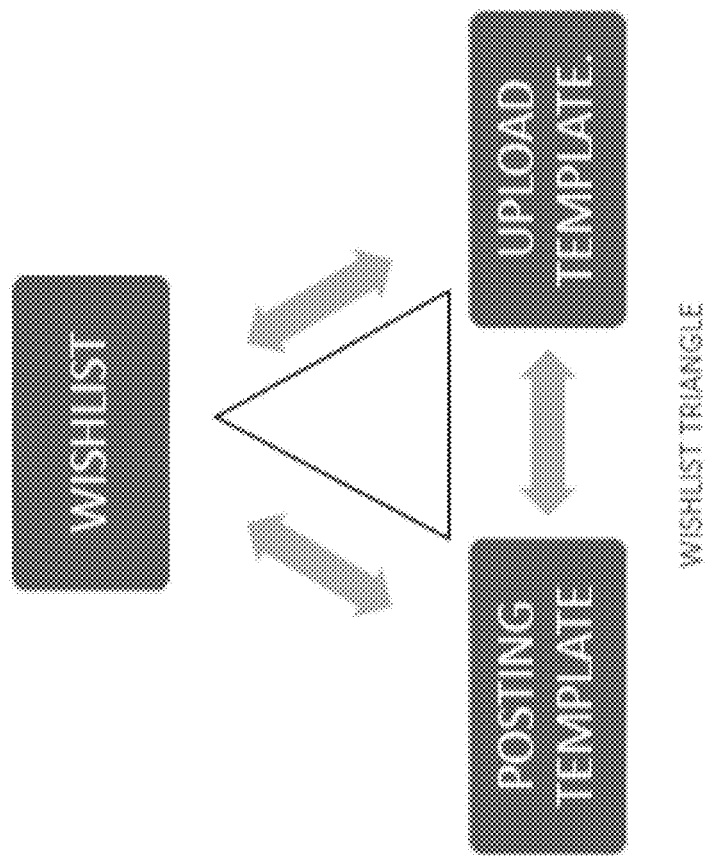
FIG. 6 is a schematic diagram illustrating the interaction of the templates within the system and method of the present embodiments.

With reference to the diagram in FIG. 6, the Wishlist triangle involves the uploading templates and posting templates. The relationship prompts, creates, and renews. An element may not be changed without affecting another element in the triangle. The Wishlist triangle shows how the Wishlist engine influences Family Archive's Wizard templates.

Wishlist is an intelligence Wizard, linked to uploading and posting templates, member profiles and content. Continuously analyzing member input to make useful topic suggestions.

The uploading template asks essential details about content uploads the member will store in the Vault to insert into future posts. One of the questions is, "what category [room] is this upload intended for?" The next question in the sequence will ask, "is the upload intended for any existing listing within the [chosen] category?" If the answer is yes, the member will click on the listed item—to join the upload with the Wishlist item. When the member creates the post, the system may intuitively ask the Member where to insert all or some of the uploads connected to the listing, into the post automatically. If the answer is "no" meaning, there is not yet a Wishlist listing for the upload, the member may write one into the Wishlist or choose not to at this time.

The Uploading template answered questions are interpreted by the Wishlist, some details of which, are turned into Wishlist topic suggestions.

Located in category rooms of a member's house, the posting template is opened by either choosing the "Post Icon" or selecting a Wishlist item. The posting template opens to start creating a new post. It fills in any previous information, that was entered during the uploading process. Names, dates, places are inserted into the new post's template. Editing filled in items are options for members, but assuming the post is related to the uploaded content, much essential information may already be inserted. The posting template is an integral part of the upload template and Wishlist.

The Wishlist is an intuitive helpful assistant, inspiring member sessions with useful topic hints to create new post content. Wishlist entries are both a member's and the Wishlist's Wizard inputting post topic suggestions. Members enter their own topic suggestions according to a category, which coincides with a room in the member's house. The Wishlist draws information from member profiles, upload templates and key words from member posts. As more content is created, the Wishlist may keep offering new suggestions. The Wishlist harmonizes with the uploading and posting templates, continuously learning and automatically updating more useful listing of topics.

Figure 7:
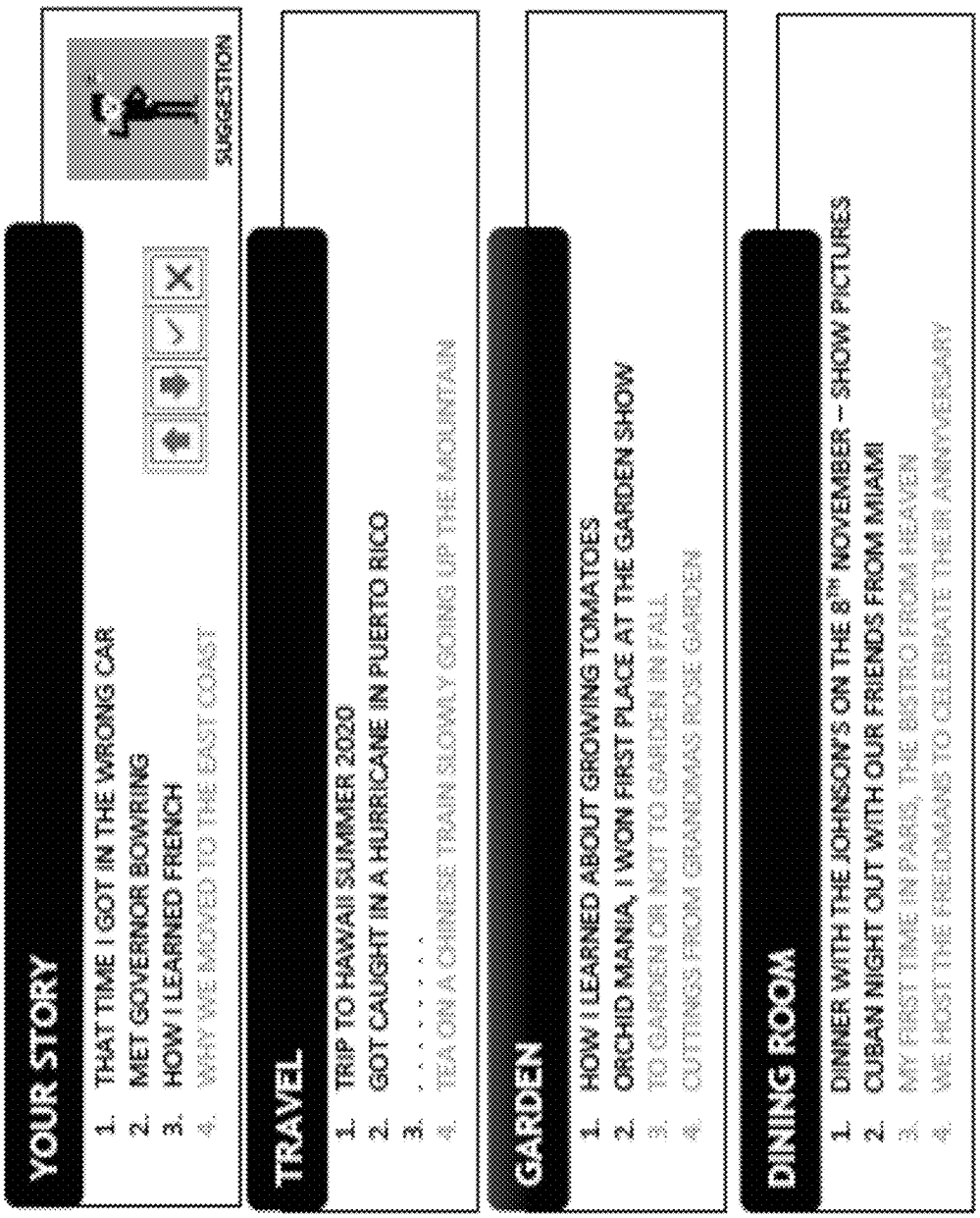
FIG. 7 is a schematic diagram illustrating an example of a Prompting Tool or Wishlist used within the system and method of the present embodiments.

Wishlist examples are shown in FIG. 7. The status of each goal/task may may be reflected in color, and user friendly techniques may be included for editing and navigation.

Prompts from the system to members go according to what has been completed and what needs to be created. If a member wants to change the order priority of any item on the Wishlist, it may be a simple drag and drop. An aim of Wishlist is to prompt the Member to post what is important to them.

There are many possibilities for the Wishlist, covering all aspects of life and brought to life in a myriad of ways. A member might want to create a post to preserve thoughts, travel, significant life events, opinions, recipes, hobbies, poetry, adventure to name a few. The post could include photos, text, videos, and scans of just about anything (art, menus, letters, concert tickets, . . . ). During the upload of content into the Vault [D8], the Member may be asked to tag the content to a Wishlist item.

The complete Wishlist is accessible from the Desk in the Main Living Room. Category specific Wishlist's may be accessible from their associated room.

The member can turn off the Wishlist any time, by turning it off during a session. The Wishlist control panel may have various options for prompting including None, Once, or more times per logged-in online session, for example.

Family Archive's template based system is for uploading content, creating posts, and reading posts in coordination with each other and with the Wishlist. The Wizards may make suggestions in the Wishlist by collecting information about posts the member has created and posts the member has read. The Wishlist engine may always be working in the background supporting members to post category specific content according to the room entered.

Each room or category, in a member's House and every template initiated by the system matrix, i.e., posting, uploading and reading templates, may have the unique assistant, Wishlist. The Wishlist encourages members to create new posts as well as read posts from other members.

The Wishlist may be integral to all reading and posting templates because they have an effect on each other. When something occurs as in a reading or a posting in one of them, the Wishlist picks up on that action which may affect the Wishlist's listing accordingly. It may grey it out, meaning it has been read, or add it to a category in priority order, or mark it off strikethrough and greyed out, sending down the list of the category denoting, work completed.

Security/Key Levels

Security D6 controls access and may be implemented as four different key levels, for example. These may include: Green (shared openly with all active members inside the private permissioned network) and the green key posts the author has also shared in the Outside Rooms, allowing both active members and registered users full access to them; Blue (share with member's self-defined community); Yellow (share with member's self-defined family in the Family Hall room); and Red (share with a few or no members). Security Keys are a way to restrict or grant access for members to view posts. The color names used herein are examples of a naming arrangement, of course other names for key levels are contemplated.

A post may not be completed and posted without assigning it a security key level. Each posting template may have selection options (e.g. tick boxes) to easily specify the security level since all posts by members are created with templates designed for each room. As discussed, rooms are another way of saying "category," e.g., Kitchen, Garage, Living Room, and Hobby Hangout. Each room/category may be defined with its own rule-sets which may not be changed by members. For example, the Dining Room H5 in FIG. 3, may be accessible to the member's self-defined community by default. That is to say it is accessible to member's assigned a Blue Key security status. Any specific post can be more broadly shared (green key) or more strictly shared (red key).

Each posting template may request the member to select a Key Level before the completion of the post. "What is the Key Level Access to assign to this post?" Choices may be red (private/select), blue (share with member's own community) or green (share openly throughout the Active Member Family Archive system). Of course, fewer, additional or alternative key levels may be provided for selection. Assigning a security Key Level Access may change the way the Index lists and enables access to any post material accordingly. The separate elements above work together to streamline a member's complete online experience when logged into the Family Archive system.

Red Key Level Access posts have an optional choice to add a password before the post is submitted for upload. The posting template may trigger an alert asking members to assign a Key Level. When Red is chosen, the system may prompt the member to write an optional password in the space provided. The password will be stored in password storage, and when the post is finalized, the system will alert the intended recipient to read the post and may be given the password for the post simultaneously.

Any Blue Key post means people in the member's community can read the post and do not need a password. The author of a post could choose to enable the post to be discoverable that allow registered users to be able to search for discoverable post listings, in the outside room index. Normally registered users may not see Full Access Member's post listings in their outside room index unless it is marked "discoverable." Discoverable posts are a listing only, permission to see it, is obtained when a registered user clicks the listing, that brings up an automatic email or message template to ask the author permission to see the post. Full Access members are typically searching for content to read. The purpose of Family Archive is to connect like-minded people together. The Family Archive environment uses Wizards to enhance discovery of posts created throughout the system using various key terms, tags, and categories.

The posting template offers an option to enable the post being uploaded to be discoverable in the Outside Room Index. The Index may be viewed by Full Access Members and Registered Users. A selection to allow discovery may not be activated by default. It may be turned on and is therefore a member option. Not selecting the discovery option may default to a closed post, meaning it cannot be found in the outside room index. This option may be changed at any time.

Members wanting to view a Blue Key post may request access via the message/alert system. The author can decide to accept or reject requests for viewing their Blue Key posts. All posts marked discoverable, may have an option to message the author of the post. Green Key Access are posts open to all Active Members. No password may be necessary.

The Showcase Living Rooms may have all active member access and member defined-community shared access, hence Blue and Green Key levels. There may not be red key levels for Showcase Rooms. Blue Key Level Access enables the post to be available to anyone in the member's self-defined community. Green Key Level Access enables the post to be available to all Active Members, but not Registered users.

Blue Key Level Access is user defined and allows the member's (self-defined) Community access to the post. By default, Blue Key Level Access is selected by the system templates for all rooms except outside rooms. The member can change any given post to another level in these rooms. By default, outside the House rooms are green key and are not user choice options. For all other rooms Green Key Level Access may be an option.

As noted above, assigning Red Key Level Access to a post limits access to individual members as selected by the authoring member. A password may be required and may be maintained within the member's Red Key Password Storage D9. Once posted, anyone granted access may be notified.

Blue Key Exclude may be an option that gives the member a choice to exclude certain members in their own community from seeing a post. A member's community could include relatives, friends, and colleagues, and other acquaintances. This exclusion option is available if the member wants to create a post for their community but exclude one or more individuals from the post. The default is to grant access to everyone in the community. The member can then de-select any of their community members.

Invitations

Invitations D7 is located as a function in the Desk. Invitations is multifunctional, giving members a choice for several types of invitations. Inside a Member's Community, the invitation purpose is a way to invite other members to an event or function. This invitation utility is also meant to get others to join up. Members can invite family and friends to become members by sending them an invite to do so. By asking friends and family to join, they automatically become associated with the asking member's defined community.

The Invitations template like all others within a specific room/category may begin by asking a question followed by a simple list of selections. For example, the questions may be "This invitation is for?" followed by choices that may include 1—Invite family or friends to the Family Archive; or 2—Send invitations to an event with RSVP replies. These choices may have their own rule-sets that enable separate task specific templates or features to appear.

To invite others to join Family Archive, the first choice to invite family or friends may be a simple template with an email fill in for one or as many people as the member desires to input. Sending an invitation outside the Family Archive matrix may be a special rule set. The Family Archive is a permissioned or private system. The Invitation option to invite family and friends may be an exception. Receiving a reply from outside email clients may only be possible via a special secure self-contained matrix intended for this purpose only. The emails sent and received may have to be contained or limited to such a special secure self-contained matrix.

An invitation checklist may be available that might include: dinner party; family reunion; graduation or other ceremony; picnic; coffee (a simple invitation to meet with one or a small group); funeral; road trip, camping or travel; or wedding.

Available to the member may be a full functioning invitation center with RSVP notices listing responses. The Invitation utility is a fully functioning tool to send others an invitation to an outside event or gathering. Having the ability to send an invitation for a dinner party, ceremony, wedding, funeral, picnic, family reunion, graduation and any other conceivable event is an add on useful tool. The invitation tool may assist members to compose invitations via invitation templates designed specifically for this purpose.

The templates may ask (for example): 1—What type of event?; 2—Venue of event?; 3—Date of event?; 4—Time of event?; 5—Participants must reply by [date]? With setting Automatic reminder if a reply has not been received by [date], and Automatic reminders send [x] times to non-responsive recipient; 6—Conditions such as Dress code, Gifts, Cost, Surprise Party; 7—Participants to invite such as Internal to the Family Archive Community or Outside (non-member) the Family Archive Community; 8—Weather conditions such as "If raining then . . . " or "If snowing then . . . " or "If—fill in option—then . . . "; and 9—MAP option to include or not include.

Vault

The Vault D8 is accessible from the member's Desk and, Control Center. Choose Vault to be shown the Vault UI. The Vault UI contains control functions for the following system elements and components (with reference to the example Vault illustrated in FIG. 8): Upload Template—for all member content to be used anywhere in the system; Time Lock utility—releases a post under certain user defined conditions; Vault Index—categorizes and organizes all uploaded content for easy retrieval; Title Transfer—for the transferring of Ownership rights of a membership/House to another; Password Storage—may show a list of passwords the member has given out for Red Key and blue Key posts; Hall of Records—a citadel safe for a Member's own private documents (e.g., similar to cloud storage); Reading Template—aids in the reading of any content listed above.

A purpose of the Vault is for storage of all uploaded documents and media. Uploads of any kind are stored only in the Vault. This may be the system default and may not be changed or manipulated. Each member Vault is similar to having a personal cloud storage service (see Hall of Records in the following description). Content in the Vault is only accessible by the respective Member. Key Level Access is not available when uploading because content is private. Vault storage is for the purpose of creating future posts containing Vault-uploads of documents and media.

Uploading to the Vault is by template only, and may be referred to as "The Vault Uploading Template" or "Uploading Template." It is an uploading template which is carefully designed to pinpoint the purpose of any upload. It serves as a guide for the member to properly catalog content to be able to find later when the member is creating a post. The Uploading Template works in coordination with Wishlist, prompting Member's to write a listing associated with a Room for whatever postings the particular upload may be intended.

File names for all uploaded media stored in the Vault are auto-assigned by the system and automatically indexed in a Vault Index for easy retrieval (e.g. see FIG. 8) and Table of Indexes (below).

The Time Lock is a mechanism by which the member creates a post that is only unlocked (e.g., able to be seen) after a specific period of time or a set condition. The post could contain an important document or announcement which is only released at a certain time or date. One could consider it a time capsule similar to a last Will and Testament, a goodbye message to all which is only released after the passing of a member who wants to share a meaningful message. Any content, document or media can be Time Locked.

The Vault is a safe storage and retrieval utility to view, use and reuse any uploaded content with the intended purpose to insert into Member's Posts. Member Posts are classified differently and not created in the Vault, and on the other hand, may not be stored here and may not be seen in the Vault. All member posts may be stored in the system matrix and are viewed in the room they were posted in or by searching the Master or Member Index then selecting the title, for example. A Time lock post may be the only post that can be created in the Vault and is created using the Vault uploading template.

Figure 8:
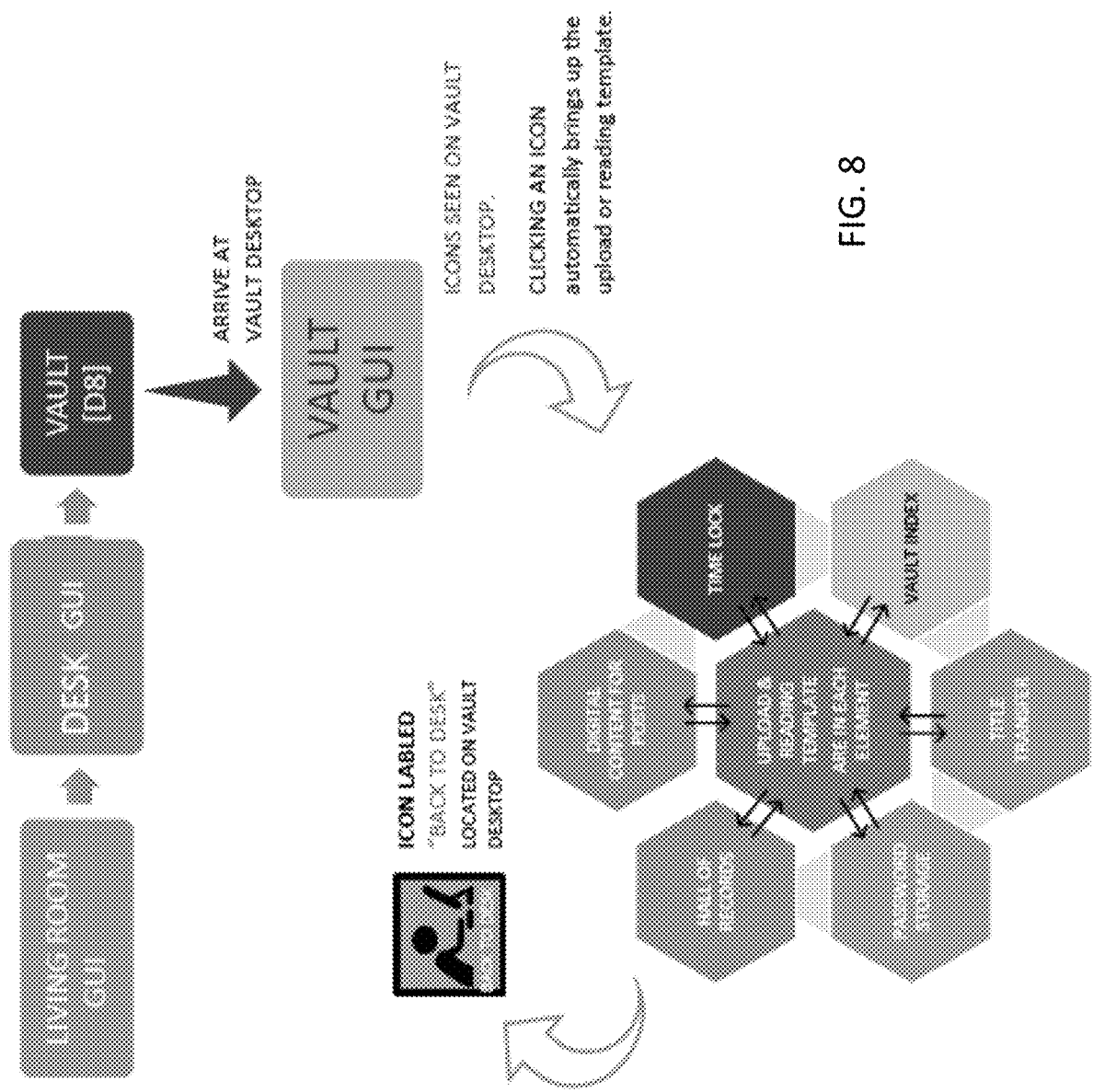
FIG. 8 is a schematic diagram illustrating an example of accessing the Vault feature within the system and method of the present embodiments.

The example Vault shown in FIG. 8 depicts the various elements comprised of the Vault matrix. Note the uploading and reading templates are in the center of the graphic. Just as all uploading and reading templates throughout the Family Archive system are adapted to the room/category they reside in, Uploading and Reading Templates in the Vault may be adapted for each Vault element.

Starting from the Main Living Room, a member may select Desk then select the icon for Vault. The Vault UI appears and may remain in the background for all of the below listed actions. The Vault's UI may be icon driven with easy to read and understand graphics for the uploading or reading template.

Thus, the Vault is safe and private as all materials stored there are not shared and are only available to the member that owns it. No content can enter the Vault without the Uploading Template. The uploading template is in the Vault D8 which is accessed via the Control Center at the Desk located in the Main Living Room of a member's House. The Vault may be the one and only place to initiate the Uploading Template and it may be the one and only system-feature to upload all media content as stated above. The features of the uploading template ask essential questions and are the start of the creative process for future posts. The uploading template prompts save time for creating posts later. Who, What, Where, Why, How? What category is this material be posted into, e.g., Kitchen, Travel, Dining Room? What is the Wishlist priority?

Located in the Vault D8 is the Hall Of Records It is a separated Vault only feature for the convenience of a Full Access Member to use. The Hall of Records is meant to store important personal documents and digital content but not to be shared or posted in the Member's House. The Hall of Records may have its own index and uploading template, that would aid the member in naming, categorizing, and organizing digitized content of all kind. For reading, viewing and printing any document, and or digital content; a Hall of Records Reading Template would enable these tasks.

The Hall of Records is a restricted area inside the Member's Vault. It may have its own defined rule sets for uploading, storing, and reading documents. The Hall of Records may have its own index and search capabilities as the content therein is not a part of the Member's personal Index or Master Index and search engine. It may be considered to be a virtual safe within the vault to store and view important documents of the House owner. A list of documents by category may be generated by the Hall of Record's uploading template. The record list may name and categorize the document(s), provide an upload date, last view date and be clickable to open the document. The record list may be located in a Hall of Records Index.

Documents may only be uploaded using one device such as the member's desktop computer or phone. If using a mobile phone, it must be the member's own phone. The phones biometrics (e.g. fingerprint, voice or facial recognition and 2 factor authorization) utility may be necessary for uploading and downloading or viewing documents. Extra security measures for positive identification may be implemented in the software design for a desktop computer. Documents inside the Hall of Records cannot be shared outside the Hall of Records—or be transferred to other parts of the Family Archive system or a member's own House.

Documents stored in the Hall of Records may be available for viewing and downloading via the user's mobile phone using standard security protocols or their computer and laptop using two-factor identification, for example. Viewing may only be possible with the special reading template inside the Hall of Records. Examples of documents (which are in digital form, and considered a back-up to real-life) in case of fire, theft or misplacement: Insurance papers, Investments, Banking, Government IDs, Auto-title, House Title, Will and Testaments, etc.

Password Storage

Password Storage D9 is a Desk Control Center feature to store passwords either Blue or Red Key for safe keeping and easy retrieval. The password storage utility allows members to change or delete passwords already issued. It can also assign new passwords to posts with a Red and Blue Key Level Access.

Inside and Outside Rooms

Rooms (e.g. FIG. 4) are another way to describe a particular category. Each room includes posting template based solely on that room. The rooms are distinctive individual places, different from one another and feature rich. The User-customizable House theme is organized and designed for ease for navigation. Rooms contained in real life homes are categorized by: Living Room, Kitchen, Dining Room, Garage, Garden. The Family Archive Member's House, their identity on the platform, is based on this same familiar reality.

One example of a category room is the Kitchen H6—it is about 'all thing's food,' including recipe sharing and stories of culinary masterpieces. The popularity of cooking shows illustrates the fondness people have for food, for learning about cooking and for sharing recipes. These will all find an active home in the Kitchen category.

Rooms are specific categories and meant to share worthwhile stories about current experiences or activity from the recent past or long ago. The category specific rooms are for posting and preserving a member's experiences through their multi-media story. This contrasts with most social media platforms filled with endless photos-for-likes, quickly turned into forgotten moments.

The rooms of the Family Archive system platform are individual UIs that provide the experience of a professional styled-blog and posting site, e.g., each with tantalizing headlines and plenty of archives to search for interesting content. Photos and videos or stories with enhanced narration will stimulate readers. The rooms are for categorizing member posts making it easy to find and navigate to specific subjects quickly and intuitively.

Family Archive is designed to inspire members to share their life in meaningful ways with the help of the Posting Templates, encouraging members to make choices and input their stories, make videos or explain a photo through storytelling. The experience of crafting a good looking post becomes fun and no longer the impediment to sharing.

There may be various classifications of rooms (See System Platform diagram in FIGS. 2 and 3 for a graphic depiction and layout of all rooms/areas of the system). Two classifications may be House Inside Rooms (or Green Zone H1-H8) and Outside Rooms (or Purple Zone OH1-OH4). The Green Zone may be a private, permissioned area, and it delineates all rooms contained within a Member's House. The Purple Zone, (e.g., not part of the private area) may include the Outside Rooms and go beyond the realm of a member's House. Posts created inside a Member's House can be posted to the Outside Rooms, but any content in the Outside Rooms may not be brought back into a Member's House for security reasons.

Members may be able to turn off/on some rooms in their main home page or icon-set. While a member may not have the option of turning off the system elements including Main Living Room UI, Showcase Living Rooms, Desk, and Vault, for example, and may not have the option of turning off outside rooms (such as Discovery Center, Hobby Hang Out, Community Hall, and future rooms), they may have the ability to turn off some of the House rooms (such as Your Story, Family Hall, Garage, Garden, Dining Room, Kitchen, Travel, and Your Room). Also, various rules that define rooms may be by system design and may not be changed by members.

In sum, Rooms offer easy intuitive navigation, may be designed by a member to be pleasing in appearance, and can reflect a category. They are locations where members create a posts, set key level access for posts (security and exposure levels), and read posts.

Your Story

Your Story H1 may be a foundation of the Family Archive and may be the first Room in the House. Whereas other rooms or categories are for select subjects, Your Story is not based on a category. Any subject the member wants to post about may be allowed here. This room is about as many stories and subjects as the member wants to share with others.

Life is full of enriching experiences and difficulties, all of which make up the totality of who we are. Your Story is for sharing our profound memories. Some of the stories can be short and playful. For example, reminiscing about a favorite pet and the warmth it provided the family. Other stories could include major milestones like meeting the love of your life, buying your first House or earning a college degree.

Our grandparents made choices that ultimately impacted our lives and telling their story may enrich our sense of family. Living with or marrying someone from another culture could spur a wealth of stories to fill a book. The planning and actual move to another country to live and work are subjects many would be fascinated to read about. For some it is childhood memories and others it is the joy of watching your kids grow up and spending time with grandkids. Story possibilities are endless. "Your Story" room is a place to begin telling them.

The Your Story room like other rooms may be a graphical or virtual user interface. The design and look of the UI is based on the Member's chosen House theme during the Set Up process. Posts are created with the "Your Story Posting Template" imbued with story writing encouragement and capability. This particular room is a Story Room, the template may ask story based questions, based on the standards of writing. True, fiction, Who, What, Where, When, Why and How may be basic fill-in options asked by the writing template. The writing template has built in features to help ask questions to help the writer input necessary story details. Spelling, grammar hints are automatic for each post creation. The member chooses a story layout template design for the post based on an assortment of layouts available. The member chooses easy changeable fonts and color choices plus a headline for the post. The last part of the creation is to input pictures and video if desired. Before posting, the Member may be prompted to assign a Key level and whether to identify it as an "all eternity" post, and/or to assign it as "discoverable" (see FIG. 10). The Member titles the post, the system gives it a File Name and automatically lists it in the Family Archive Master Index, and simultaneously in the Member's My Index.

Travel

There is always a story with every travel adventure. The Travel H2 room is specific in design to assist the member to post experiences with the assistance of the travel-posting-template. Member's Travel room may see two graphic word icons used to post category specific travel events: Passport (out of the country) and Domestic (inside one's country).

Visiting Members may select on the Passport. The pages open and can be turned or flipped (e.g. like the pages of an actual Passport) so the viewing member then sees Passport Stamps by country and date. Clicking on any country's stamp may bring up the story post related to the holiday that the stamp corresponds to. The travel room UI is meant to be similar to a Member's Showcase Blue Key Living Room. It is a dynamic space that changes from time to time. The posting member may choose various available templates for the theme, including pictures of travel mementos.

Garden

The Garden H3 room is a place to share experiences and gardening talents. Pictures of each year's blooms and harvests are encouraged. Stories abound about how these beauties were grown as well as why some failed. Farming families may thoroughly enjoy the Garden room with pride. There is a lot of wisdom to share: When and what to plant at certain times of the year; How to water, graft and fertilize. Gardening of all types is popular the world over. Growing vegetables, keeping up beautiful flower gardens, and private greenhouses are hobbies people in general enjoy. The Garden Room is meant to be a showcase for amateur gardeners and professionals too.

Templates based on Garden themes that match the Member's House Design may give the room its look. The Garden Room may show and teach with (how to) videos produced by the user, and or written posts. How-to posts could also be in the form of pictures, with voice over narration and a touch of music added in for effect. Special stylized frames may be chosen from the Posting Template. Each picture frame is a separate post/story of whatever the picture is about that may (once clicked) have more pictures and story-explanation detail. The framed picture could also be a video post. The Family Archive video posting template may help the post creator fill in relevant details about the video.

A posting template for the Garden Room may be specific to the Garden. Like the Kitchen, where there is a recipe template inside the Kitchen posting template, the Garden's how-to section may have a standardized template based on the how-to [subject] being given. Questions like: what is needed?, how much of an item is needed?, where to buy, when to plant, and how to grow instructions, may all be part of the Garden how-to template.

Garage

The Garage H4 is an area to store miscellaneous but important stuff and to build projects. The Garage as a room is included in Family Archive because it is a unique place for home projects, crafts, hobbies, and all things automotive. The garage is a place of creativity focused on making crafts, building things and fixing up old cars, for example.

The Garage may be by default Blue Key Level Access. Green key community wide (for Active Members) sharing may be an option for any Garage post.

The Garage room may be a show room of user's hobbies, crafts and cars, and is a post discussion venue. Members of Family Archive may have the option to turn the Garage off if they do not have an interest in creating posts of this type.

The Garage UI is based on the chosen House Theme. The Garage posting template may focus on displaying these projects and their evolution in the most beautiful and dramatic way. Video and narration may be an option for these, adding another personal dimension to these very personal projects/posts. The layout of the posting template for the Garage may be weighted more toward visuals to showcase the project but may include "how I made it, accomplished it, or why I bought it," kinds of questions.

Dining Room

Dining rooms are private intimate places of social gatherings. The Family Archive Dining Room H5 may be blue and red key access, shared only within the confines of the members own community. A green key level access is allowed by the system for members that may have a reason to share their dining room experience with all Family Archive members and registered users. Café and restaurant dining may also be included in the Dining Room. The Dining Room is also a place one might post all cherished moments associated with a meal—an anniversary, a first date, or a wedding dinner banquet. Writing about it and including photos and videos with some narration to capture the special nuances of the occasion may be a post to enjoy for years to come.

The Dining Room Posting Template places emphasis on occasions and asks questions accordingly—reason for the event, time and place, attendees, . . . ?

The Dining Room UI styling is based on the chosen House Theme. The space is about "those great times we had a dinner" or any other dining experience. The room may be based on picture sets of various dining experiences that will highlight them into frames and/or photo book-like sets. Simply selecting any frame or photo set will bring up the Post associated with the picture. The room's Index feature may facilitate an easy "search" function. For example, a user may search by Date, Occasion, Title, People, Place, etc., The Posting template for the Dining Room specifically targets Photos, Names of People, Place and the Reason for the occasion. The template may ask for video taken of the event, or any audio that was recorded. The posting template may put all the media together in a well-organized post that looks like it was professionally published.

Kitchen

The Kitchen H6 is a room for sharing all things food and related to food. The Kitchen Room UI styling is based on the chosen House Theme. The space is about sharing recipes, preparation of food and lists for shopping and kitchen equipment. Since video format is familiar and easy because of mobile phones, it is a key component for the "How To" part of the Kitchen UI. As with all of the rooms, the Kitchen theme will have a kitchen look about it. The recipe section may be a book (styled) Icon called "My Recipe's." Recipes may be easy to input with the posting template. Member's posting in the Kitchen may be asked questions about their post. The first question the Kitchen posting template may ask is: "Are you posting a recipe?" A "yes" answer will bring up the recipe template. This is an example of a template within a template—or a branching template.

The posting template in the Kitchen may ask food related questions, and for historical context, it may ask if the recipe is handed down through the family. All recipe posts may enable an optional section to write a story and a description about the recipe, pictures and video. A narration feature or wizard for any recipe may be a highlighted element, that should someone prefer to explain the recipe vocally, the option may be available. There are more than recipe options for posts in the Kitchen room. Meal plans, party menus and recommending what food items to buy and how to prepare them are an option for Member's to post.

Family Hall

The Family Hall H7 is a place to have family related discussions, share information and connect with relatives. The Family Hall may have a live chat feature. Live chat assumes two or more family members are online and signed into the Family Archive. Live chat is easily seen from a Member's Main Living Room UI as an option in the Family Hall. And in the Family Hall room, a pop-up, may indicate someone else is available to chat online. Live chat may include text, audio and video options.

The Family Hall is a place to chat live with family and post family newsletters, bulletins, and newsy items about family happenings. This space is accessible to anyone that is a part of the member's family. This room may be dynamic, with new posts, bulletins, announcements and newsletters. The Family Hall may have an online live aspect, most notably the chat.

The Family Hall may be a special designated Yellow Key, also known as "Family Key." It is intended for frequent interactive family connections. The Yellow Key allows Members to lock down, thereby designate who they want from within their user defined community to participate in their Family Hall room. The method for using the Yellow Key, aka Family Key, is twofold. The Family Hall room can be designated a Yellow Key room, and only pre-designated members are allowed to participate in it. The second method is only to designate a given post to be a Yellow Key post. Meaning the post itself is available only for those that have been pre-designated by the author of the post to see it.

The Family Hall is meant to be a busy interactive space for family fun, announcements, news, encouragement, and gathering. To encourage family members to share, the Family Hall posting template may include a newsletter creator, a bulletin creation template, and an announcement template for shorter announcements.

Your Room

The Your Room H8 can be turned on or off in the settings. The posting and reading templates in this room may be essentially the same as in pre-configured rooms since many prompts and questions may be similar. However, in this customized room, a member may also be able to personalize their Own Room Templates by adding their own custom questions and prompts for all future Own Room posts.

In Family Archive a registered user can post or pursue a hobby in Hobby Hang Out. However, Hobby Hang Out is an Outside Room, all posts contained are Green Key Level Access, registered user access, and are not privately shared. Your Room allows a member to custom post for their own (by default) blue key community, and with an option to post to the green key level, to Outside Rooms if desired.

Since Your Story is not meant to be specific to one category. It is meant to be any story, any time, and any event. It can be from a memory from a long time ago, a reflection of the present moment, or a vision of the future. In contrast, Your Room H8 is specific. This room may be designated by the member as an area of particular interest to that member. All posts here are related to the name of this room. Examples of Your Room include My Music Room or My Photography Room.

Outside Rooms

People enjoy hobbies. Hobby Hang Out OH-1 is a room to share and create posts about hobbies, explore new ones, and teach others. The Hobby Hang Out is a learning and exploring platform for all hobbies. Members can post and share ideas, including "How To" posts and video productions. The Hobby Hang Out may inevitably be a platform for many enthusiasts and groups posting about their interests.

Member's posting about their hobby may use a posting template for this room and allow for the expansion of the original post by anyone reading it. Participating members are allowed to comment and may add their stories, or any digital media to the post. Member's wishing to add to an existing Hobby post may choose a post icon located in the existing post. Similar to the Kitchen posting template, a posting template may be a pop-up window allowing the Member to add their post to an existing Hobby post. To navigate, Hobby Hang Out—posts, may show an organized selectable Icons theme in the posts thread, showing the newest additions first with scrolling and search capability for older additions. Additions are typically subordinate to the original post.

The Hobby Hang Out is located in the purple zone (e.g., see FIG. 3). The Member chooses Hobby Hang Out from the Main Living Room UI control panel. Entering the Hobby Hang Out room is secure for the member. No connection may be made to a Full Access Member's House and any rooms inside their House to any Registered Users of the purple zone, Outside Rooms, e.g., Hobby Hang Out. Posting, commenting, or joining an existing post or room shows only the posting member's username. Registered users, that want to know more information about another registered user or active member that authored a post, can click on the username which may show a, information aid (e.g. a popup screen). A bio with the author's name, city and country, etc. may be displayed. Active Members clicking any registered user's username may see the same information in a popup screen as described above. Active member's clicking on another active member's username may be shown their green key showcase living room.

Registered users can visit Hobby Hang Out and view any posts contained therein. All posts in the Outside Rooms may be Green Key level posts, which means any Active Member and any Registered User can post and read other's posts. All comments made on a post throughout the system fall under the house rules guidelines of the Family Archive network.

Community Hall

Community Hal] OH-2 is a place for members to make new friends and chat with old ones. The Community Hall could be thought of as the Family Archive club house and is meant to connect members with similar interests. Outside the House in the purple zone, Community Hall is one of the four Outside Rooms. Posting here may always be green key level and can be any subject starting with current local events, to global events. And while adherence to Community guidelines is emphasized, topics can be far-reaching and are essentially unbounded.

Community Hall may also be used by the Family Archive system to release news and update notifications. Members should check into Family Hall occasionally to stay current on system changes. When members fill in their personal profiles, the system may create links in common to increase awareness of members with similar interests.

Community Hall's posting template may provide a familiar forum-style template with a subject line to input a topic for community-wide discussions. A specific search function is available for the Community Hall room. Searches enable members to search by topic, Member ID, region, and date. Community Hall search may be unique to the room only. Members searching for: "Forum Topics Mar. 11, 2022" would get a list of all topics created on that date. Another example is to search for: "Forum Topic—Fishing."

Members may chat with anyone, video chat with anyone, read anyone's posts, join forums, accept, reject or block a request to chat or video conference, make new contacts (friends) for Community Hall only, allow the system intelligence to make Cross-Connections with others in-common with your interests. Members may see all forums and topics either actively being posted or those posted in the last minutes or hours listed on the Community Hall Desktop.

Discovery Center

The Discovery Center OH-3 is open for posting to Full Member Access members only; to place their green key posts for full access members and registered users to read and comment on. This is not a room to create posts. Discovery Center encourages Members to feed it with posts that they already created in other rooms of their House located in the private green zone, Member defined-community. Members who want to share their posts in the purple zone—do so—in the Discovery Center. Discovery center may not have a typical posting template, instead it may be a choosing template. It may present a list of all green and blue key posts (that must be converted to green key, before they can be shared). The member may select from the list and post for the Discovery Center room.

Full Member Access members who want to see more of another member's optional blue key discoverable posts [a posting template feature] that are not yet put in Discovery Center, can choose them in the Discovery Index, and when in the green zone also Master index. Registered users do not have access to the Master Index of another Member. In order for Full Members to see Blue Key and discoverable posts listed in any system Index (e.g. see Table of Indexes below), they may ask for permission, by sending the author a "request to see" message (e.g., by selecting the author's username to access a pop-up email or message template. Members receiving the message can ignore, block or accept the request.

Future Rooms

The Future Rooms OH-4 provides a mechanism for adding future rooms when the need arises. Examples might be sports oriented rooms or career specific rooms, Templates Like the House theme making it easier for members to learn and use the system immediately, there are templates for uploading, posting and reading, located throughout the system, all of which facilitate the ability to streamline the creation of quality posts (e.g., see the Table of Templates below). Templates are optimized with the power of behind-the-scenes Wizards, making for an organized workflow and leading members to achieve cogent posts.

In the Family Archive, templates are for everything. There may be no freestyle posting in this platform. Templates keep consistency and carry out the rule sets for each room/category. Having this kind of conformity helps the creative process and enables more comprehensive stories and posts. In this way, pertinent details are never overlooked. The Templates make the process of creating a post easy and fun.

The templates make the design of every post beautiful and consistent; conjure up relevant details; include automated system file names and indexing; include simple layout and design function; include Key Level access level; and streamline the creative process to add commentary, narration, video, sound, and photos.

Posts may all include design uniformity which provides an overall consistent look. The Posting Template is how a member creates a post anywhere in the Family Archive system. It is not just one perfunctory template design but many, continuously optimized for a member and their categories. The Posting Template may be either simple or complex depending on the choices a member makes when initiating the Posting Template in a given Room.

The Posting Template may be a pop-up window initiated from a right mouse select or from an icon located in a part of any Room in a member's House. The template pop-up is the same look throughout the whole Family Archive. It does not change by design like other features in the community. For example, when a member changes his House theme, the Posting Template remains the same. Each room may have its own Posting Template, initiated by choice, and housed in a pop-up frame. The template may be titled according to the Room it is started in. For example, in the Kitchen, when the template is called up by the member they may see "Kitchen Posting Template."

Based on the Room, the posting template may have questions that are different from other posting templates in other rooms. The Community Hall, for example, may have Chat and Forum categories, whereas the Family Hall might have family specific Newsletter choices in order to create a Newsletter. This choice is only available in Family Hall. Each Room may have its own special room-related features needed to cover the subject based on that category-room.

Without the Posting Template Members' posts might look ordinary, have no direction, and be random. Many people are not trained in writing, conceptualizing and desktop publishing. With no guidance or consistency, the posts lose meaning and interest. Conformity is the answer to a meaningful experience in creating thoughtful posts, all with the help of Posting Templates. The Posting Template allows members to post with simple rules that are consistent, reliable and helpful when organizing content. The Wizards may be like having a real person there assisting members from conception to completion of posts.

There are three main types of templates used in the Family Archive, the Reading Template, the Posting Template, and the Uploading Template. All are intuitive to use but built with a robust intelligence driving them behind the scenes.

The Posting Template is a comprehensive mechanism that asks questions, provides fillable places for answers, and provides options for every post in process of being created. Based on the Member's response, the template changes giving further questions and options to fill in by the member until completion. Creating a new post with the Posting Template does not have to be completed in one session. Members are free to choose the type and depth of the multimedia content.

An example Posting Template may request the Category (e.g. Choose from a list or Write in) and Title, and may add Narration, Music, Pictures, Video, Sound, and documents. Also, a pre-post check (before submitting post) may include Spelling and Grammar Check, Key Level Access, Member password set for key level red posts.

Inside any room including Main Living Room, the member chooses a Posting Template icon on the Room's UI to create a post. Selections may be presented for the appropriate item to place in the post. The system preferably populates the category initially, and assumes the post is related to the Room the post is being created.

Each post initiation may ask similar questions but may include parts and questions specific to the Room. Outside Rooms may have forum based templates and questions to shape the post appropriately. The Kitchen, for example, may ask "Do you want to post a recipe?" followed by a template optimized for the entry of recipes.

Most posting templates may ask what media is to accompany the post. The member selects all that apply, and the system brings up any uploaded media from the Vault associated with the post. The posting template may continue to ask questions about the contents of the post. Once completed the template automatically fills in information and guides the member through the creation of the post, both in writing the story and in incorporating video, photos, and sound to choosing the design for the final look of the post.

All Eternity Clause is an option members may assign to some or all of their posts (e.g., via a tick box option) before posting. All Eternity Clause selected posts become free access content that is automatically posted in Discovery Center OH-3, at the time specified by the member when choosing this option. These posts can be searched for in the Discovery Room Index and seen by all Active Members and Registered Users. The All Eternity Clause is normally intended to be available after death or perhaps under other various conditions.

Family Archive may keep all members' posts that are designated All Eternity to be available for all time or as long as the Family Archive remains in existence.

Depending on Member choices when using the posting template, the Intelligence Wizards may help with the following features. The Writing Wizard is built into the Posting Template. As the name suggests it helps members to write. The Wizard may assist the member along with hints and suggestions to move their story to completion, helping with the Who, What, Where, When, Why and How as well as structuring a beginning, middle and end in outline form.

If the member would like add to previously written work, it may be made available from their list of Vault contents. The Photo Wizard (within the Posting Template) helps the member post a photo or set of photos to add depth to their writing. Photo Wizard is a helpful editing tool to help format the picture. Formatting includes color and light enhancing, crop and white balance. The photo wizard may give examples of picture placement inside the member writing area.

To add a photo to any post, the member chooses [ADD] then [PHOTO] from the menu in the Posting Template. When the "add photo" selection is made in the Posting Template, the system assumes the photo is already stored in the Member's Vault. The Posting Template may list all the Member's photos (by category) contained in the Vault. All content including photos must be uploaded via the "Uploading Template" located in the Member's Vault. When the member chooses one or more photos, the system may then place the photos into an example format for viewing and editing before finalizing.

The photo Wizard may ask the member how to place the photos and if the photos need further enhancement. Photo descriptions can be added at this point. If the member wants to add a photo that is not stored in the Vault, they may initiate "The Vault Template" and add the new photo into their Vault.

The Video Wizard may begin by asking the member a few questions about the video and placement. This wizard allows the member to enhance their video by adding narration, titles and descriptions. The Video wizard may be a video editor providing more control for the member to trim off sections of the video. Retrieving the video is from the Member storage in the Vault. The member chooses [ADD] then [VIDEO] from the menu in the Posting Template.

There are many kinds of sound files. Sound files can be used in a document to narrate, clarify, describe, add depth, and set mood. Sound files could include recordings a member recorded himself at an event, such as a sporting event, or the ambiance of a restaurant or party, birds and animal sounds or nature sounds like waterfalls, rain or a running brook. The Sound Wizard is accessed by the Posting Template's menu system at any point the member chooses to add sound. Sound files are stored in the Member's Vault where all media content is stored. Should the member choose to add sound that he does not have in his Vault, the member will have to upload the content first using the "Upload Template" located in the Vault. There are many commercial and free content websites the member can use to upload music and sound files to use in posts to their Vault.

A picture or written story is wonderful on its own but add the voice of a narrator and some music and you have an impressive production. Therefore, adding narration to special photos in the Family Archive allows for a richer experience with more feeling and more meaning. The Narration Wizard is an option with all postings, available from the Posting Template menu. The Narration Wizard assumes the member has written and recorded a precomposed narrative and has uploaded it into their Vault. To add a narration to any post, the member chooses [ADD] then [NARRATION] from the menu in the Posting Template.

Each Room in the Family Archive system may have its' own Reading and Posting Template. The Uploading Template, however, is only located in the Vault. All templates on the Family Archive system may change their questions and choices depending on the room category they are used in. Some questions and choices are inevitably related to the specific category/rooms, and therefore would apply in that room only. Templates provide a simplified structure to assist Members through the posting process. Some questions asked by the template are optional, but many questions and choices must be answered, otherwise the post is not considered completed and therefore will not be posted in the Member's House.

The objective is to turn the complicated into the uncomplicated and help those without a writing background to create interesting stories and beautiful looking posts.

Templates offer easy-writing fill-ins, applying basic journalistic questions, such as: Who, What, When, Where, Why, and How? Templates expand the thinking process when creating posts—the questions focus on the basics for good storytelling, assuring important details are covered. The end result is clearer more interesting posts to share now and for future generations.

Templates go further than journalism questions. They also streamline the process for adding a photos, video or a sound file, and for adding narration. Various magazine style layout designs are another part of the template process. The designs give a finished professional look to the post.

The key levels (e.g., green for access by all members, blue for access by the member defined community, and Red for restricted access) may be a common aspect of all Posting templates. A "save for later" button may be shown as an option before "post now." Save for later allows a Member to work on a post in stages, a helpful option for more detailed posts that cannot be completed in one session.

The Uploading Template Is located in the Vault only. The Vault is accessed from the Member's Living Room Desk. The Uploading Template is preferably the only place that a Member is allowed to upload content like Photos, Video, Sound, and Documents. It is the only source for content when creating posts.

The Reading Template Is located throughout the system. Clicking on any icon in any room or system desktop to see a post, bulletin, newsletter or system feature may initiate the Reading Template in a pop-up. The Reading Template has some enhanced features, like Search the system Index in multiple ways, to read Member's own posts or others. Search may be by category, date, Member ID, subject and post title. Similar to picking up a printed magazine, the Reading Template always adheres to the intended design style the post was created in. The Reading Template keeps track of posts that have been read and not read. Members therefore can easily identify what they have already seen.

Figure 9:
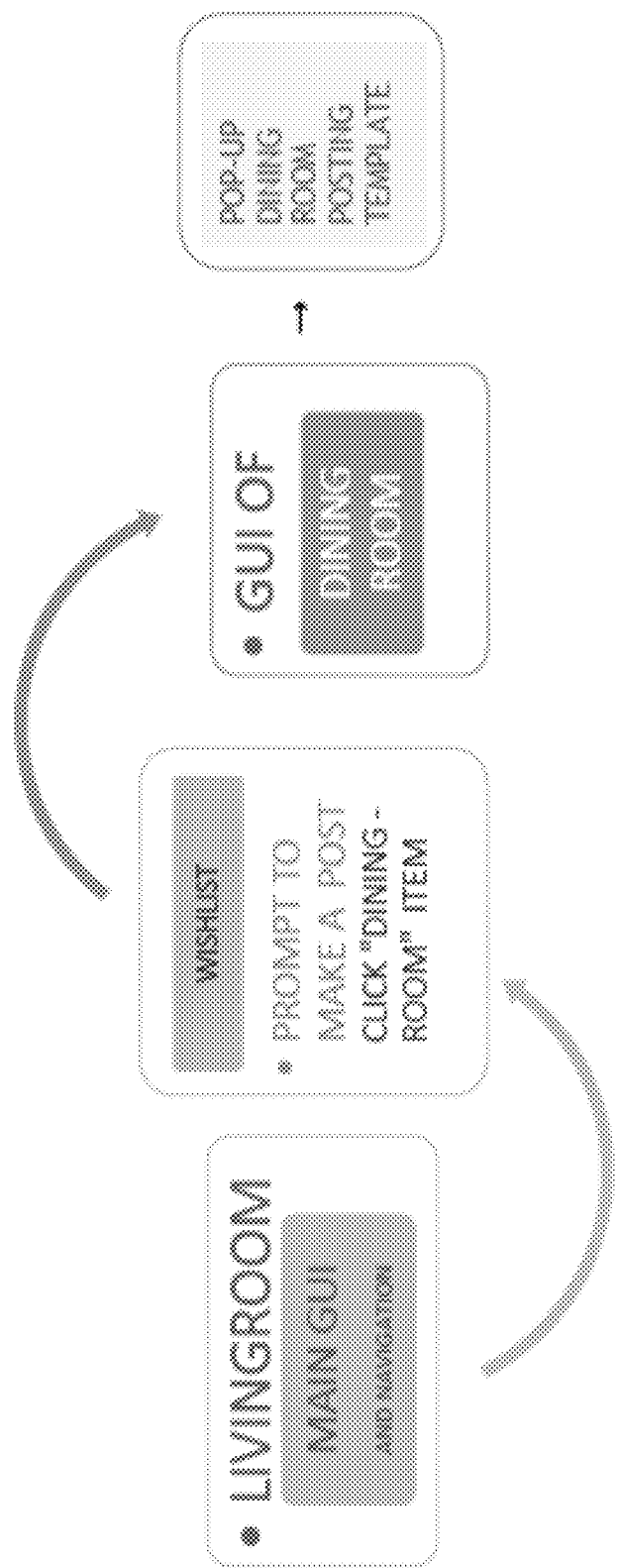
FIG. 9 is a schematic diagram illustrating an example of accessing the Wishlist feature within the system and method of the present embodiments.

The Wishlist of the Family Archive system prompts and reminds Members to post a special story or event. Wishlist may start when a member enters a room in the Family Archive system. An example is shown in FIG. 9, which illustrates the Wishlist initiated from the Main UI of the House, also known as the Main Living Room, to make a new post, e.g., in the Dining Room.

When a Member first logs into the system, they go to the Main Living Room. Again, this is the main UI and central point navigation to the whole system. From here, as per Member preference, the Wishlist feature may pop-up to remind Members of incomplete posts they have wanted to create. These are presented by category and in order of priority. Instead of navigating by the UI's con driven control panel, leading to the room of their choice to create a new post, the Member can simply select the Wishlist item to be taken automatically to the room the Wishlist item is located in, the posting template may automatically open.

Kitchen and Travel Rooms may include a special template within the posting template. This helps posts stay on message and go faster.

Kitchen Room is an obvious place to put family recipes to share with the Member's Community. Creating a post in the Kitchen about a recipe would automatically bring up the Recipe Template for entry of ingredients, pictures, measures, and instructions. The recipe template may pop-up as soon as the member chooses "Yes" to the question "Is there a recipe in this post?".

Travel Room may have an Icon of a passport. Clicking the passport brings up pages of passport stamps from countries visited by the posting Member. Readers that visit the Member's Travel Room (with appropriate Key Level Access permissions) may be able to open the passport, select on any stamp and read the post associated with that travel stamp. In order for a stamp (e.g. art created by the system) to be placed in the passport, a post must be created about the adventure associated with the Stamp. When a Member creates a post in Travel, the posting template for Travel asks: "Is there a foreign country that was visited for this post?" What country? Dates entered and departed?

The system may automatically generate a passport stamp with dates and associate it with the post being created for it. Details and a story about the trip are then created into a post, a Magazine style layout is chosen, full story about holiday adventure may be presented to the reader when they select on a given Stamp in the Passport.

Figure 10:
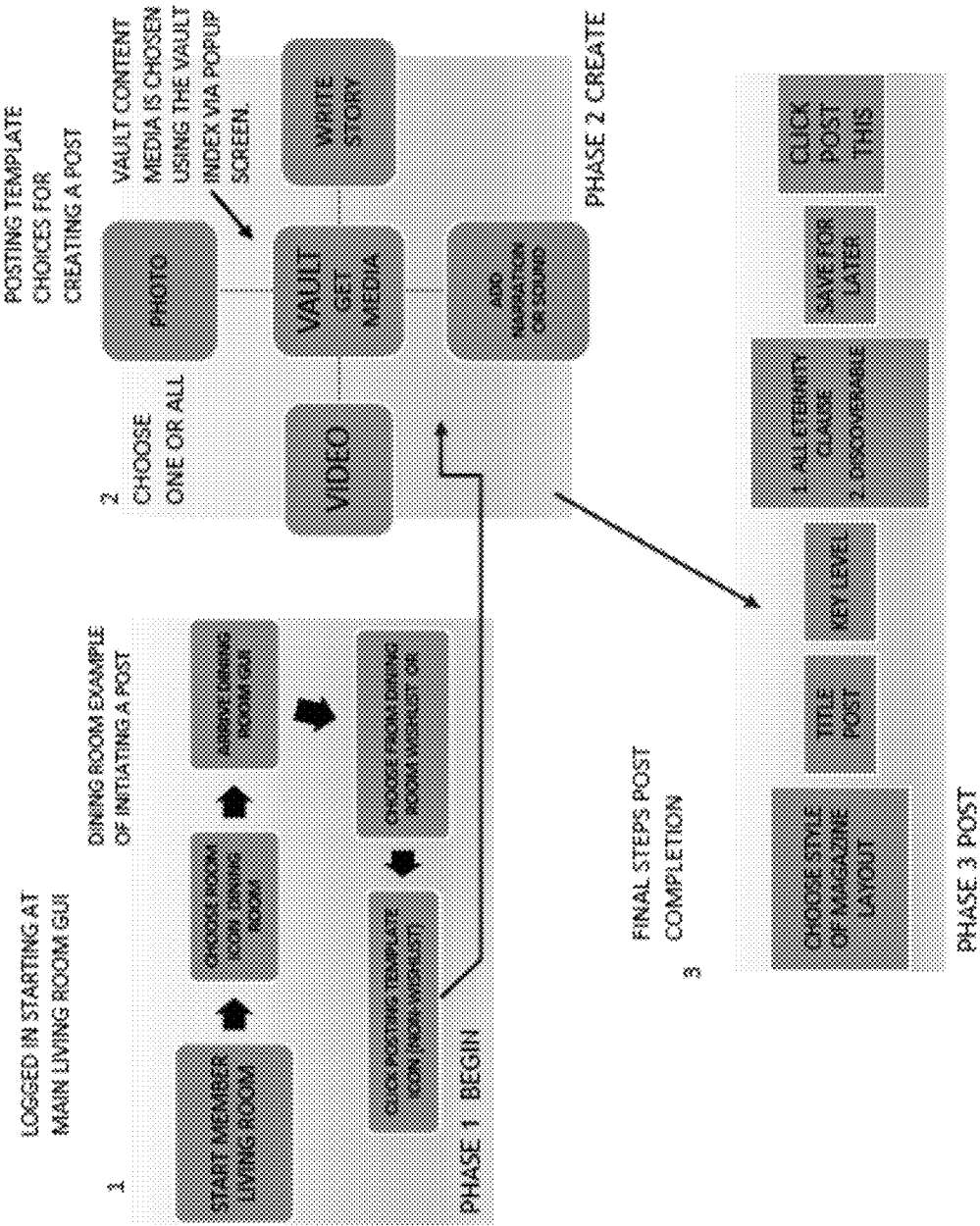
FIG. 10 is a schematic diagram illustrating an example of accessing the Posting Template feature within the system and method of the present embodiments.

An example of the process of using a Posting Template for posting in the "DINING Room" is shown in FIG. 10. In Phase 1, the member starts at the Main Living Room, selects a Room (e.g. Dining Room), chooses from Wishlist or selects create a post (i.e. with the Posting Template). Phase 2 includes use of the Posting Template with Vault access as described above. In Phase 3, the last steps to creating the post may include Title, Key Level, All Eternity Clause, Discoverable and Save for later, or post.

Figure 11:
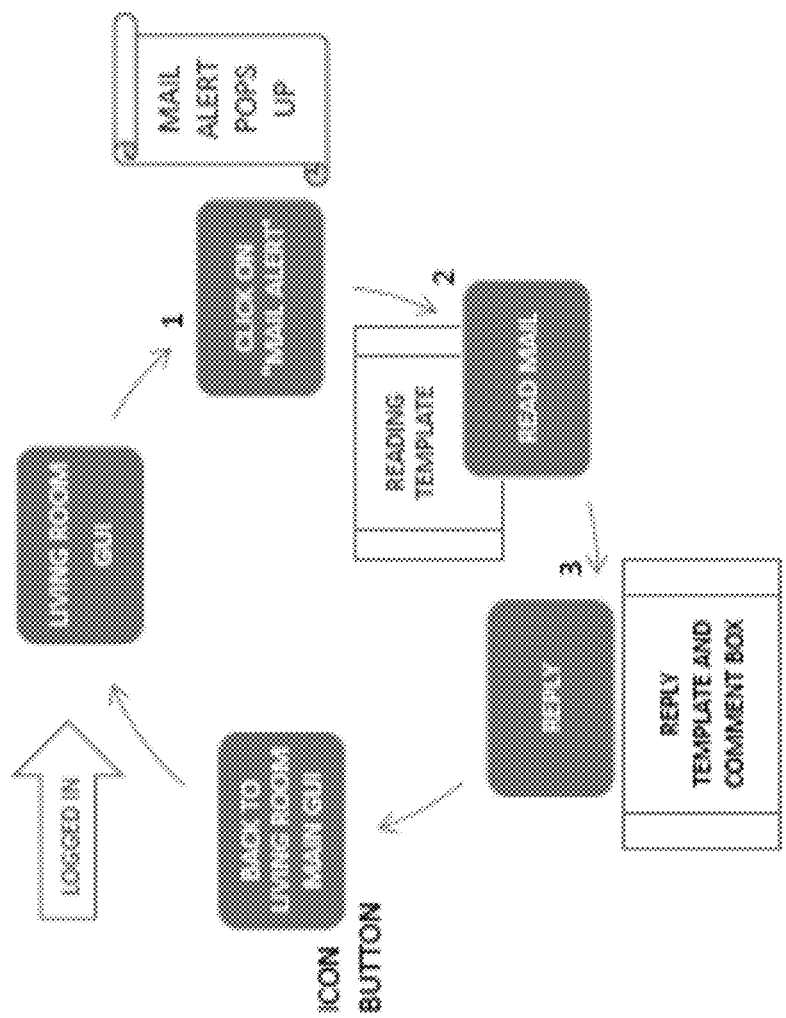
FIG. 11 is a schematic diagram illustrating an example of accessing the Reading Template feature with Mail Alert within the system and method of the present embodiments.

An example of the process of using a Reading Template for reading in the Main Living Room, with mail alerts is shown in FIG. 11. The member accesses the Living Room, selects the Mail Alert, reads mail (e.g. with a Reading Template), chooses to Reply (e.g. via a Comment Box) before selecting to return to the Main Living Room. The example illustrates how the reading template works when a Mail Alert is received. In the normal sequence of things, the system may automatically show Mail Alerts and post alerts from other Members in the defined community first. The member can choose to read and reply to mail and or read posts in any order.

When the reading of either mail or posts or both are completed, the Member may choose the Back to Main Living Room icon to go back to their main UI. The Back to Main Living Room icon may be available in every Room of the House, and Outside Rooms, Desk and all Reading Templates. The straightforwardness in this is "never get lost" and navigate back to center whenever wanted.

Figure 12:
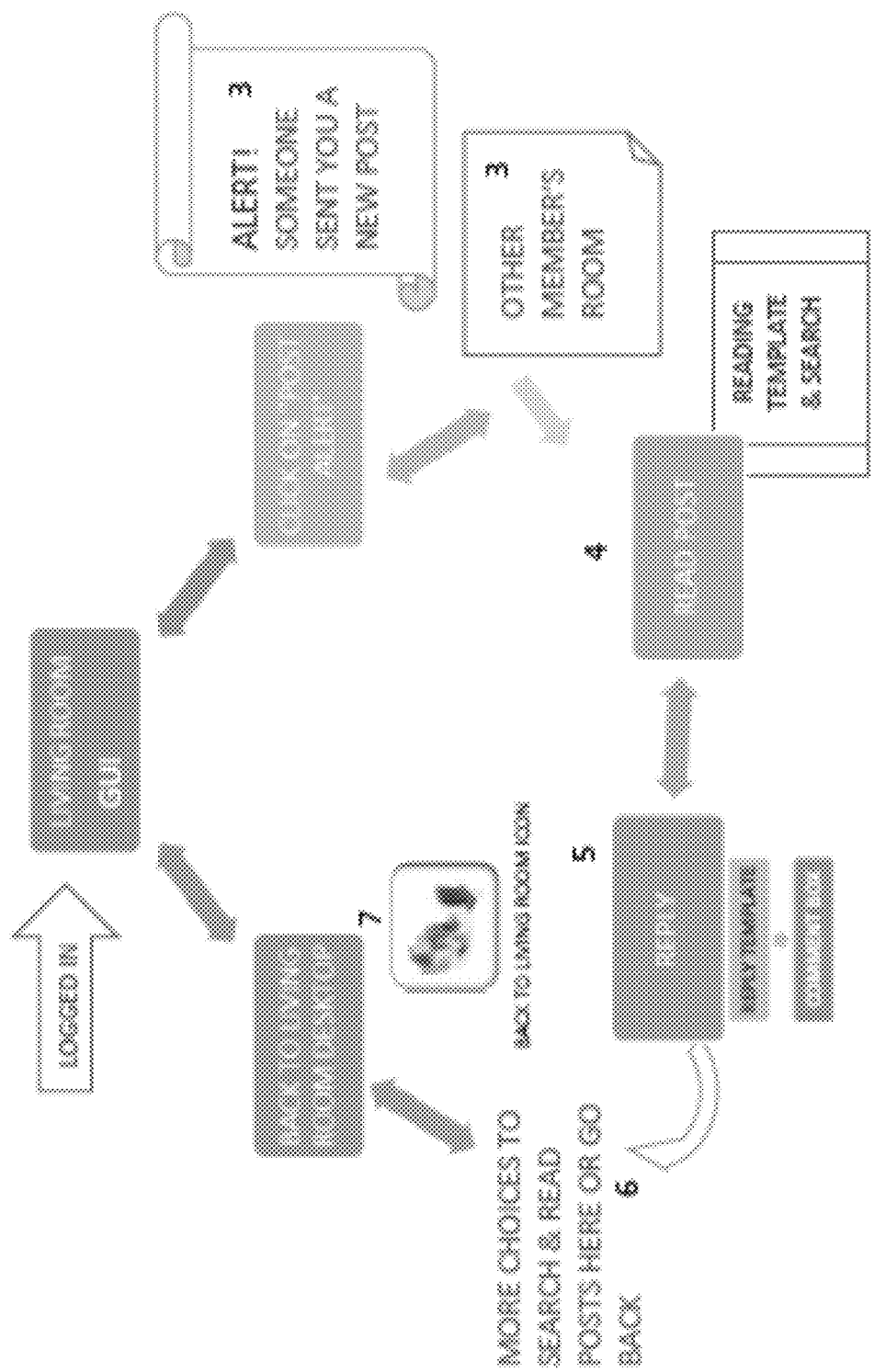
FIG. 12 is a schematic diagram illustrating an example of accessing the Reading Template feature with Post Alert within the system and method of the present embodiments.

An example of how the reading template works when a post alert is received is shown in FIG. 12. Beginning at the top of the chart, the Member has logged in and arrives at the Main Living Room UI. In the normal sequence of things, the system may automatically show mail alerts and post alerts from other Members in a defined community—first. The member can choose to read and reply to mail and or read posts in any order.

So, the sequence for reading a post includes log in, arrive at Main Living Room, mail or post alert (choose the post alert), read posts if desired, comment/reply, read more posts [search for others], select Back to Main Living Room icon to go back to the Main Living Room.

Figure 13:
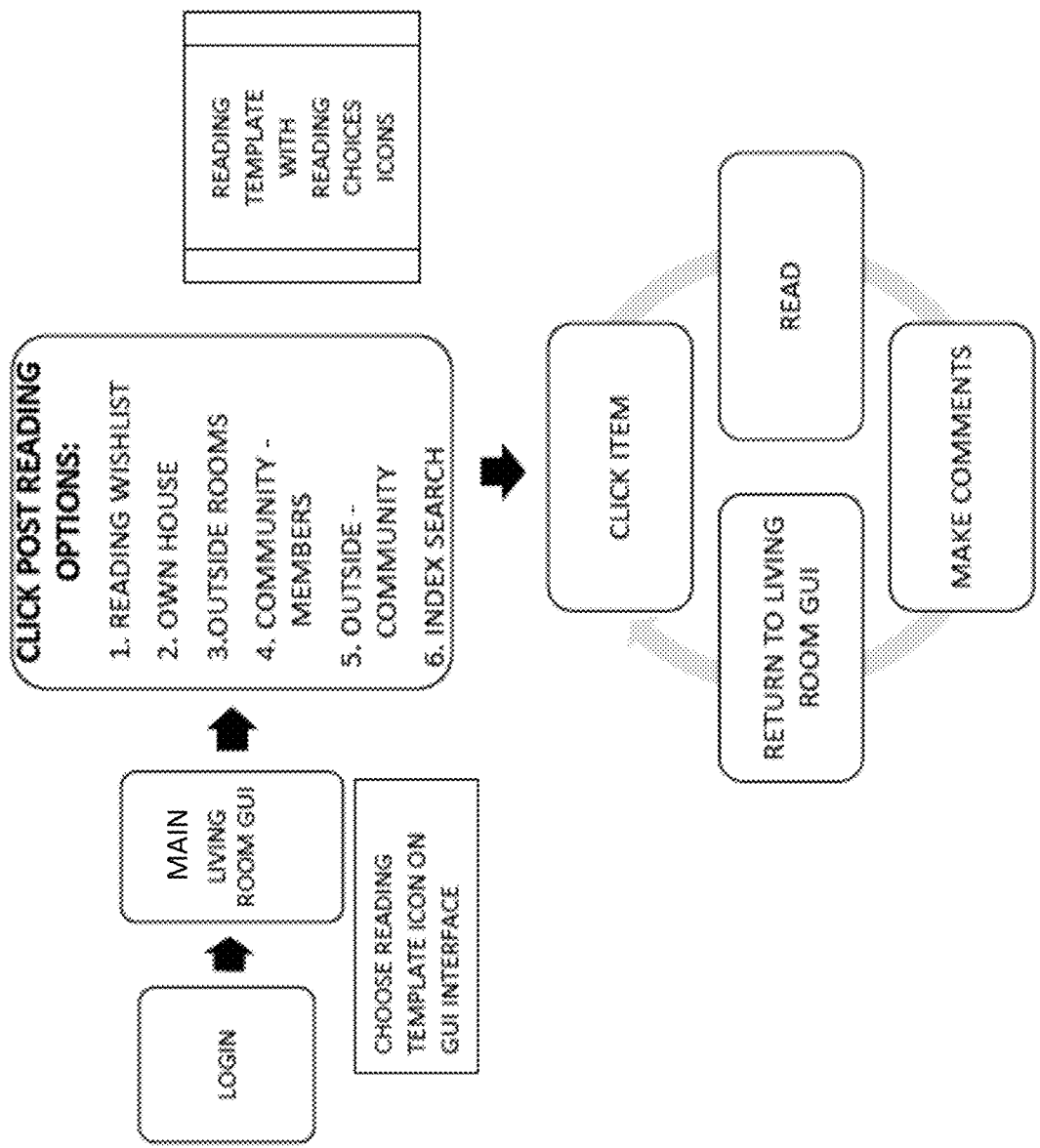
FIG. 13 is a schematic diagram illustrating an example of accessing the Reading Template feature within the system and method of the present embodiments.

An example of how the reading template works when a Member wants to read a post anywhere in the entire Family Archive system is illustrated in FIG. 13. Beginning at the top, the Member has logged in and arrives at the Living Room UI. Member chooses the icon for Rooms: inside the House, Outside Rooms, or can choose to search the Index to read posts in other Member's Houses of their member defined community, or the All Member Access community.

An example of the Vault uploading template process for uploading media content for a future post is shown in FIG. 14. The Vault uploading template can only upload, store and index uploads. A sequence of steps to initiate the Vault upload template and initiate an upload of any kind is shown here in a step-by-step sequence. To use the Vault's upload template, from the Main Living Room UI, navigate to the Desk, select the Vault icon and then select upload. The template opens and the Member follows the steps, then clicks the Living Room door icon to return to the main room.

Vocabulary that May be Used in the Present Description

| WORD OR TERM | TYPICAL MEANING |
| --- | --- |
| Access tools | Lists the various ways a user can access text, audio, narration, video |
| Active member | The Word "active" may imply - Paid Subscription Members known also as Full Access Members. See Member, Green Zone. [Related, Registered Members, non-active member] |
| Address | House Address, also known as a Member ID or user ID [Related Step 5] Page 10 & 67 |
| AI | Artificial Intelligence - Computer Intellect. |
| Alerts | System alert informing members about another member's post or an email/message. A system-based message. Alert(s) are in Main Living Room Desktop (GUI), a highlighted Alert or lighted icon to read any unread clickable-Icon for: Email, Priority Email, Bulletin, Read New Post and New Post Comment, (Chat Available Family Hall) |
| All Eternity Clause | Member choice before and or after uploading a post to click the "Eternity Clause." Transfers ownership to Family Archive or (the company), enables the digital content created by the member to be kept and thereby permanently shown in the Outside Rooms for All Member Access, visitor viewing. |
| All Family Archive | The entire embodiment known as "The Family Archive" the entire system. |
| All Members | See below, All Member Access |
| All Member Access | All Full Access Members and Registered Users can access posts in Outside Rooms and Green Key Living Rooms [Related, All Eternity Clause] |
| Archive Networking Environment | The embodiment known as The Family Archive. The system platform and its matrix. The Social Networking System SNS called Family Archive. The Family Archive platform. |
| Archive Older Posts | Archiving older posts, is the system's way of keeping a clean house. As more posts are added, the system may archive posts that have not been accessed in the last 30 days. Archiving may only occur once the room's total post count is more than 10 posts, adjustable in increments of 10 up to 100 posts. Archiving Older posts is a Desk Setting [D1] |
| At Random | Member's visiting other members house to read their posts, the reading template chooses posts for the visiting member to read and keeps track of posts already read. |
| Automatic system logoff | Settings choice for members to set time for an automatic log off of system. See Logoff |
| Back to Living Room [Icon] | An icon button found on all member's GUI screens, clicking it may take member back to their Main GUI desktop. The ICON is not on the Main Living Room Desktop UI. |
| Blue Key | Full Access Members only, in a Member Community. See Keys, [Related, Special Blue Key Option] |
| Blue Key Showcase Living Room | One of the two Showcase Living Rooms, Blue Key is for Member Defined access. See Showcase Living Rooms |
| Blue Key password storage | See Password storage |
| Blue Zone | Signup and Setup Steps 1-9 for new members. |
| Bulletin(s) | Located in Family Hall and Bulletin Alerts located in the |
| Bulletin Board | Communications Center on the Main Living Room Desktop. Bulletins are short notes and or announcements to Family Members. Bulletins are created using the Family Hall's Bulletin-Posting-Template. Bulletins include a comment section inserted below the Bulletin post. [Related, Yellow Key, Family Key, Family Hall] |
| Bulletin-Posting-Template | A template located only in Family Hall, for creating quick Bulletin's for posting in Family Hall Bulletins are Blue Key Level by default and have optional Yellow (Family) Key capability |
| Button, or Button Icon | A clickable icon that looks like a button to perform a function on the GUI desktop |
| Category | A class of things regarded as having particular shared characteristics. See Rooms |
| Chart | Layout view [map] of the entire Family Archive System matrix. See Chart, last page book |
| Chat | Chat is a text-based communication that is live or in real-time. For example, when talking to someone in chat any typed text is received by other participants immediately. A chat room is a location where multiple people can all talk at the same time. When in a chat room anything said is seen by all people participating in the chat room. |
| Citadel | A term used to denote, private permissioned network. Safe within the private network. |
| Content prompting tool | See Wishlist |
| Control Panel | Main Living Room UI Desktop. Control Panel is for Navigation, Communication and Desk functions |
| Category | Same as Rooms. |
| Category Code | The code of the category included in the automatic file naming string assigned by the system at the time a Member uploads content to the Vault, and or creates a new post. |

-continued

| WORD OR TERM | TYPICAL MEANING |
|---|---|
| Click, Clickable | Any Icon or choice option throughout the system necessitating a choice by member/user. |
| Clickable Icon | Icon located on any GUI, to see an alert, perform a task, or navigate to another location |
| Closed Post | Refers to whether the [discovery tick box] was checked at the time the post was uploaded to the system. Not activating it tells the system this is a Closed Post. A closed post is only listed in the master index for active members only. Registered users may not see it listed in the outside room's index. |
| Color | Colors of fonts, outlines of templates, screens as based on the System and user defined color sets choices during Set Up |
| Comment Section (post) | All posts throughout the Family Archive may have a comment section in an obvious easy find location, that may be the same locations for every post created by any given Full Access Member and Registered User. The comment section allows other members reading a post to leave their opinions. [Related Post Discussions] All comments should abide by House Rules |
| Communications Center | Is for email, bulletins and alerts to read posts from other members. Located on the Main Living Room GUI desktop. |
| Community Hall | Outside Room (Chart OH-2) All Member Access. Clubhouse of Family Archive. |
| Community Wide | Same as All Member Access |
| Company, the | The Company is a reference of assumption that the Family Archive concept, matrix, embodiment, that is a working Private permissioned and fully monetized website; is owned and operated by a company, group or person |
| Component | Is a member choice item or addition. Member digital content. |
| Contact System Ops | A button Icon in the Desk's Control Center, by clicking it may bring up a direct message to system's operations and the help center. |
| Control Center | Desk, control center contained in the Desk GUI. Member's control center. Chart, Desk. |
| Defined Community | Member chooses other members for their community. See Member Access [Related Permissioned Network] |
| Desk GUI | Member control center for Family Archive. Located in the Main Living Room GUI, [click] the Desk Icon > opens the Desk GUI Desktop. User Choices and options including Vault. |
| Desk Icon | |
| Desk Control Center | |
| Desktop and Desktop GUI | Desktop, aka Graphical User Interface GUI; the user screen. It is the user screen with control features to conduct an online computer session. See GUI |
| Dining Room | For Short Posts about dining adventures with family and friends. |
| Digital Content Storage | Digital content storage is a section of the vault to store member uploaded content. |
| Discovery Center | Outside Room Chart OH-2 All Member Access. Interesting post collection room. |
| Discoverable Discovery Box | Refers to a post that is available for discovery in both the master index, available for active members of Family Archive, and Outside Room Index, available to registered users and active members. Member chooses optional Discover - click-box before post is posted to system, enabling 'all member access.' The opposite of Discoverable is Closed Post |
| Element(s) | All Templates, Desktop GUI's, Wishlist, Search Engines, System Matrix, |
| Email | See Mail |
| Embodiment | Everything: The Family Archive System and program that make up the entire matrix. |
| Eternity Clause | See All Eternity Clause |
| Family Archive A concept that is > | A computer implemented networking system and method for creating, sharing and archiving content, including the use of a graphical user interface (GUI) virtual building and associated rooms, content prompting tool, content vault, and intelligent template-driven posting (AKA Archive and Networking Platform). |
| Family and Friends, list of | A list of Family and Friends that are identified by any given Member's Own Community is available by clicking on the My Community Button Icon, Main Living Room GUI Communications Center. |
| Family Archive Intranet | Intranet means: Private or Permissioned Network. Entire Member Community [Related, Member, Full Access Member, Family Archive Community] |
| Family Archive Member | Aka, Full Access Member, See Member |
| Family Archive Member Session | Online session activated by a member after login. Member clicks House front door, revealing the Main Living Room GUI. Means member actively reading posts emails and alerts, and or creating posts, or is exploring the Desk and its features. |

-continued

| WORD OR TERM | TYPICAL MEANING |
|---|---|
| Family Archive Community | The entire Privately accessed community. All Full Access Members. [not Registered Users] |
| Family Archive System Platform | Is the Embodiment of the Family Archive platform, system, software. The diagram shows a graphic depiction of the platform. |
| Family Hall (room) | Dynamic room, constantly changing current events. Blue Key Level [User Defined Community] and option to further define, select family using Family Key (see Yellow Key). Post, share newsletters, bulletins, announcements, chat, video chat. |
| Family Hall Posting Template | Family Hall Posting Template is unique only to Family Hall. The templates pre-knowledge features allow for Newsletter & Bulletin creation. The Posting Template's rule set sends all Family Hall participants, email, bulletin and chat available alerts. It also archives into a searchable index - older posts. |
| Family Key | See Yellow Key |
| Fonts | Fonts are any fonts within the Family Archive set of fonts. There is the Family Archive System Font used for all system activity. Members may choose a set of their own preferred fonts based on the house Template [House Style] |
| Forum, and Forum Topic | Discussion forum, and forum is an area where users share thoughts, ideas, or help by posting text messages. Forums are different from chat because it is almost never live and can be read at any time. A Forum Topic is the subject of any particular Forum. |
| Free access (posts)(content) | All content that is in the Outside Rooms and can be accessed by all active members and registered users. Also see Shared. [Related, Outside Rooms, Chart - Purple Zone] |
| Free Access Member | See Full Access Member, active member |
| Front door | Log in Screen. The front door of a Member's House. Member clicks on a door Icon system then asks for the Member's ID and Password. First screen Member sees when entering the Family Archive is the Main Living Room Desktop GUI. |
| Full Member Access | Full Access Members have a HOUSE aka, Member ID, House Address. These may be subscription paying members but are considered full-fledged members of the Family Archive. Having gone through all 9 steps of the setup process to gain their system initiated House address. These members have access and may post unrestricted to any room of their House, and post and access Outside rooms. See FIG. 3. [Related, Chart Green Zone] |
| Future Rooms | Future Rooms have no distinct definition. |
| Garage | Garage Room is a show room and is favored for Post Discussions. It is not just about showing off and fixing cars. It can be like a personal showcase for arts and crafts. Garage is Blue Key level by default. Garage is Private, to Member community see Member Access. And thus it is not the same as Hobby Hang Out. |
| Garden | A place to share personal posts about gardening and all things associated agriculture, including how to grow, harvest and buy flowers, plants and vegetables. Garden Room is a Desktop GUI, posts are likely to be a blend of How-to-do and showcases with either picture or video posts related to Garden. |
| General Member Content | General member content rule, or member content. See Member Content. |
| Goals | See Wishlist |
| Green Key Level | All active members and Registered Users [Outside Rooms Only]. See Keys |
| Green Key Showcase Living Room | One of the two Showcase Living Rooms, Green Key is for - All active members only. Green key living rooms are not available to registered users but rather to Active Members. |
| Green Zone | Refers to Full Access Member area, called "the Green Zone" of the Family Archive System Platform Chart. |
| GUI and GUI Desktop | Graphical User Interface, screens to operate the computer platform. The term "Desktop" as it applies to Family Archive is interchangeable with GUI |
| Hall of Records | An add-on, optional feature for members. Hall Of Records is not a part of a Member's House, it is not a room for posting or sharing. Hall of Records is cloud storage, a safe personal document storage, that is located within a Member's Vault. Hall of Records has its own Uploading template and reading template for viewing content. Hall of Records is self-contained and is only accessible within the member's Vault [D8]. |
| Help | System help is available and searchable in several places, Desk Control Center [D10] and mouse roll over of keywords on any GUI desktop in a member's house. |

| WORD OR TERM | TYPICAL MEANING |
|---|---|
| Hobby Hang Out | A place to share personal posts about Hobbies of any kind. Hobby Hang Out is All Member Access. |
| House | Member Identity and Login. House also refers to all content owned by the member. See Identity, house Address, Address, house Identity. [Related, Virtual House] |
| House design | See Member ID |
| House Address/Identity | |
| House Style House Templates | Member chosen templates. House styles are chosen during setup step 6, to establish the look the Member wants on their desktop GUI, House styles are unique to the Member only. A Chinese style house, a Santa Fe style house are examples of house styled templates. |
| House Owner | Full Access Member |
| Icon(s) | Symbols or illustrations appearing on the computer screen that indicate program files or other computer functions. To initiate them, they usually have to be double clicked. |
| ID and Password | Family Archive Login User ID and Password (same as any secure website) |
| Identity | Referring to Member ID, aka A Member's House. See Member ID |
| Important Email | See Mail |
| Index aka Master Index Index Search Index Search Icon | Master Index lists everything that is ever posted in the entire Family Archive system. Full Access Members are listed automatically in the Master Index and all of their posts. Registered Users are not listed in the Master Index. Index Search is the method to search for other Members and their created posts on the system. Index Search Icon, located on Main Living Room GUI atop the Communications Center *Note: Registered Users do not have access to the Master Index. [Related, My Index] |
| Inside Rooms | Chart - Green Zone H1-H8. Full Member Access rooms aka categories to post and read in. Rooms in a Full Access Member's House inside a Permissioned Network, member defined and shared community. |
| Interview | AI based Template, helping and making suggestions for members during the interviewing. |
| Intranet | Intended for Private companies internal private (not public) website. The word as it applies to Family Archive is for a Private or Permissioned Network. |
| Invitation(s) | (1) Invitation is an option available from the Desk [D7] used for the following: via template to invite other members to be a part of their community, aka Member Defined Community. (2) Invitation is also a utility used for an event, meeting, dinner or other detailing a date, time and or R.S.V.P. option, sent and received using Mail and Alerts |
| Invited Guest | Any member that is designated by another to be a part of their community. Invited Guests can read blue and green key posts of any member of their community, by searching that member's House ID for posts they have created. Also, a visit to their Blue and Green Key Showcase Living Rooms. |
| Invite Template | Member initiated pop-up window in template form. Fill in features to use as a mailer or alert to any member(s) entered into the list to ask to attend an event created by the originator of the Invite Template. Invitations [D7] |
| Key Level Access Blue Key Green Key Red Key Yellow Key | Color coded Keys are levels of security ranging from all-access to password only access. Refer to each color level for its definition and description. By default, the rooms of the House are Blue Key Level. It means that all posts created there are assumed Blue Key but before posting, members have the option to change to other optional Key levels. Key levels allow wide ranges of Members to access posts, are specific groups and or one or a few members to have access. All with the fast click choice in a tick box. |
| Kitchen | Posts in the Kitchen Room are about preparing food, sharing recipes and talking about food related subjects. The Kitchen Template easily facilitates inputting a recipe and helps build a story post around it. Chart [H6] |
| Kitchen Posting Template | It is a template within a template, called a branching template. Posting template begins asking about the subject of the post, and the question "are you posting a recipe?" a "yes" answer brings up the Recipe Template for easy step by step recipe input. |
| Knowledge | See Pre-knowledge, see Wizards |
| Lighted Icon | An Alert, normally found in the Main Living Room GUI, See Alerts |
| Live Chat | Live Chat is a feature in the Family Hall only. When two or more members are online at the same time, a simple live chat notice appears in the members active desktop. Members can have real time chats |
| Living Room(s) Main Living Room Showcase | There are three classifications for Living Rooms in the Family Archive. 1). Main Living Room Desktop GUI is the most important room of their House; it is the navigation center point, communications and control center for Full Access Members. 2). Blue Key and 3). Green Key Living Rooms are for other visiting members to discover another Member's House, called "Showcase Living Rooms." See Showcase Living Rooms. |

-continued

| WORD OR TERM | TYPICAL MEANING |
|---|---|
| Login/Logoff | Login, secure login, see Front Door Click for Login prompt. Login is password initiated security enabling a Member Session to take place. (2) Logoff is user initiated logging off (leaving the Website). (3) automatic logging-off is defined by the Member in Settings D1, to log the Member off of the system automatically after non-use for a member chosen period of time. |
| Mail, (Mail Alerts - see Alerts) Email Priority Email Mail Icon | Private email from other Members or Registered Users, and system Ops (email is internal to system; is not outside the Private, Permissioned Network) Mail Icon located on the Main Living Room Desktop, Communications Center. Priority Email aka [important email] received, is put in the Priority Box. System Ops may also send priority mails. |
| Main GUI Desktop Main Living Room Desktop | Main Desktop/GUI Member's CenterPoint for navigation, system control and settings [Related, Living Room, Main Living Room] |
| Main Website | The marketing website that is intended to draw in new users to the Family Archive. Main Website has features explaining all of the unique features of the Family Archive showing illustrations, and models of a House, it's sub rooms and the exceptional highlights of the Vault. The Main website may lead to Step 3, signup. Once through step 3, the matrix of Family Archive begin the Setup process in Step 4. See FIG. 3. |
| Master Index | See Index |
| Matrix | The whole Family Archive Web Site Structure. All of its pages and links |
| Member | Commonly used term, is the same as a "Full Access Member." |
| Member Access Member Community Member Defined Community Member Own Community | Member/user defined community, any given Member chooses from a 'list' of family and friends to participate in their Blue Key, user defined community. No minimum or limit. Listed members, have access to all Blue Key posts, bulletins, chat capability, video chat capability and Blue Key - Showcase Living Room. The My Community Icon button located on Main Living Room GUI desktop, used to facilitate this feature. |
| Member Content Member Created Content | All digital content owned uploaded and authored by any given Full Access Member and Registered User. Members are allowed to download their raw digital content - data, e.g. all photos, videos and writings of any kind. [Related, Template Copyright] |
| Member Defined Community | Full Access Members choose others to join their own community called a Defined Community. See Member Access above. |
| Member Default Font | Font - Members can change from system default to their own font of choice, by going to Desk > Settings [D1] > Fonts and Colors |
| Member Desktop | All GUI's [Desktops] in a Member's House or Registered User's Outside Rooms GUI's |
| Member Fulfillment | See Wishlist |
| Member's House | Owned by a member. A member's identity, all of their digital uploads held in their vault, all of their created content, email, bulletins, newsletters and any settings, profiles and Wish List content. |
| Member ID | Identity name, Full Access Members only. Member Identity, primarily for system use, indexing and automated file naming. Member ID is known to members as "House Address" [step 5]. Member ID is assigned by the system not a member choice. |
| Member Post, Post Creations | Any post that is created by a Full Access Member or Registered User. See Post |
| Member Profile | Member profiles come in two stages. At signup/setup a template initiated tool that may ask basic questions, for quick fulfillment of a Member profile. Where members were born, grew up and have lived. Basic education and work experience. All optional. Stage two, after signup and a Member has their House ID, the Member can go back in their Desk control panel and choose "Member Profile" to add to their profiles, extensively if they wish. Anything everything and comprehensively if they choose. In stage two, the profiles are Key Level access, therefore adding to the Profiles, can be locked down with Blue and Red key, or the entire network's Green Key. Each writing is an add-on, each could be considered a separate post section of a post. It is the sections, further classified as Paragraphs or pages of writing, inserted at different times, that may use Key Levels to open up, or lock down the writing, picture, video, curriculum vitae, experience profile, sound file whatever the suits the author. |
| Member Session | Any time after logging into the Family Archive, clicking the House Front Door, to start in the Main Living Room desktop GUI, begins a Member Session. The session is active until the Member clicks the Log Off button, or the system automatically logs the member off. |
| Member Username | Full Access Member's chosen name for identity in his Private community and Outside Rooms. Username/Member Username are interchangeable terms |
| My Community Button Icon | 1. Full Access Members choose others to join their own community. 2. Members see a list of their own community, click name to email or read post of the member on the list. |

| WORD OR TERM | TYPICAL MEANING |
| --- | --- |
| My Index | A member's personal Index containing a listing of all their posts created throughout the system and all uploads, in member's personal Vault. Also see Master Index |
| Narration Wizard | A simple template-based wizard to add narration to any post. Easy follow instructions and equipment hardware requirements are available in the templates help section. Narration can be inserted, via microphone or by inserting a sound file to the post. |
| Navigation Navigation starting point | The main Living Room desktop GUI has clickable labeled icons for navigation throughout the system. It is the CenterPoint for all navigation, therefore leaving it to go to another room - means members must navigate back to the Main Living Room to go somewhere else. See "Back to Living Room" [Icon] |
| Newsletter | Feature unique only to Family Hall. Created with the use of the Family Hall Posting Template. Any participating member of the Family Hall may create and post a newsletter. |
| No User Choice [system] | An Element. Members and Registered Users cannot change system elements. |
| Non Active Member | Anyone who is not an active member of Family Archive. See Active Member |
| Open Access | See Registered User, Shared, Free Access |
| Operations | See System Operations |
| Outside Community | Not of a member's own defined community, that which is of the Family Archive Community |
| Outside Rooms | Not part of the Private or Permissioned Network aka Green Zone. Rooms Outside the House; OH-1 to OH-4, Purple Zone [Chart]. |
| Own Community Own Member Community | See Member Community |
| Outside Room Index | The searchable index that resides only in the outside rooms. Registered users and active members can search for posts and forum content in any outside room using this index. |
| Password Protection | See Keys (3) Red, Blue |
| Personal Community Member's Personal Community | A member's own personal FAMILY ARCHIVE Community. Members within a trusted circle of family and friends. The members automatically are joined and assigned Blue Key Level Access unless otherwise specified by the author of any given post. See Member Defined |
| Paid Subscription Members | See Full Access Members, Active |
| Participating Members | Full Access Members (only), that are members of each other's Defined Community. |
| Permissioned Network | Member Defined Community. Full Member Access Only [Related, My Community] |
| Passport Stamps | Travel Room. Icons located in the pages of the Passport Icon that correspond to an overseas travel story within a specific date range to a specific country. The stamp may reflect the country that was traveled to. Clicking the stamp brings up the story post corresponding to it. |
| Password storage | A Desk feature [D9], located in a Full Access Member's Vault, is an editable list of passwords corresponding to the post and listing the member it was sent to. Passwords are for Red Key and some special Blue Key level access posts. |
| Posts | A Member's [subject] post creation. Posted in a room of a member's house |
| Post Alert | See Read New Posts |
| Post Comment Section | See Comment Section |
| Post Discovery | See Discoverable |
| Post Discussion | Post discussion is a term to describe popular posts that have much interests from other members. The popularity of the post spawns multiple Post Discussions. Not the same as a Forum, but within the posts Comment Section, Members have the option to place their, commentaries, remarks, criticisms and observations about the post. The newest comments are on top; however members can reverse the order and change the formatting to place the oldest comments first thereby reading and scrolling downward. |
| Posting Template See Wizards | Templates guide Members and Registered Users through a step by step ordered process to input pertinent information about their posts. From start to finish, posting templates streamline the process of creating beautiful post layouts. Posting Templates maintain structure, design and help post-creators remember details they may otherwise overlook. |
| Pre-Defined Community | See Member Community |
| Pre-Designate | Yellow Key, allows members to list Family or Friends, as pre-Designated thereby choosing the Yellow Key (Family Hall only), for any post or Bulletin, only persons listed on the pre-designated list may be allowed to view any Yellow Key aka Family Key post. |

-continued

| WORD OR TERM | TYPICAL MEANING |
|---|---|
| Pre-Knowledge | Refers to templates. Uploading, posting and reading templates have question sets and rules that define the template that resides in the room or place it is being used. Templates ask post creator's - questions, that may modify and change further questioning until the post is completed. Questions are simple "yes" or "no" answers, either or answers including tick boxes and answer fill ins. |
| Priority Email | See Mail |
| Privately Shared Network | A computer implemented networking system and method for creating and privately sharing and archiving member content with intelligent template-driven posting of content. |
| Prompting Order/ Tool | See Wishlist |
| Public | Not to give the impression the GUI room is - open to the public. Always associated with, Outside Rooms. Full Access Members and Registered Users have access to Outside Rooms. The term "public" does not imply general public or free unrestricted access unless person has registered with the system; hence, "Registered Users." [Related, Green Key, Green Key Living Rooms, Outside Rooms) |
| Public Living Rooms | See Living Rooms/Showcase |
| Purple Zone | All Outside Rooms. See Free Access, Registered User. Chart - Purple Zone |
| Quick Notes | See Bulletins |
| Read new post alert | Located in communication center, Main Living Room Desktop. Whenever a member of their community posts, receiving member may be notified about the new post |
| Reading template Also see At Random | Adapts to room or place template is called upon. Normally a popup after clicking an item to be read, unless in the case of a post. A post is like a reading template, with a member chosen design. Reading templates not associated to a post, may be system designed templates displaying the content with options to enlarge or decrease views. |
| Registered User | Can use Outside Rooms only. Must be Registered with the system and obtain a User ID. Free Access of Outside Rooms with registration. See Outside Rooms. Also see Shared, Free Access. [Related Full Access Member] |
| Reminder and Prompt Reminder Tool | See WishList |
| Raw Data Raw Digital Content Raw Digital Unformatted | Members are allowed to download some or all of their uploaded, and or created post content from (system storage) in raw its digital unformatted form, to their computer or cloud storage. Raw data, means Member posts are without Family Archive's design elements and features, such as template design, colors, fonts and final layout. |
| Receiving party | Applies to Title Transfer, member transfers their account to one of the following: active members, non-active members, or assign a trustee |
| Red Key | Member chooses Red Key before posting their post. Red Key posts, have optional password protection. By default, Red Key posts are not password protected, but are for a designated few or just one intended member to read and comment on the post being shared. |
| Red Key password storage | See Password Storage |
| Return to Living Room Desktop Icon | See Back to Living Room [Icon] |
| Room(s) Rooms | (1) A room is a category based on a set of rules. Each category [Room] is defined by the system. Rooms are either Shared or Semi-Shared meaning members have options to share with others outside their defined community. (2) Registered visitor Rooms located outside a member's house are classified as Shared Green Key Access. (3) Semi-Shared are Rooms in a member's own house. (4) Desk and its contents are not rooms [Related, Category] |
| Rooms inside/ outside house | See Inside Rooms, Outside Rooms |
| Rules | House Rules, general guidelines. Platform rules and regulations. |
| Rule Sets | System defined, group of rules for a room, utility or system element. Cannot be changed by members. Rules are defined by the System for each room and all system elements, thereby defining what options can or cannot be accomplished. Rule Sets define the operation of all templates, GUI's, Desk elements, email, and new user's sign-up and set up. |
| Searchable Index | See Index |
| Security | Family Archive is a Private Permissions Network contained in an encrypted password protected secure matrix. It cannot be accessed without authentication. Key Level Access is also a security features. See Key Levels. |

| WORD OR TERM | TYPICAL MEANING |
| --- | --- |
| Semi-Shared | See Limited Sharing |
| Settings | Settings is a member control center similar to the gear icon found on many websites. Settings is a Desk feature [D1]. Features include but are not limited to, a choice of House design, fonts, and colors. |
| Setup | Next step after signing up for a Membership, Setup may ask the basics, Name, Address, Phone, Email, Member Nickname and other basic information. System may ask Member what rooms to activate for the user experience. See Step 4 |
| Shared Community | See Member Access |
| Sharing Posting template branching template | Hobby Hang Out room, sharing posting template. Designed for members to share posts about their hobbies. Asks hobby specific questions. For initiating a new hobby or for adding on to an existing one. Branching, as an add on to the original post. Filing by date, time, subject. The Sharing Posting Template may sequence by steps for creating, show and tell, or how to do [a particular hobby], kinds of posts. |
| Short Notes | See Bulletins |
| Showcase Living Rooms | The purpose of showcase living rooms are for other visiting members to discover another Member's House. Living room posts are showcases that are meant for quick visits, discovery of members in common, and for members to show off some of their personality by displaying objects they want others to see. Pictures, videos, writings, sculptures, various objects that are uploaded via the upload template, and deliberately placed in a Living Room desktop GUI, that is designed by the member. Both Living Rooms work and function the same, accept their access is different. 1. Blue Key (Member Defined) 2. Green Key (All Member Access) [Related, Blue Key, Green Key Living Rooms] |
| SNS Social Networking Service Social media | A social networking service (SNS) is an online vehicle for creating relationships with other people who share an interest, background, or real relationship. Social networking service users create a profile with personal information and photos and form connections. These users then use their connection to grow relationships through sharing, emailing, instant messaging, and commenting. Social networking services may also be referred to as a "social networking site" or simply "social media." |
| Special Blue Key Option | Rooms are Blue Key by default, sharing with all Participating Members in a Defined Community. Blue Key Option allows post creator to exclude some members in the group from seeing any given post in the default Blue Key room. |
| Subscriber | A Full Access Member of the Family Archive may become a subscriber |
| System | The hardware, software and/or firmware that makes up the system of the Family Archive. |
| System Chart | See FIGS. 3 and 4. |
| System default Font | The default font (not yet identified) to be used when a member does not choose one. See User Defined. |
| System Operations System Ops. | The team of persons that operate and maintain Family Archive website, both software and memberships, and any necessary business related matters pertaining to Family Archive. |
| Template(s) | Templates are at the core of the Family Archive System. Templates make for a streamline, uploading, post creation and reading process. |
| Template Copy Right | Templates and all designs within the Family Archive are the property of (future company name) and therefore cannot be copied or used outside the system matrix, without the express permission of the above-named company. Members are not allowed to copy their posts but are allowed to download their raw digital data, e.g. all photos, videos and writings of any kind. The content may not be formatted according to the FAMILY ARCHIVE Templates. See Raw Data |
| Template Design | The look of the room/GUI of a member's House, the Look of the Living Room Desktop GUI based on the House design the member chose during the setup process Step-6 and [D1]. |
| The Interview | See Interview |
| Tick Boxes | Member Choice boxes to initiate a system-based function through a pop-up or menu. |
| Time Lock | A Vault feature. Time Lock is initiated in the Vault and created with the help of a template. Time Locked is a time capsule post to be opened at a specified date, time or event. The user defines the criteria for opening the post at a future date or event condition. |
| Title Transfer | Vault feature, accessed through the Member's Vault. Desk [D8]. The owner of his HOUSE completely transfers his House and all its content to another Member. |
| Travel Room | A room to post about Travel related experiences. Full Access Member room only. Travel is designated [H2] on the Chart. |

-continued

| WORD OR TERM | TYPICAL MEANING |
| --- | --- |
| Trust | Handing ownership of Member's house to another member at a later date, event or condition. Trust is another term for Title Transfer. See Title Transfer above |
| Trustee, Trustor | Applies the same as the real-life legal term. |
| Uploading Template | For uploading documents, digital media content for future posts, and stored in the Vault. |
| User | Often used term, to mean a Full Access Member. [Related Registered Users] |
| User Choice Look | Full Access Member's Only, choose their House design, colors, fonts. [Related User Defined] |
| User Defined | Full Access Member's only. Any element/choice offered by the system. The diagram set up steps 6-9. Posts have pop-up windows to create and finish a post, choose various functions, fonts and colors, settings. |
| User Defined User Defined Community | See Member Community |
| User ID | How Registered Users are identified on the system. Registered Users can only access Outside Rooms. Not the same as Username or Member ID, used for Full Access Members. |
| Username also member username | The name a Full Access Member chooses to be identified by other members on the system. See Member Username. |
| User Preferences | See Set Up |
| User Profile Member Profile | Dedicated to the member's description of their life. User profile is a pre-defined Template with help from AI to prompt the Member to write cogent beautifully crafted User Profile of himself. The Member Profile is available to all, [Shared] |
| Vault Member Vault | For the storage of all member's uploaded documents and media. All of these are for use in a member's posts currently being created or not yet created. The vault has other features besides storage. See Vault Desktop |
| Vault Desktop | A GUI desktop that navigates to various features of the Vault. Uploading Template, Time Lock, Vault Index, Title Transfer, Password Storage, Hall of Records, Return to Living Room Desktop icon. |
| Vault Index | A list of all of the member's digital content that is located in the [digital content storage] section of their vault. Vault index is searchable, items can be viewed by clicking on them. |
| AKA, Video Call | A video Chat/Call is a phone call using an Internet connection, sometimes called VoIP, that utilizes video to transmit a live picture of the person making the call. Video calls are made using a computer's webcam or other electronic devices with a video-capable camera, like a smartphone, tablet, or video-capable phone system. |
| Virtual House VIRTUAL Building | Generic term for House used in this system. See House |
| VoIP | Alternatively referred to as IP telephone, Internet phone, or Internet telephony, VoIP is short for Voice over Internet Protocol, and it enables users to make calls over the Internet. |
| Whole Community | Entire Family Archive Community. All Full Access Members and all Registered Users. |
| Wishlist Wishlist Prompt Priority (Aka, Reminder tool, remind and prompt). | 1) Integral part of the FAMILY ARCHIVE Member Experience. AKA, Prompting tool, reminder prompt. 2), Wishlist is a member fulfillment utility, available during signup step 9 and after signup from the Desk D5. 3), Wishlist is customizable anytime. A list of goals filled out in a list format, the lower the number the higher the priority. 4), Each listing may have a Room [category] that is an assigned to it. 5), Wishlist is a reminder to create posts in a particular category. The prompt is enabled shortly after logging in and when visiting any room in the member's House. However prompts in a particular Room, show priority Wishlist for that Room only. |
| Wizard(s) also posting templates | To aid the Member when posting any item in his house located in the FAMILY ARCHIVE, wizards are the intelligence that prompt and deliver creative suggestions for members to make their posts more interesting and long lasting. Wizards are intricate throughout the System. |
| Yellow Key | A Yellow Key aka Family Key level access is an option only available in Family Hall Room. It gives Full Access Members an option to "pre-designate" only some - Family and Friends, in a defined community, to see Yellow Key posts. The Yellow Key is a list of those members. To make a post, using Yellow Key, the member chooses "Yellow Key" before posting. All Yellow Key posts replace the default Blue Key post for Family Hall. |
| Your Room | Located in a member's house [H8] on the diagram. Full Access Members, have the option to create a [single topic] definable room, members can designate to any subject they choose, i.e., Photography room. Your Room enables a member to make their own category/room that has adaptable posting templates the member may edit to aid them when creating new posts for Your Room. |

| WORD OR TERM | TYPICAL MEANING |
|---|---|
| Your Story (room) | Located in a member's house [H1] on the diagram. A room intended for Full Access Members to post any story, any topic. Stories are wide and varied, there are no rules for story subject matter. Simply a room to post stories in. |

Table of Indexes

An index is a listing of active members or registered users by member Id and username and all content posts, and uploaded content. Green Zone: The system platform for active members only. Purple Zone: The system platform for registered users and active members. Vault: Private content storage only to the member, not shared.

| INDEX NAME | LOCATION | DESCRIPTION |
|---|---|---|
| MY INDEX | Member's House | List of all posted content created by member arranged by category/room and in order of date. User choice listing sequence. Newest at top of list or oldest at top of the index list. |
| MASTER INDEX | Green Zone | Listing of all active members by member ID and username and their posts. Active member allowed access only. Clicking a member name goes to the member's green key showcase living room. If in same community, bypasses green key showcase living room, takes member to blue key showcase living room. Member profile link in living room. Any active member can email for permission to see a blue key living room, or a particular blue key post. |
| FAMILY HALL INDEX | Green Zone | Index exclusive to all posts, newsletters and bulletins posted in family hall. Multiple search function available for new and archived postings, member name search, topic and events. |
| DISCOVERY INDEX | DISCOVERY ROOM OH-3 | Index post listings of all posts by category, user ID, Date |
| COMMUNITY HALL INDEX | COMMUNITY HALL OH-2 | Index post and forum listings by subject, title, user ID, location, date. |
| HOBBY HANG OUT INDEX | HOBBY HANG OUT OH-1 | Index post listings of all posts by hobby name, category, user ID, Date |
| VAULT INDEX | Member's private Vault | All members uploaded content ordered by category and user choice option, date and or title/name of the upload. |
| VAULT, HALL OF RECORDS INDEX | Members Private Vault, Hall of Records | Hall of Records content only. Organized by category and user choice option, date and or title/name of the upload. |
| VAULT, TIME LOCK INDEX | Member's private Vault, Time Lock | Small, simple index - a list of Time Locked post items (if any). Ordered by date or title/name. |
| VAULT, TITLE TRANSFER INDEX | Member's private Vault, Title Transfer | Small, simple index - list of Title Transfer requests to one person or more (if any). Ordered by date or title/name. |
| VAULT, PASSWORD STORAGE INDEX | Member's private Vault, Password Storage | Index of all posts and passwords assigned to them. Ordered by date or title/name. Clicking on any listing allows member to delete or edit the password. |

Table of Templates

Templates provide a streamlined, uploading, post creation and reading process within the system. There are templates for uploading, posting and reading, located throughout the system, all of which facilitate the ability to streamline the creation of quality posts. Templates are enhanced with system intelligence.

| TEMPLATE NAME | LOCATION(S) | DESCRIPTION |
|---|---|---|
| Branching template | Member profile, kitchen, travel, family hall, hobby hang out | Original posts additions in the form of posts either linking together or inside the original post. |

| TEMPLATE NAME | LOCATION(S) | DESCRIPTION |
| --- | --- | --- |
| Desk reading template | Member's private desk, D1-D12 | any areas of desk GUI that may necessitate a reading template popup and its features. |
| Choosing Template | Discovery Center OH-3 | Member's do not create posts in Discovery Center, they showcase their green key posts, created in their house. Choosing template, opens up to choice [box] listing of all posts. Placing a check mark in box, automatically posts them in the Discovery Center, for all active members, and registered users to see. |
| Hall of records reading template | Vault Hall of Records | Reading template for hall of records content, ordered by category. Has option to print what is on the reading template screen. |
| Posting template member profile | Member profile Step 8/D2 | Posts the first profile description, more description can be added, see branching. |
| Posting template rooms | green zone rooms H1-H8 and purple zone rooms OH-1-OH4. | Residing in each room. Template questions may change depending on the category. |
| Posting template showcase Living Rooms | Green, Blue Key Showcase living rooms | For each showcase living room, same functions as room posting templates, but has a pointer to place objects around liv. Rooms. |
| Reading template | green zone rooms H1-H8 and purple zone rooms OH-1-OH4. | See page 84 for detailed description. Reading templates, are a popup GUI for reading posts. |
| Unlisted locations, reading template | Any non-room section of the platform, click any item that is reading enabled, will popup a reading template. | Non rooms are any areas of the platform, any GUI that may necessitate a reading template popup and its features |
| Uploading template | Member's private vault | For uploading all member content to their house |
| Vault reading template | Member's private Vault | All Vault features, any areas of GUI that may necessitate a reading template popup |

Archive Networking Environment

Figure 15:
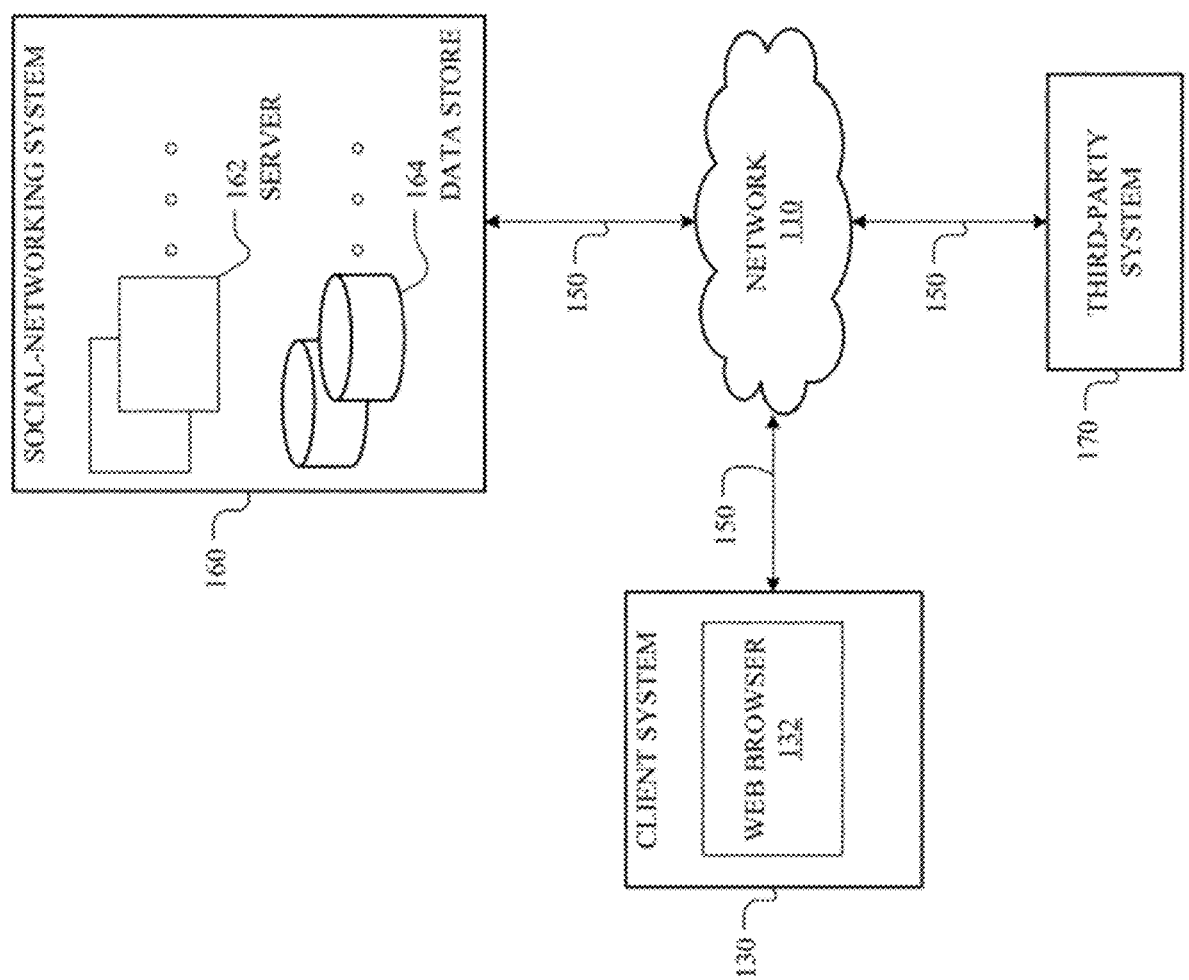
FIG. 15 is a schematic diagram illustrating an example network environment associated with the networking system and method of the present embodiments.

FIG. 15 illustrates an example network environment 100 associated with an archive networking system. Network environment 100 includes a client system 130, an archive networking system 160, and a third-party system 170 connected to each other by a network 110. Although FIG. illustrates a particular arrangement of client system 130, archive networking system 160, third-party system 170, and network 110, this disclosure contemplates any suitable arrangement of client system 130, archive networking system 160, third-party system 170, and network 110. As an example and not by way of limitation, two or more of client system 130, archive networking system 160, and third-party system 170 may be connected to each other directly, bypassing network 110. As another example, two or more of client system 130, archive networking system 160, and third-party system 170 may be physically or logically co-located with each other in whole or in part. Moreover, although FIG. illustrates a particular number of client systems 130, archive networking systems 160, third-party systems 170, and networks 110, this disclosure contemplates any suitable number of client systems 130, archive networking systems 160, third-party systems 170, and networks 110. As an example and not by way of limitation, network environment 100 may include multiple client system 130, archive networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, archive networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, archive networking system 160 may be a network-addressable computing system that can host an online social network. Archive networking system 160 may generate, store, receive, and send archive networking data, such as, for example, user-profile data, concept-profile data, social-graph information, or other suitable data related to the online social network. Archive networking system 160 may be accessed by the other components of network environment 100 either directly or via network 110. As an example and not by way of limitation, client system 130 may access archive networking system 160 using a web browser 132, or a native application associated with archive networking system 160 (e.g., a mobile archive networking application, a messaging application, another suitable application, or any combination thereof) either directly or via network 110. In particular embodiments, archive networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, archive networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, an archive networking system 160, or a third-party system 170 to manage, retrieve, modify, add, or delete, the information stored in data store 164.

Archive networking system 160 may provide users of the online social network the ability to communicate and interact with other users. In particular embodiments, users may join the online social network via archive networking system 160 and then add connections (e.g., relationships) to a number of other users of archive networking system 160 to whom they want to be connected. Herein, the term "friend" may refer to any other user of archive networking system 160 with whom a user has formed a connection, association, or relationship via archive networking system 160.

In particular embodiments, archive networking system 160 may provide users with the ability to take actions on various types of items or objects, supported by archive networking system 160. As an example and not by way of limitation, the items and objects may include groups or social networks to which users of archive networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in archive networking system 160 or by an external system of third-party system 170, which is separate from archive networking system 160 and coupled to archive networking system 160 via a network 110.

In particular embodiments, archive networking system 160 may be capable of linking a variety of entities. As an example and not by way of limitation, archive networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating archive networking system 160. In particular embodiments, however, archive networking system 160 and third-party systems 170 may operate in conjunction with each other to provide archive networking services to users of archive networking system 160 or third-party systems 170. In this sense, archive networking system 160 may provide a platform, or backbone, which other systems, such as third-party systems 170, may use to provide archive networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, archive networking system 160 also includes user-generated content objects, which may enhance a user's interactions with archive networking system 160. User-generated content may include anything a user can add, upload, send, or "post" to archive networking system 160. As an example and not by way of limitation, a user communicates posts to archive networking system 160 from a client system 130. Posts may include data such as status updates or other textual data, location information, photos, videos, links, music or other similar data or media. Content may also be added to archive networking system 160 by a third-party through a "communication channel," such as a newsfeed or stream.

In particular embodiments, archive networking system 160 may include a variety of servers, sub-systems, programs, modules, logs, and data stores. In particular embodiments, archive networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Archive networking system 160 may also include suitable components such as network interfaces, security mechanisms, load balancers, failover servers, management-and-network-operations consoles, other suitable components, or any suitable combination thereof. In particular embodiments, archive networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking archive networking system 160 to one or more client systems 130 or one or more third-party system 170 via network 110. The web server may include a mail server or other messaging functionality for receiving and routing messages between archive networking system 160 and one or more client systems 130. An API-request server may allow a third-party system 170 to access information from archive networking system 160 by calling one or more APIs. An action logger may be used to receive communications from a web server about a user's actions on or off archive networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of archive networking system 160. A privacy setting of a user determines how particular information associated with a user can be shared. The authorization server may allow users to opt in to or opt out of having their actions logged by archive networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Systems and Methods

Figure 16:
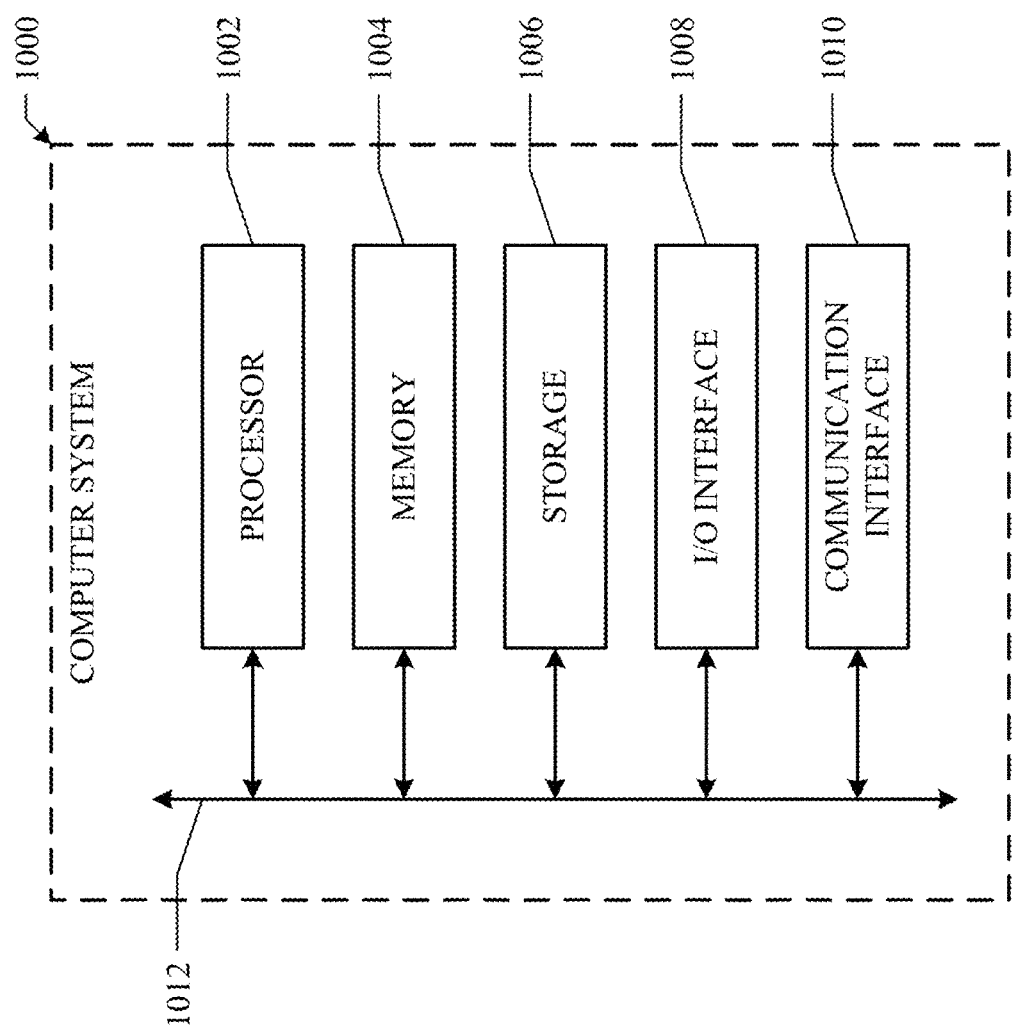
FIG. 16 is a schematic diagram illustrating an example computer system that provides various functionality with the system and methods of the present embodiments.

FIG. 16 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example, and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example, and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example, and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example, and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example, and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example, and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

A computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

A communication network operates in accordance with embodiments of the present disclosure. In particular, a data server communicates with client devices such as mobile terminal and personal computer via network. The network can include a single network or a plurality of different networks. These network(s) can include the Internet, a private communication network, a local area network, a mobile wireless communication network, a wired or fiber optic network or other broadband communication network.

The data server can present a website that operates via a browser application of mobile terminal and/or personal computer or that otherwise provides a server application that operates in conjunction with a client device having an application such as a mobile application selected for download by the user and downloaded to the client device to present and gather data that includes user data and preferences, and other data.

A processing module can be implemented via a single processing device or a plurality of processing devices. Such processing devices can include a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory. The memory can include a hard disc drive or other disc drive, read-only memory, random access memory, volatile memory, non-volatile memory, static memory, dynamic memory, flash memory, cache memory, and/or any device that stores digital information. Note that when a processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus, other architectures are possible including additional data buses and/or direct connectivity between one or more elements.

At least one processor of the processing module executes the data server application to bidirectionally communicate data with a user of a client device, such as client device via the network interface and the network.

A client device, such as mobile terminal, personal computer or other client device such as a personal digital assistant, e-reader, tablet, or smartphone is presented. The client device includes a network interface having one or more interfaces that include wireless interfaces such as a 3G, 4G or other wireless telephony transceiver, a Bluetooth transceiver, a WiFi transceiver, UltraWideBand transceiver, WIMAX transceiver, ZigBee transceiver or other wireless interface. Examples of interfaces further include wired interfaces such as a Universal Serial Bus (USB) interface, an IEEE 1394 Firewire interface, an Ethernet interface or other network card or modem for communicating with data server, or other servers such as content servers via the network. The client device also includes a user interface such as a display device, touch screen, key pad, touch pad, thumb wheel, one or more buttons, a speaker, a microphone, an accelerometer, gyroscope or other motion or position sensor, or other interface devices that provide information to a user of the client device and that generate data in response to the user's interaction with the client device. In addition, the client device includes an image capture device such as a digital camera that captures still or video images with or without associated audio.

The client device also includes a processing module and memory module that stores an operating system such as a Linux-based operating system, a Microsoft personal computer or mobile operating system, an Android operating system, an Apple mobile or personal computer operating system or other operating system. The memory module also stores location data corresponding to the location of the client device generated via user interaction with user interface, via optional Global Positioning System (GPS) receiver, one or more motion sensors such as accelerometers, gyroscopes or other sensors, or gathered via a wireless network such as triangulation data received from a 4G network, for example, location information from a connected access point or base station, femtocell or other location data. In addition, memory module includes a messaging application for communicating with other client devices such as an email application, a text, instant messaging or short messaging service (SMS) application or other messaging application that stored contacts data corresponding to users of other client devices that are known to the user of client device as well as contact information corresponding to message recipients.

The memory module also stores a data client application that is prestored in the memory module, loaded via disk or downloaded to the memory module via network interface. The delivery data client application can be a general browser application such as Mozilla, Google Chrome, Safari, Internet Explorer or other general web browser or an application that is customized to operate in conjunction with delivery data server in conjunction with the exchange of delivery data.

The processing module can be implemented via a single processing device or a plurality of processing devices. Such processing devices can include a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory of memory module. The memory can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus, other architectures are possible including additional data buses and/or direct connectivity between one or more elements. Further, the client device can include one or more additional elements that are not specifically shown.

The user device, network server, system, mobile device and other components may be part of, and/or communicate with, a network that may provide automated control of devices, appliances and other home systems (such as security systems, lighting systems, wired/wireless communication systems etc.), and may include the use of Internet of Things (IoT) technology, various input/output interfaces, Internet connectivity, and/or remote control capabilities etc., for example.

The user device, network server, system, mobile device and other components may be implemented by one or more processors or computers. It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

As may also be used herein, the terms "processor", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from FIGure to FIGure, the embodiments may incorporate the same or similarly named functions, steps, modules, etc. that may use the same or different reference numbers and, as such, the functions, steps, modules, etc. may be the same or similar functions, steps, modules, etc. or different ones.

The above description provides specific details, such as material types and processing conditions to provide a thorough description of example embodiments. However, a person of ordinary skill in the art would understand that the embodiments may be practiced without using these specific details.

Some of the illustrative aspects of the present invention may be advantageous in solving the problems herein described and other problems not discussed which are discoverable by a skilled artisan. While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims.

Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item. Thus, the scope of the invention should be determined by the appended claims and their legal equivalents, and not by the examples given.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A method comprising:

maintaining, in a networking system configured for content-creating, sharing, and archiving, profiles for a plurality of users each having an account on the networking system that stores and displays user-authored content posts that are quality controlled for each of the users;

generating, for each user profile, a virtual building configured to be displayed via a user interface (UI), and including a main room and a plurality of sub-rooms each being associated with a respective category, and wherein the main room provides navigation to the sub-rooms;

generating the user-authored content posts for each of the users via posting templates that include template guidance associated with each category and are configured to prompt a user to input and organize various content, including written text and audio/visual media, based upon the template guidance for the respective category to control the quality of the user-authored content posts; and maintaining a prompting tool, operating within the virtual building for each profile by displaying prompts within each of the sub-rooms and related to the respective category, and comprising a prioritized list of user tasks including at least one of creation of user-authored content posts, completion of incomplete user-authored content posts, and reading of content posts of other users.

2. The method according to claim 1, further comprising maintaining, in the networking system, a Vault configured to securely store users' uploaded content including documents and audio/visual media.

3. The method according to claim 2, wherein maintaining the Vault includes only receiving users' content via uploading templates to store the content for later retrieval by the user via the posting templates.

4. The method according to claim 3, wherein the users' uploaded content is securely stored in the Vault and is private to only the user and authorized other users.

5. The method according to claim 4, wherein the Vault includes a time-lock component configured to lock a user's designated post for future posting to the user's profile based upon at least one of a date, event and condition.

6. The method according to claim 4, wherein the Vault includes a title-transfer component configured to transfer control of a user's profile and associated virtual building and content to another user based upon at least one of a date, event and condition.

7. The method according to claim 1, further comprising providing, in the networking system, reading templates that are category related for reading of content posts of other users.

8. The method according to claim 1, wherein maintaining the prompting tool includes displaying selectable options to edit the prioritized list of user tasks by the user.

9. The method according to claim 1, further comprising:
maintaining, for each user profile, a community of other users who are selected for profile access by the respective user; and
maintaining, within the networking system, a posting access classification component configured to provide access to user-authored content posts based upon a network classification, a community classification and a private classification that are selectable by the user, per user-authored content post, within the posting template.

10. A system including at least one processor and at least one non-transitory computer-readable storage medium storing instructions thereon that, when executed by the at least one processor, cause the system to:
maintain, in a networking system configured for content-creating, sharing, and archiving, profiles for a plurality of users each having an account on the networking system that stores and displays user-authored content posts that are quality controlled for each of the users;
generate, for each user profile, a virtual building configured to be displayed via a user interface (UI), and including a main room and a plurality of sub-rooms each being associated with a respective category, and wherein the main room provides navigation to the sub-rooms;
generate the user-authored content posts for each of the users via posting templates that include template guidance associated with each category and are configured to prompt a user to input and organize various content, including written text and audio/visual media, based upon the template guidance for the respective category to control the quality of the user-authored content posts; and
maintain a prompting tool, operating within the virtual building for each profile by displaying prompts within each of the sub-rooms and related to the respective category, and comprising a prioritized list of user tasks including creation of user-authored content posts, completion of incomplete user-authored content posts, and reading of posts of other users.

11. The system according to claim 10, further storing instructions that, when executed by the at least one processor, maintain, in the networking system, a Vault configured to securely store users' uploaded content including documents and audio/visual media.

12. The system according to claim 11, further storing instructions that, when executed by the at least one processor, maintain the Vault by only receiving users' content via uploading templates to store the content for later retrieval by the user via the posting templates; wherein the users' uploaded content is securely stored in the Vault and is private to only the user and authorized other users.

13. The system according to claim 12, wherein the Vault includes a time-lock component configured to lock a user's designated post for future posting to the user's profile based upon at least one of a date, event and condition.

14. The system according to claim 12, wherein the Vault includes a title-transfer component configured to transfer control of a user's profile and associated virtual building and content to another user based upon at least one of a date, event and condition.

15. The system according to claim 10, further storing instructions that, when executed by the at least one processor, provide, in the networking system, reading templates that are category related for reading of content posts of other users.

16. The system according to claim 10, further storing instructions that, when executed by the at least one processor:
maintain, for each user profile, a community of other users who are selected for profile access by the respective user; and
maintain, within the networking system, a posting access classification component configured to provide access to user-authored content posts based upon a network classification, a community classification and a private classification that are selectable by the user within the posting template.

17. A non-transitory computer readable medium having embedded thereon a program, the program being executable by a processor for performing a method, the method comprising:
maintaining, in a networking system configured for content-creating, sharing, and archiving, profiles for a plurality of users each having an account on the networking system that stores and displays user-authored content posts that are quality controlled for each of the users;
generating, for each user profile, a virtual building configured to be displayed via a user interface (UI), and including a main room and a plurality of sub-rooms each being associated with a respective category, and wherein the main room provides navigation to the sub-rooms;
generating the user-authored content posts for each of the users via posting templates that include template guidance associated with each category and are configured to prompt a user to input and organize various content, including written text and audio/visual media, based upon the template guidance for the respective category to control the quality of the user-authored content posts; and
maintaining a prompting tool, operating within the virtual building for each profile by displaying prompts within each of the sub-rooms and related to the respective category, and comprising a prioritized list of user tasks including creation of user-authored content posts, completion of incomplete user-authored content posts, and reading of posts of other users.

18. The non-transitory computer readable medium according to claim 17, further storing instructions thereon that, when executed by the at least one processor, maintain, in the networking system, a Vault configured to securely store users' uploaded content including documents and audio/visual media; wherein maintaining the Vault includes only receiving users' content via uploading templates to store the content for later retrieval by the user via the posting templates and via reading templates; wherein the users' uploaded content is securely stored in the Vault and is private to only the user and authorized other users; wherein the Vault includes a time-lock component configured to lock a user's designated post for future posting to the user's profile based upon at least one of a date, event and condition; wherein the Vault includes a title-transfer component configured to transfer control of a user's profile and associated virtual building and content to another user based upon at least one of a date, event and condition.

19. The non-transitory computer readable medium according to claim 17, further storing instructions that, when executed by the at least one processor, provide, in the networking system, reading templates that are category related for reading of content posts of other users.

20. The non-transitory computer readable medium according to claim 17, wherein the method further comprises:
- maintaining, for each user profile, a community of other users who are selected for profile access by the respective user; and
- maintaining, within the networking system, a posting access classification component configured to provide access to user-authored content posts based upon a network classification, a community classification and a private classification that are selectable by the user within the posting template.

* * * * *